(12) United States Patent
Thanasekaran

(10) Patent No.: US 11,323,373 B2
(45) Date of Patent: *May 3, 2022

(54) INTELLIGENT LOCAL MANAGEMENT OF DATA STREAM THROTTLING IN SECONDARY-COPY OPERATIONS

(71) Applicant: Commvault Systems, Inc., Tinton Falls, NJ (US)

(72) Inventor: Vijayan Thanasekaran, Fremont, CA (US)

(73) Assignee: Commvault Systems, Inc., Tinton Falls, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 17/014,267

(22) Filed: Sep. 8, 2020

(65) Prior Publication Data

US 2020/0403921 A1   Dec. 24, 2020

Related U.S. Application Data

(60) Continuation of application No. 16/375,725, filed on Apr. 4, 2019, now Pat. No. 10,938,723, which is a
(Continued)

(51) Int. Cl.
*H04L 12/801* (2013.01)
*H04L 47/12* (2022.01)
(Continued)

(52) U.S. Cl.
CPC ............. *H04L 47/12* (2013.01); *G06F 3/065* (2013.01); *G06F 3/067* (2013.01); *G06F 3/0613* (2013.01);
(Continued)

(58) Field of Classification Search
CPC ....... H04L 47/12; H04L 47/522; H04L 47/70; H04L 47/781; G06F 3/0646;
(Continued)

(56) References Cited

U.S. PATENT DOCUMENTS 4,686,620 A   8/1987   Ng
4,995,035 A   2/1991   Cole et al.
(Continued)

OTHER PUBLICATIONS

Thanasekaran, U.S. Appl. No. 14/630,139 Published As 2016/0248676 A1 Now U.S. Pat. No. 10,313,243, filed Feb. 24, 2015, Intelligent Local Management of Data Stream Throttling in Secondary-Copy Operations.
(Continued)

*Primary Examiner* — Jeong S Park
(74) *Attorney, Agent, or Firm* — Knobbe, Martens, Olson & Bear LLP

(57) ABSTRACT

Local management of data stream throttling in data movement operations, such as secondary-copy operations in a storage management system, is disclosed. A local throttling manager may interoperate with co-resident data agents and/or a media agent executing on any given local computing device, whether a client computing device or a secondary storage computing device. The local throttling manager may allocate and manage the available bandwidth for various jobs and their constituent data streams—across the data agents and/or media agent. Bandwidth is allocated and re-allocated to data streams used by ongoing jobs, in response to new jobs starting and old jobs completing, without having to pause and restart ongoing jobs to accommodate bandwidth adjustments. The illustrative embodiment also provides local users with a measure of control over data streams—to suspend, pause, and/or resume them—independently from the centralized storage manager that manages the overall storage system.

17 Claims, 16 Drawing Sheets

Related U.S. Application Data division of application No. 14/630,139, filed on Feb. 24, 2015, now Pat. No. 10,313,243.

(51) Int. Cl.
  *G06F 3/06* (2006.01)
  *H04L 47/78* (2022.01)
  *H04L 47/52* (2022.01)

(52) U.S. Cl.
  CPC .......... *G06F 3/0646* (2013.01); *G06F 3/0659* (2013.01); *G06F 3/0647* (2013.01); *H04L 47/522* (2013.01); *H04L 47/781* (2013.01)

(58) Field of Classification Search
  CPC ...... G06F 3/0647; G06F 3/067; G06F 3/0613; G06F 3/065; G06F 3/0659
  See application file for complete search history.

(56) References Cited

U.S. PATENT DOCUMENTS

| | | | |
|---|---|---|---|
| 5,005,122 A | 4/1991 | Griffin et al. | |
| 5,093,912 A | 3/1992 | Dong et al. | |
| 5,133,065 A | 7/1992 | Cheffetz et al. | |
| 5,193,154 A | 3/1993 | Kitajima et al. | |
| 5,212,772 A | 5/1993 | Masters | |
| 5,226,157 A | 7/1993 | Nakano et al. | |
| 5,239,647 A | 8/1993 | Anglin et al. | |
| 5,241,668 A | 8/1993 | Eastridge et al. | |
| 5,241,670 A | 8/1993 | Eastridge et al. | |
| 5,276,860 A | 1/1994 | Fortier et al. | |
| 5,276,867 A | 1/1994 | Kenley et al. | |
| 5,287,500 A | 2/1994 | Stoppani, Jr. | |
| 5,321,816 A | 6/1994 | Rogan et al. | |
| 5,333,315 A | 7/1994 | Saether et al. | |
| 5,347,653 A | 9/1994 | Flynn et al. | |
| 5,410,700 A | 4/1995 | Fecteau et al. | |
| 5,448,724 A | 9/1995 | Hayashi | |
| 5,465,354 A | 11/1995 | Hirosawa et al. | |
| 5,491,810 A | 2/1996 | Allen | |
| 5,495,607 A | 2/1996 | Pisello et al. | |
| 5,504,873 A | 4/1996 | Martin et al. | |
| 5,544,345 A | 8/1996 | Carpenter et al. | |
| 5,544,347 A | 8/1996 | Yanai et al. | |
| 5,559,957 A | 9/1996 | Balk | |
| 5,619,644 A | 4/1997 | Crockett et al. | |
| 5,638,509 A | 6/1997 | Dunphy et al. | |
| 5,673,381 A | 9/1997 | Huai et al. | |
| 5,699,361 A | 12/1997 | Ding et al. | |
| 5,729,743 A | 3/1998 | Squibb | |
| 5,751,997 A | 5/1998 | Kullick et al. | |
| 5,758,359 A | 5/1998 | Saxon | |
| 5,761,677 A | 6/1998 | Senator et al. | |
| 5,764,972 A | 6/1998 | Crouse et al. | |
| 5,778,395 A | 7/1998 | Whiting et al. | |
| 5,812,398 A | 9/1998 | Nielsen | |
| 5,813,009 A | 9/1998 | Johnson et al. | |
| 5,813,017 A | 9/1998 | Morris | |
| 5,822,758 A | 10/1998 | Loper et al. | |
| 5,832,225 A | 11/1998 | Hacherl et al. | |
| 5,875,478 A | 2/1999 | Blumenau | |
| 5,887,134 A | 3/1999 | Ebrahim | |
| 5,901,327 A | 5/1999 | Ofek | |
| 5,909,594 A | 6/1999 | Ross et al. | |
| 5,924,102 A | 7/1999 | Perks | |
| 5,938,734 A | 8/1999 | Yao et al. | |
| 5,950,205 A | 9/1999 | Aviani, Jr. | |
| 5,974,563 A | 10/1999 | Beeler, Jr. | |
| 6,021,415 A | 2/2000 | Cannon et al. | |
| 6,026,414 A | 2/2000 | Anglin | |
| 6,052,735 A | 4/2000 | Ulrich et al. | |
| 6,076,148 A | 6/2000 | Kedem | |
| 6,088,745 A | 7/2000 | Bertagna et al. | |
| 6,094,416 A | 7/2000 | Ying | |
| 6,131,095 A | 10/2000 | Low et al. | |
| 6,131,190 A | 10/2000 | Sidwell | |
| 6,134,482 A | 10/2000 | Iwasaki | |
| 6,148,412 A | 11/2000 | Cannon et al. | |
| 6,154,787 A | 11/2000 | Urevig et al. | |
| 6,161,111 A | 12/2000 | Mutalik et al. | |
| 6,167,402 A | 12/2000 | Yeager | |
| 6,212,512 B1 | 4/2001 | Barney et al. | |
| 6,243,824 B1 | 6/2001 | Kakuta et al. | |
| 6,260,069 B1 | 7/2001 | Anglin | |
| 6,269,431 B1 | 7/2001 | Dunham | |
| 6,275,953 B1 | 8/2001 | Vahalia et al. | |
| 6,301,592 B1 | 10/2001 | Aoyama et al. | |
| 6,324,581 B1 | 11/2001 | Xu et al. | |
| 6,328,766 B1 | 12/2001 | Long | |
| 6,330,570 B1 | 12/2001 | Crighton | |
| 6,330,642 B1 | 12/2001 | Carteau | |
| 6,343,324 B1 | 1/2002 | Hubis et al. | |
| 6,349,312 B1 | 2/2002 | Fresko et al. | |
| RE37,601 E | 3/2002 | Eastridge et al. | |
| 6,356,801 B1 | 3/2002 | Goodman et al. | |
| 6,374,336 B1 | 4/2002 | Peters et al. | |
| 6,389,432 B1 | 5/2002 | Pothapragada et al. | |
| 6,418,478 B1 | 7/2002 | Ignatius et al. | |
| 6,421,711 B1 | 7/2002 | Blumenau et al. | |
| 6,487,561 B1 | 11/2002 | Ofek et al. | |
| 6,505,216 B1 | 1/2003 | Schutzman et al. | |
| 6,519,679 B2 | 2/2003 | Devireddy et al. | |
| 6,538,669 B1 | 3/2003 | Lagueux, Jr. et al. | |
| 6,539,425 B1 | 3/2003 | Steven et al. | |
| 6,542,972 B2 | 4/2003 | Ignatius et al. | |
| 6,553,369 B1 | 4/2003 | Guay et al. | |
| 6,557,052 B1 | 4/2003 | Kubo | |
| 6,564,228 B1 | 5/2003 | O'Connor | |
| 6,587,431 B1 | 7/2003 | Almulhem et al. | |
| 6,647,472 B2 | 11/2003 | Atkinson et al. | |
| 6,658,526 B2 | 12/2003 | Nguyen et al. | |
| 6,665,812 B1 | 12/2003 | Blumenau et al. | |
| 6,691,136 B2 | 2/2004 | Lee et al. | |
| 6,725,253 B1 | 4/2004 | Okano et al. | |
| 6,748,447 B1 | 6/2004 | Basani et al. | |
| 6,760,765 B1 | 7/2004 | Asai et al. | |
| 6,760,808 B2 | 7/2004 | Peters et al. | |
| 6,847,984 B1 | 1/2005 | Midgley et al. | |
| 6,952,828 B2 | 10/2005 | Greene | |
| 6,981,260 B2 | 12/2005 | Brenner et al. | |
| 6,983,317 B1 | 1/2006 | Bishop et al. | |
| 6,993,767 B2 | 1/2006 | Brenner et al. | |
| 7,010,626 B2 | 3/2006 | Kahle | |
| 7,047,309 B2 | 5/2006 | Baumann et al. | |
| 7,051,053 B2 | 5/2006 | Sinha | |
| 7,111,115 B2 | 9/2006 | Peters et al. | |
| 7,159,072 B2 | 1/2007 | Kitamura | |
| 7,161,907 B2 | 1/2007 | Mott | |
| 7,161,994 B2 | 1/2007 | Shah et al. | |
| 7,177,913 B2 | 2/2007 | Connor | |
| 7,177,992 B2 | 2/2007 | Kappler | |
| 7,188,367 B1 | 3/2007 | Edwards et al. | |
| 7,238,218 B2 | 7/2007 | Hepner et al. | |
| 7,251,691 B2 | 7/2007 | Boyd et al. | |
| 7,287,133 B2 | 10/2007 | Rowan et al. | |
| 7,315,923 B2 | 1/2008 | Retnamma et al. | |
| 7,406,473 B1 | 7/2008 | Brassow et al. | |
| 7,460,149 B1 | 12/2008 | Donovan et al. | |
| 7,475,210 B2 | 1/2009 | Yamada | |
| 7,487,309 B2 | 2/2009 | Peters et al. | |
| 7,499,715 B2 | 3/2009 | Carro et al. | |
| 7,539,745 B1 | 5/2009 | Wang et al. | |
| 7,546,484 B2 | 6/2009 | Sen et al. | |
| 7,551,623 B1 * | 6/2009 | Feroz ................ | H04L 41/5009 370/395.21 |
| 7,562,362 B1 | 7/2009 | Paquette et al. | |
| 7,606,967 B2 | 10/2009 | Konno | |
| 7,631,076 B2 | 12/2009 | Cannon et al. | |
| 7,636,801 B1 | 12/2009 | Kekre et al. | |
| 7,757,013 B1 | 7/2010 | Lawson et al. | |
| 7,793,000 B2 | 9/2010 | Rosenau | |
| 7,818,530 B2 | 10/2010 | Gold et al. | |
| 7,831,766 B2 | 11/2010 | Gokhale et al. | |
| 7,873,153 B2 | 1/2011 | Bukovec et al. | |

(56) References Cited

U.S. PATENT DOCUMENTS

| | | |
|---|---|---|
| 7,877,558 B2 | 1/2011 | Hughes et al. |
| 7,940,756 B1 | 5/2011 | Duffy et al. |
| 7,958,507 B2 | 6/2011 | Santos et al. |
| 7,975,061 B1 | 7/2011 | Gokhale et al. |
| 7,996,458 B2 | 8/2011 | Nielsen et al. |
| 8,141,078 B2 | 3/2012 | Abernethy, Jr. et al. |
| 8,205,205 B2 | 6/2012 | Franke |
| 8,281,035 B2 | 10/2012 | Farber et al. |
| 8,370,542 B2 | 2/2013 | Lu et al. |
| 8,402,322 B2 | 3/2013 | Herz et al. |
| 8,438,346 B2 | 5/2013 | Gold |
| 8,468,538 B2 | 6/2013 | Attarde et al. |
| 8,832,706 B2 | 9/2014 | Gokhale et al. |
| 8,849,955 B2 | 9/2014 | Prahlad et al. |
| 8,990,874 B2 | 3/2015 | Huang |
| 9,106,887 B1 | 8/2015 | Owen |
| 9,509,612 B1 | 11/2016 | Armorer et al. |
| 9,588,891 B2 | 3/2017 | Atkisson et al. |
| 9,639,286 B2 | 5/2017 | Vijayan et al. |
| 9,940,203 B1 | 4/2018 | Ghatnekar et al. |
| 10,298,680 B1 | 5/2019 | Thomas et al. |
| 10,313,243 B2 * | 6/2019 | Thanasekaran ....... G06F 3/0659 |
| 10,594,610 B2 | 3/2020 | Thanasekaran |
| 10,812,387 B2 * | 10/2020 | Thanasekaran ......... G06F 3/065 |
| 10,938,723 B2 * | 3/2021 | Thanasekaran ......... H04L 47/12 |
| 2002/0075844 A1 | 6/2002 | Hagen |
| 2002/0078174 A1 | 6/2002 | Sim et al. |
| 2002/0133491 A1 | 9/2002 | Sim et al. |
| 2002/0161860 A1 | 10/2002 | Godlin et al. |
| 2003/0140121 A1 | 7/2003 | Adams |
| 2003/0156589 A1 | 8/2003 | Suetsugu |
| 2004/0122832 A1 | 6/2004 | Heil |
| 2004/0186861 A1 | 9/2004 | Phatak |
| 2004/0205108 A1 | 10/2004 | Tanaka |
| 2004/0244001 A1 | 12/2004 | Haller et al. |
| 2004/0267838 A1 | 12/2004 | Curran et al. |
| 2005/0015641 A1 | 1/2005 | Alur et al. |
| 2005/0039051 A1 * | 2/2005 | Erofeev ................ H04L 63/029 726/4 |
| 2005/0210080 A1 | 9/2005 | Saika |
| 2005/0210472 A1 | 9/2005 | Accapadi et al. |
| 2005/0254519 A1 | 11/2005 | Beukema et al. |
| 2006/0085549 A1 | 4/2006 | Hasti et al. |
| 2006/0126559 A1 | 6/2006 | Jun et al. |
| 2006/0129615 A1 | 6/2006 | Derk et al. |
| 2006/0259725 A1 | 11/2006 | Saika et al. |
| 2007/0022148 A1 | 1/2007 | Akers et al. |
| 2007/0050778 A1 | 3/2007 | Lee et al. |
| 2007/0067595 A1 | 3/2007 | Ghose |
| 2008/0049786 A1 | 2/2008 | Ram et al. |
| 2008/0077358 A1 | 3/2008 | Marvasti |
| 2008/0117869 A1 | 5/2008 | Freen et al. |
| 2008/0195824 A1 | 8/2008 | Sadovsky et al. |
| 2008/0205442 A1 | 8/2008 | El Kolli |
| 2008/0235317 A1 | 9/2008 | Burgmans |
| 2008/0288947 A1 | 11/2008 | Gokhale et al. |
| 2009/0049175 A1 | 2/2009 | Finn |
| 2009/0164530 A1 | 6/2009 | Gilpin et al. |
| 2009/0172322 A1 | 7/2009 | Gilpin et al. |
| 2009/0210545 A1 | 8/2009 | Wright |
| 2009/0217030 A1 | 8/2009 | Premkumar et al. |
| 2009/0225762 A1 | 9/2009 | Davidson et al. |
| 2009/0276771 A1 | 11/2009 | Nickolov et al. |
| 2009/0320037 A1 | 12/2009 | Gokhale |
| 2010/0002723 A1 | 1/2010 | Kerr et al. |
| 2010/0094999 A1 * | 4/2010 | Rama ................... G06F 9/5011 709/225 |
| 2010/0146517 A1 | 6/2010 | Aschen et al. |
| 2010/0306267 A1 | 12/2010 | Zamkoff et al. |
| 2010/0333116 A1 | 12/2010 | Prahlad et al. |
| 2011/0137854 A1 | 6/2011 | Walter |
| 2011/0197198 A1 | 8/2011 | Kanso et al. |
| 2011/0238546 A1 | 9/2011 | Certain et al. |
| 2011/0258391 A1 | 10/2011 | Atkisson et al. |
| 2012/0026877 A1 | 2/2012 | Rajappan et al. |
| 2012/0084386 A1 | 4/2012 | Fu |
| 2012/0330892 A1 | 12/2012 | Benjamin et al. |
| 2013/0024581 A1 | 1/2013 | Myhill et al. |
| 2013/0204960 A1 * | 8/2013 | Ashok .................... G06F 3/061 709/213 |
| 2013/0268961 A1 | 10/2013 | Miles |
| 2013/0297819 A1 * | 11/2013 | Mittal .................. H04L 47/781 709/232 |
| 2013/0339537 A1 | 12/2013 | Joy |
| 2014/0187239 A1 | 7/2014 | Friend et al. |
| 2014/0304352 A1 | 10/2014 | Chaudhary et al. |
| 2015/0019727 A1 | 1/2015 | Parakh et al. |
| 2015/0199414 A1 | 7/2015 | Braginsky et al. |
| 2015/0249708 A1 | 9/2015 | Feinberg et al. |
| 2015/0278331 A1 | 10/2015 | Blea et al. |
| 2015/0326481 A1 | 11/2015 | Rector |
| 2016/0014229 A1 | 1/2016 | Seedorf et al. |
| 2016/0044100 A1 | 2/2016 | Tripathy et al. |
| 2016/0048408 A1 | 2/2016 | Madhu et al. |
| 2016/0323145 A1 | 11/2016 | Anderson et al. |
| 2016/0342618 A1 | 11/2016 | Watkins et al. |
| 2019/0238462 A1 | 8/2019 | Thanasekaran |
| 2019/0268409 A1 | 8/2019 | Thomas et al. |
| 2020/0177507 A1 * | 6/2020 | Thanasekaran ......... H04L 47/12 |
| 2020/0403920 A1 * | 12/2020 | Thanasekaran ....... G06F 3/0646 |

OTHER PUBLICATIONS

Thanasekaran, U.S. Appl. No. 16/370,659 Published As 2019/0230036 A1 Now U.S. Pat. No. 10,594,610, filed Mar. 29, 2019, Intelligent Local Management of Data Stream Throttling in Secondary-Copy Operations.

Thanasekaran, U.S. Appl. No. 16/375,725 Published As 2019/0238462 A1, filed Apr. 4, 2019, Intelligent Local Management of Data Stream Throttling in Secondary-Copy Operations.

Thanasekaran, U.S. Appl. No. 16/780,725 Published As 2020/0177507 A1, filed Feb. 3, 2020, Dynamic Management Of Effective Bandwidth Of Data Storage Operations.

* cited by examiner

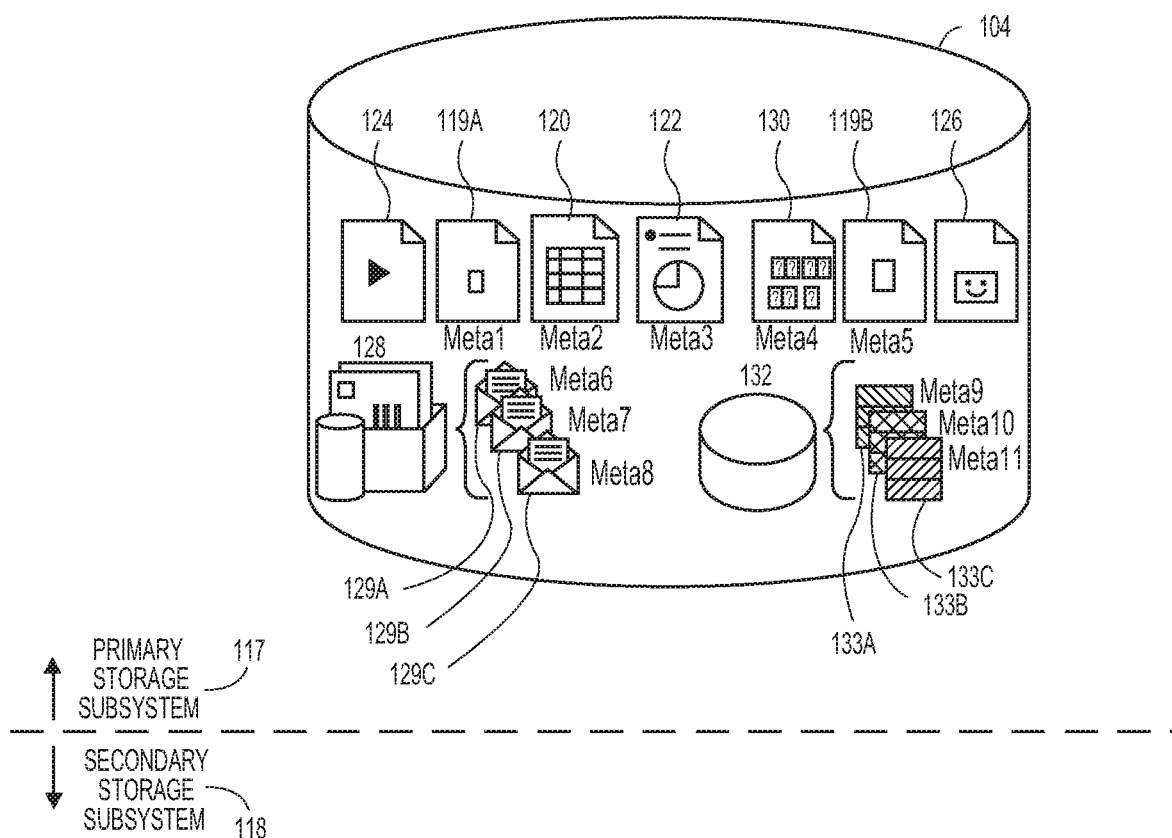
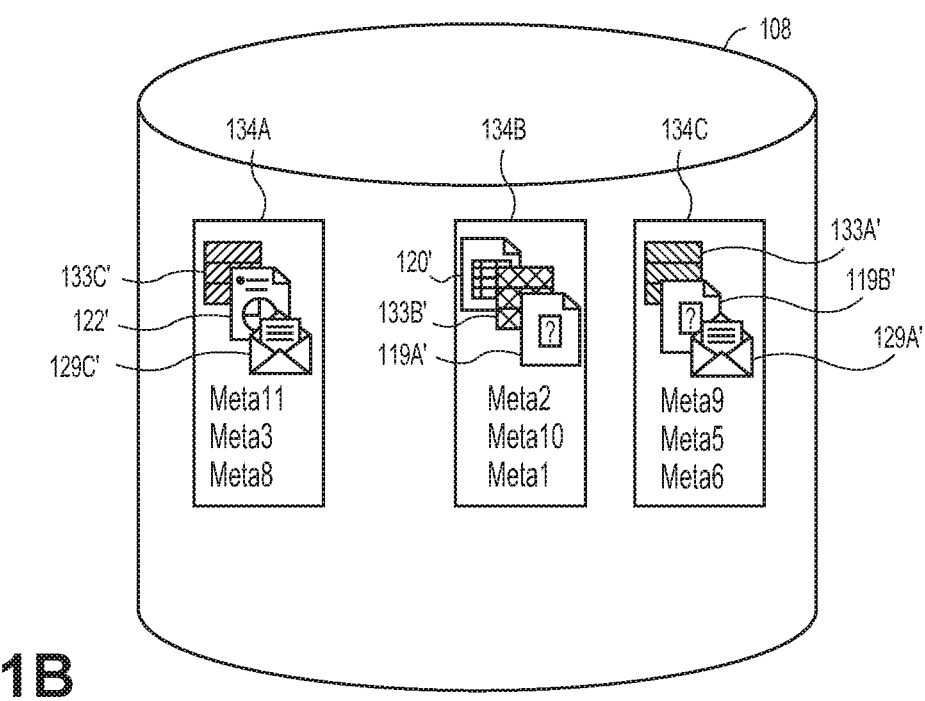
FIG. 1B

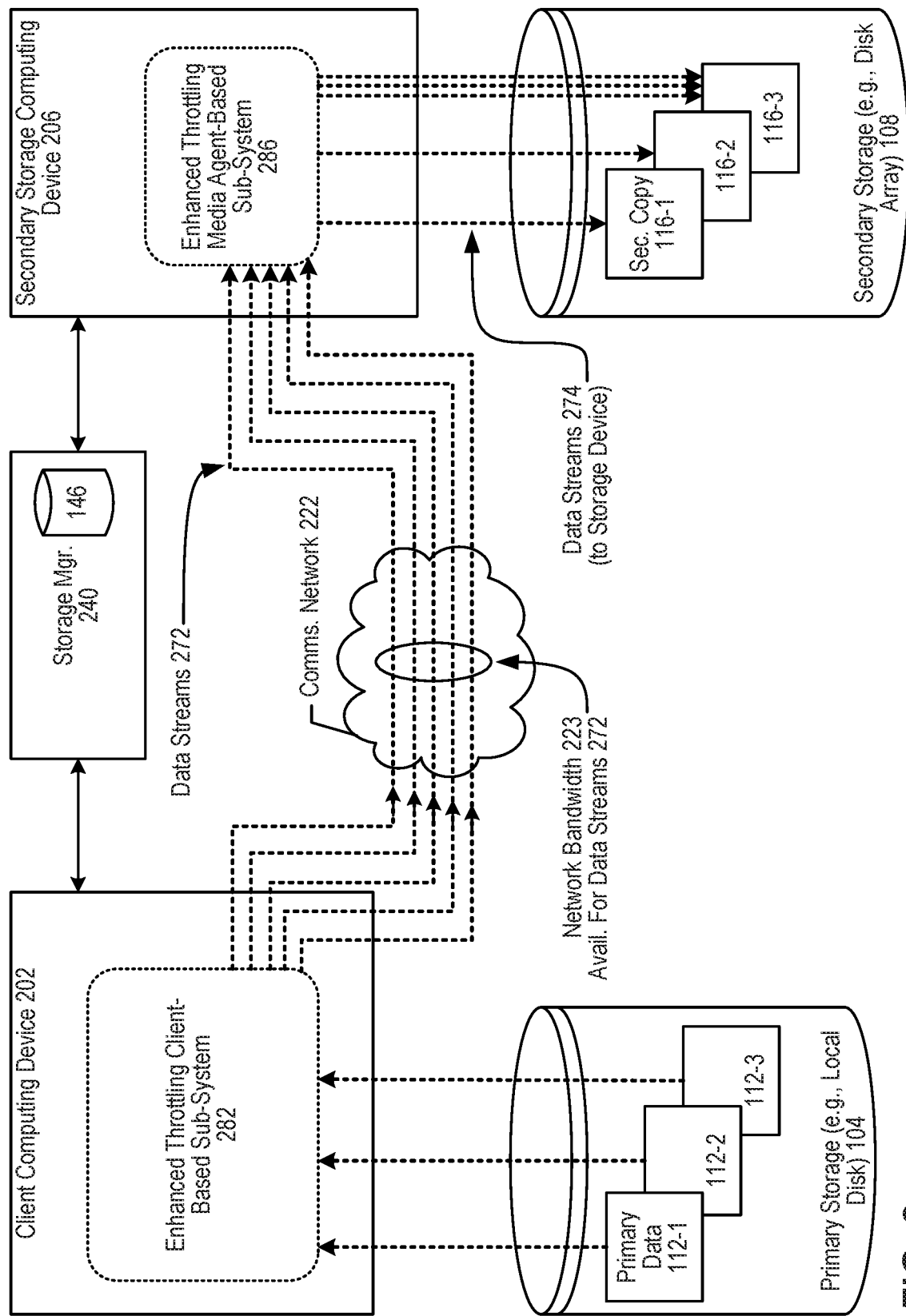
FIG. 2  System 200 For Intelligent Local Management Of Stream Throttling FIG. 5 Method 500 Based On Client-Based Sub-System 282

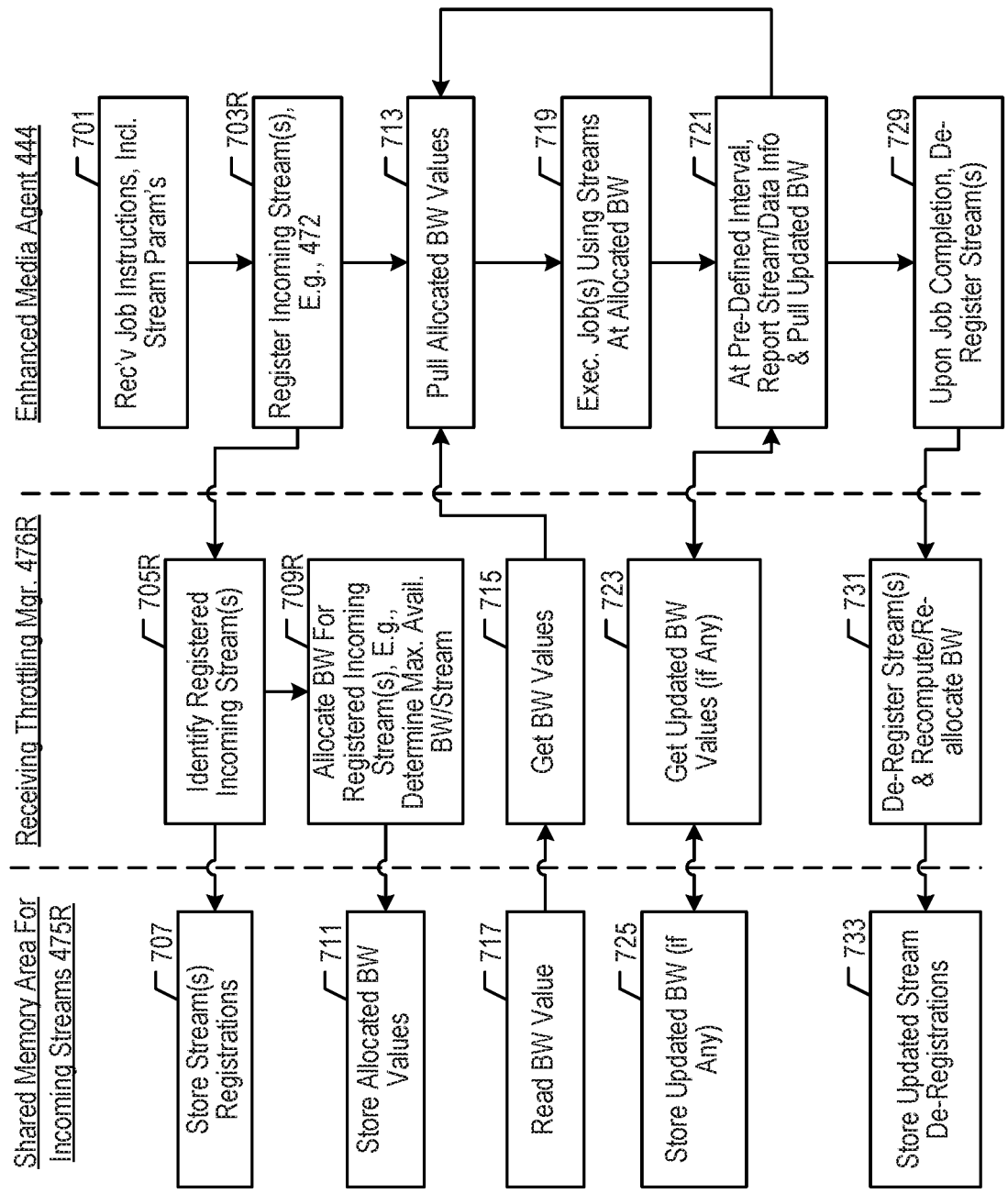

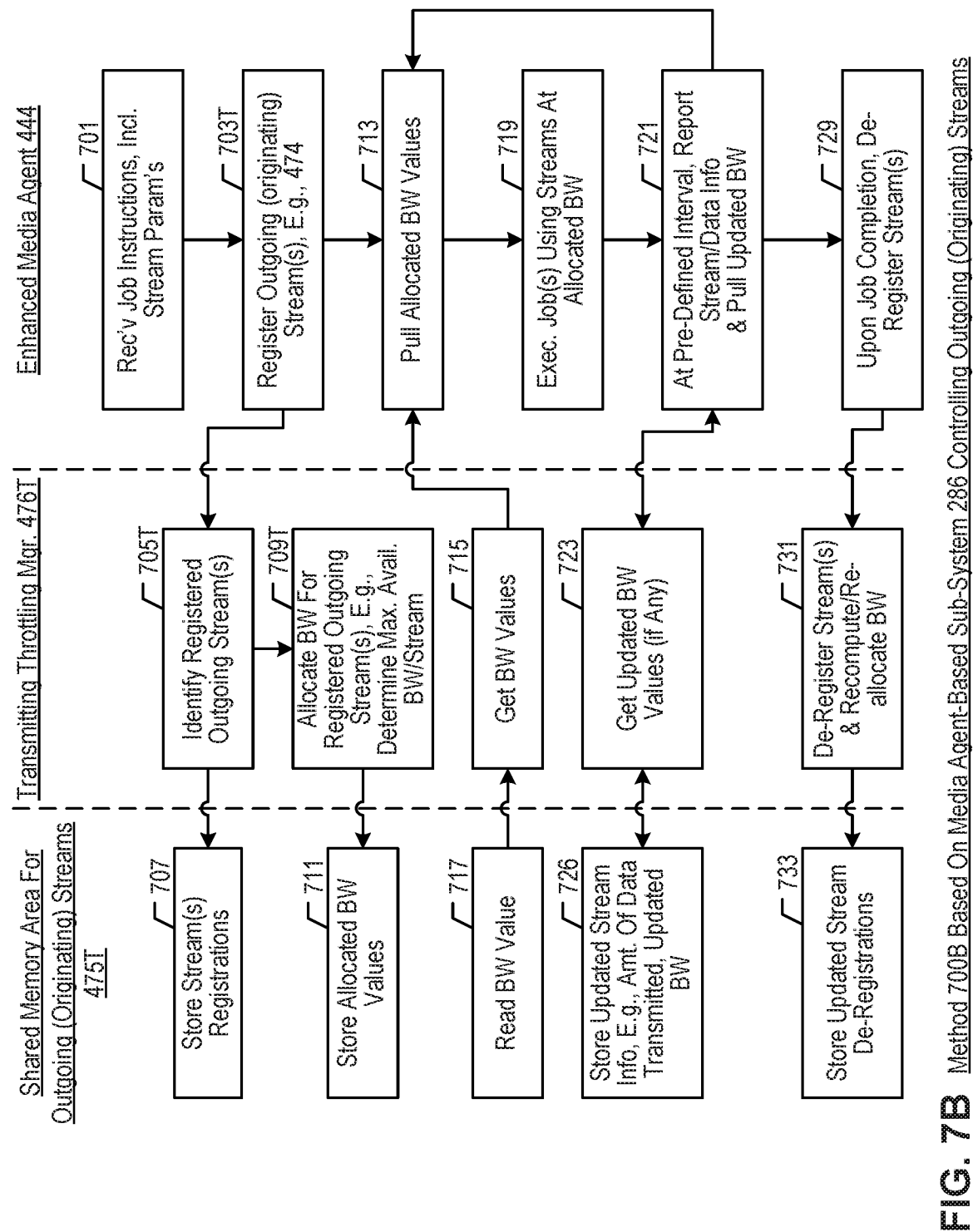

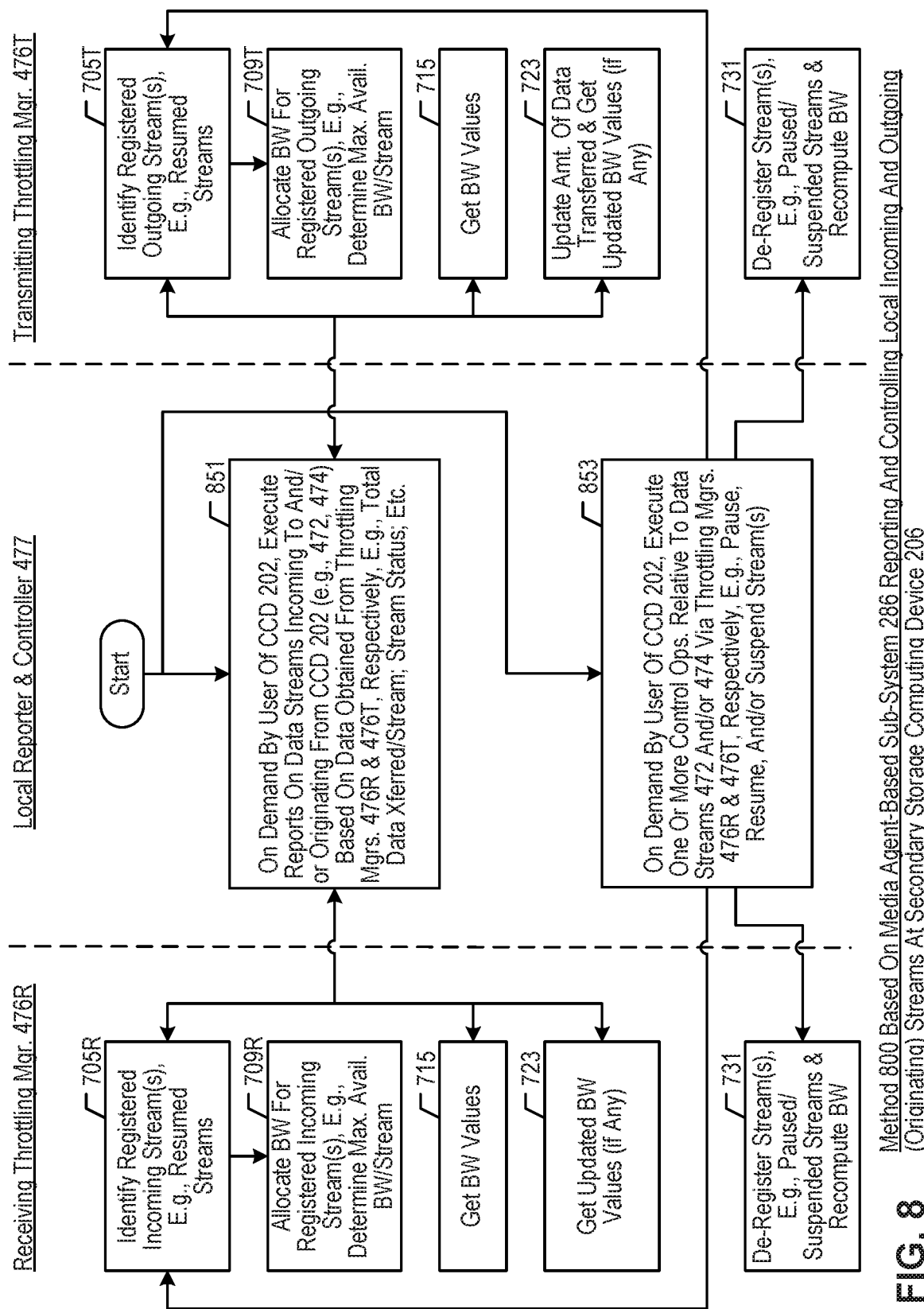
FIG. 8 Method 800 Based On Media Agent-Based Sub-System 286 Reporting And Controlling Local Incoming And Outgoing (Originating) Streams At Secondary Storage Computing Device 206

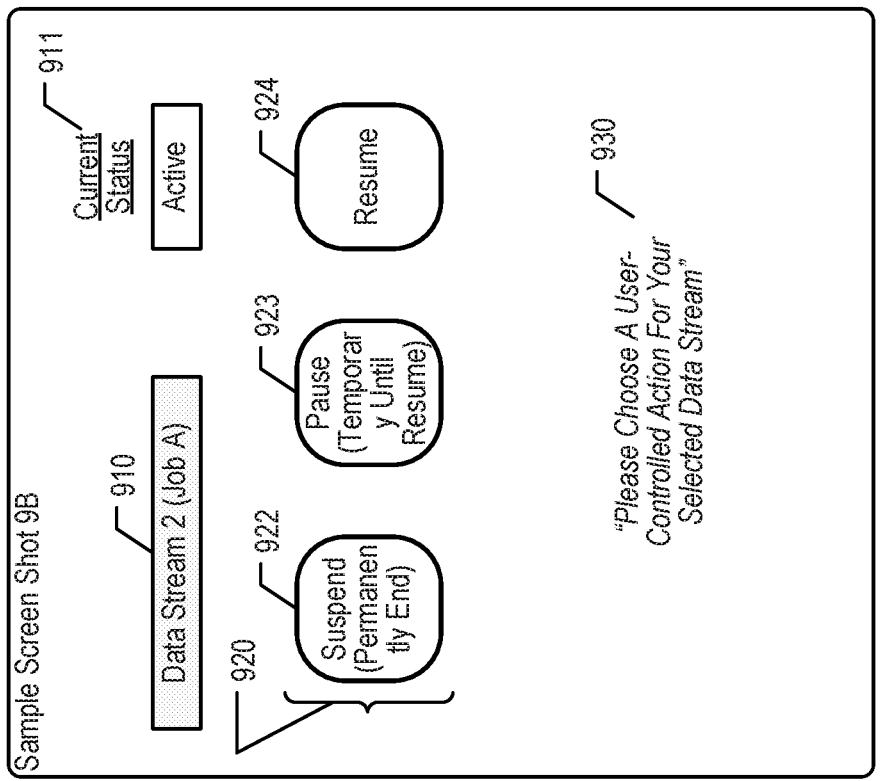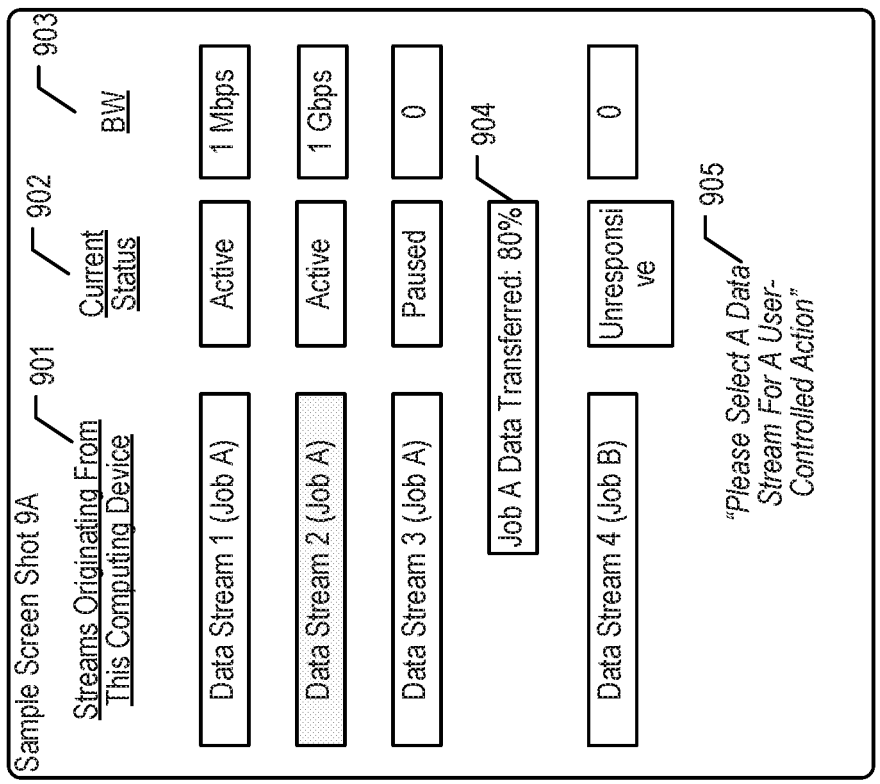
FIG. 9  Mock Screen Shots

INTELLIGENT LOCAL MANAGEMENT OF DATA STREAM THROTTLING IN SECONDARY-COPY OPERATIONS

INCORPORATION BY REFERENCE TO ANY PRIORITY APPLICATIONS

The present application is a continuation of U.S. patent application Ser. No. 16/375,725 filed on Apr. 4, 2019, which is a divisional application of U.S. patent application Ser. No. 14/630,139 filed on Feb. 24, 2015, which are hereby incorporated by reference herein in their entireties. Any and all applications for which a foreign or domestic priority claim is identified in the Application Data Sheet of the present application are hereby incorporated by reference under 37 CFR 1.57.

BACKGROUND

Businesses worldwide recognize the commercial value of their data and seek reliable, cost-effective ways to protect the information stored on their computer networks while minimizing impact on productivity. A company might back up critical computing systems such as databases, virtual machines, file servers, web servers, and so on as part of a daily, weekly, or monthly maintenance schedule. The company may similarly protect computing systems used by each of its employees, such as those used by an accounting department, marketing department, engineering department, and so forth. Given the rapidly expanding volume of data under management, innovative techniques for managing data growth also are sought-after. For instance, companies may implement migration techniques for moving data to lower cost storage over time. Throughout these efforts at moving data to protected and/or lower-cost storage, efficiency and minimal impact to infrastructure and production environments remains an important concern.

BRIEF DESCRIPTION OF THE DRAWINGS

FIG. 1B is a detailed view of a primary storage device, a secondary storage device, and some examples of primary data and secondary copy data.

FIG. 2 is a block diagram illustrating some salient portions of a system 200 for intelligent local management of data stream throttling in secondary-copy operations, according to an illustrative embodiment of the present invention.

FIG. 7A depicts some salient operations of a method 700A, based on enhanced throttling media agent-based sub-system 286 controlling incoming streams into secondary storage computing device 206, according to an illustrative embodiment of the present invention.

FIG. 7B depicts some salient operations of a method 700B, based on enhanced throttling media agent-based sub-system 286 controlling outgoing streams that originate from secondary storage computing device 206, according to an illustrative embodiment of the present invention.

FIG. 8 depicts some salient operations of a method 800, based on enhanced throttling media agent-based sub-system 286 reporting and controlling local incoming and outgoing data streams into/from secondary storage computing device 206, according to an illustrative embodiment of the present invention.

FIG. 9 depicts two mock screen shots, 9A and 9B, depicting an illustrative user interface that may be presented by local reporter and controller 377 and/or 477.

DETAILED DESCRIPTION

Figure 1A:
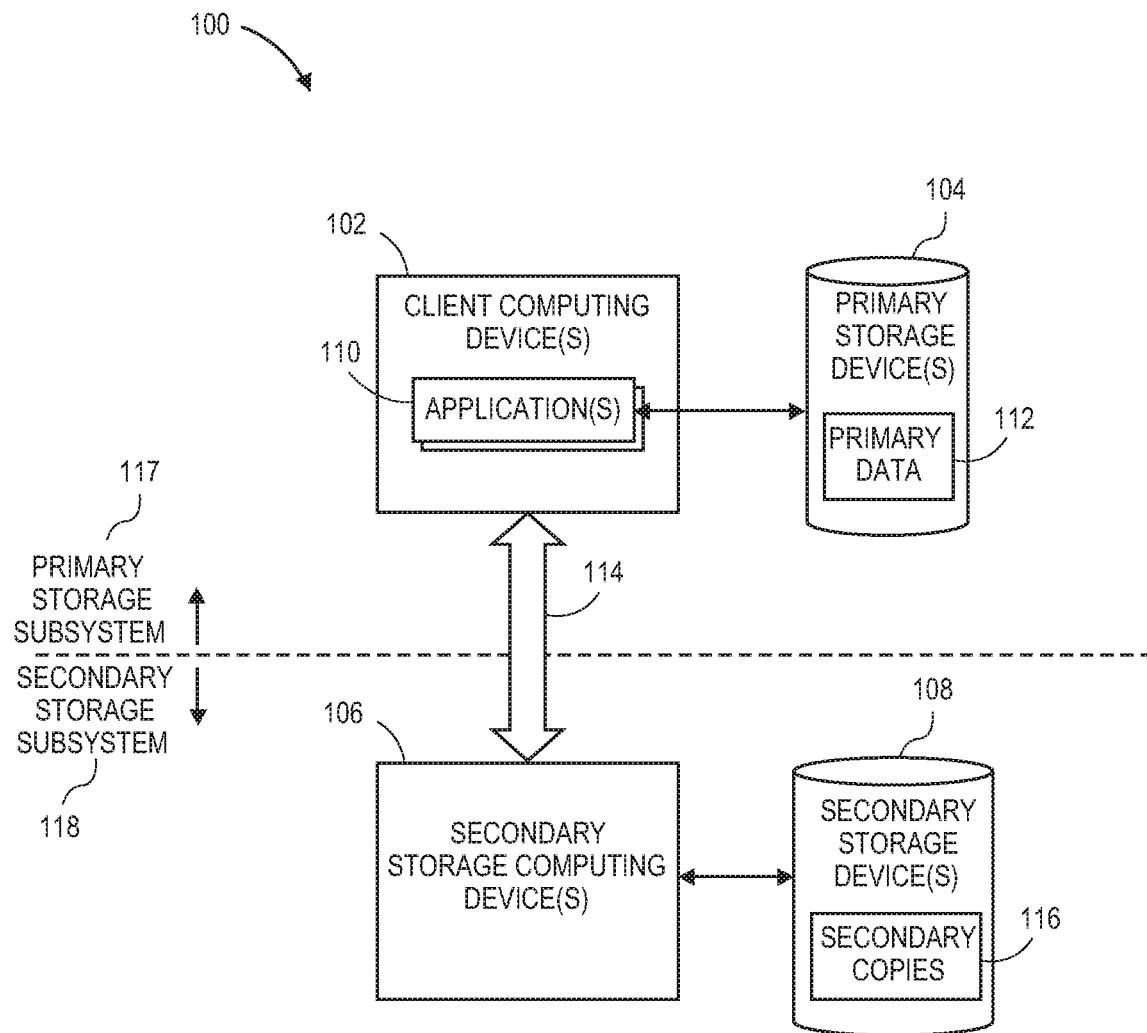
FIG. 1A is a block diagram illustrating an exemplary information management system.

Streamlining the movement of data is an ever-present need in data networks and particularly so when large amounts of data are to be moved and the frequency of data moves is relatively high, such as in information management systems that are directed at protecting data and managing data storage on an ongoing basis. One particular challenge that arises in data movement operations, e.g., backup, archiving, replication, etc., is the utilization of available bandwidth between the data source and the storage destination. Some prior art approaches designate priorities and bandwidths to certain data movement operations, but they fail to address changing conditions and consequently may waste bandwidth. For example, if a backup job ends and no longer requires its designated bandwidth, the prior art generally will continue to process existing jobs at their existing allocated bandwidths. Each job proceeds at its own pace according to pre-set parameters that may be centrally established and centrally controlled, e.g., by a storage manager. This prior art approach fails to take advantage of opportunities to productively utilize bandwidth and to manage it more closely based on local conditions.

The present inventor devised a solution that provides intelligent local management of data stream throttling in data movement operations such as secondary-copy operations in a storage management system. The illustrative embodiment dynamically allocates and re-allocates bandwidth to data streams used by ongoing jobs, in response to new jobs that start and old jobs that end, without having to pause and restart ongoing jobs to accommodate bandwidth adjustments. Thus, new jobs may add to bandwidth demand and may reduce bandwidth available to other ongoing jobs, whereas completed jobs (or non-responsive jobs that may have failed) may free up bandwidth to be re-allocated to other ongoing jobs. A local throttling manager may intelligently interoperate with co-resident data agents and/or a media agent executing on any given local computing device, whether a client computing device or a secondary storage computing device. The local throttling manager may allocate and manage the available bandwidth across various jobs and their constituent data streams—across the several data agents and/or media agent.

The illustrative embodiment also provides local users with a measure of control—independent from the centralized storage manager that manages the storage management system overall—over data streams that originate from and/or terminate to a local computing device, e.g., laptop, desktop, server, secondary storage computing device/storage controller. Thus, a local user, lacking system-wide administrative privileges and/or access to the storage manager, may observe job and data stream activity occurring at a given computing device, and may suspend, pause, and/or resume data streams that originate therefrom and/or terminate thereto. For example, a laptop user may wish to accelerate the backup of a database management system running on a laptop; accordingly, using the illustrative embodiment, the laptop user may determine what jobs are running and what data streams they use, and may then suspend and/or pause data streams used by another job that the user deems less important or less urgent at the moment, e.g., archiving a file system to secondary storage. The illustrative system will then re-allocate available bandwidth freed up by the suspended/paused data streams to the ongoing database backup job so that it may complete sooner. The user may then resume any paused streams.

Systems and methods are disclosed for intelligent local management of data stream throttling in data movement operations such as secondary-copy operations in a storage management system. Examples of such systems and methods are described in further detail in reference to FIGS. 2-9 and in the section labeled "INTELLIGENT LOCAL MANAGEMENT OF DATA STREAM THROTTLING IN SECONDARY-COPY OPERATIONS" below. Components and functionality for intelligent local management of data stream throttling may be configured and/or incorporated into information management systems such as those described herein in FIGS. 1A-1H.

Information Management System Overview

With the increasing importance of protecting and leveraging data, organizations simply cannot afford to take the risk of losing critical data. Moreover, runaway data growth and other modern realities make protecting and managing data an increasingly difficult task. There is therefore a need for efficient, powerful, and user-friendly solutions for protecting and managing data.

Depending on the size of the organization, there are typically many data production sources which are under the purview of tens, hundreds, or even thousands of employees or other individuals. In the past, individual employees were sometimes responsible for managing and protecting their data. A patchwork of hardware and software point solutions has been applied in other cases. These solutions were often provided by different vendors and had limited or no interoperability.

Certain embodiments described herein provide systems and methods capable of addressing these and other shortcomings of prior approaches by implementing unified, organization-wide information management. FIG. 1A shows one such information management system 100, which generally includes combinations of hardware and software configured to protect and manage data and metadata, which is generated and used by the various computing devices in information management system 100. The organization that employs the information management system 100 may be a corporation or other business entity, non-profit organization, educational institution, household, governmental agency, or the like.

Generally, the systems and associated components described herein may be compatible with and/or provide some or all of the functionality of the systems and corresponding components described in one or more of the following U.S. patents and patent application publications assigned to CommVault Systems, Inc., each of which is hereby incorporated in its entirety by reference herein:

U.S. Pat. No. 7,035,880, entitled "Modular Backup and Retrieval System Used in Conjunction With a Storage Area Network";

U.S. Pat. No. 7,107,298, entitled "System And Method For Archiving Objects In An Information Store";

U.S. Pat. No. 7,246,207, entitled "System and Method for Dynamically Performing Storage Operations in a Computer Network";

U.S. Pat. No. 7,315,923, entitled "System And Method For Combining Data Streams In Pipelined Storage Operations In A Storage Network";

U.S. Pat. No. 7,343,453, entitled "Hierarchical Systems and Methods for Providing a Unified View of Storage Information";

U.S. Pat. No. 7,395,282, entitled "Hierarchical Backup and Retrieval System";

U.S. Pat. No. 7,529,782, entitled "System and Methods for Performing a Snapshot and for Restoring Data";

U.S. Pat. No. 7,617,262, entitled "System and Methods for Monitoring Application Data in a Data Replication System";

U.S. Pat. No. 7,747,579, entitled "Metabase for Facilitating Data Classification";

U.S. Pat. No. 8,156,086, entitled "Systems And Methods For Stored Data Verification";

U.S. Pat. No. 8,170,995, entitled "Method and System for Offline Indexing of Content and Classifying Stored Data";

U.S. Pat. No. 8,229,954, entitled "Managing Copies Of Data";

U.S. Pat. No. 8,230,195, entitled "System And Method For Performing Auxiliary Storage Operations";

U.S. Pat. No. 8,285,681, entitled "Data Object Store and Server for a Cloud Storage Environment, Including Data Deduplication and Data Management Across Multiple Cloud Storage Sites";

U.S. Pat. No. 8,307,177, entitled "Systems And Methods For Management Of Virtualization Data";

U.S. Pat. No. 8,364,652, entitled "Content-Aligned, Block-Based Deduplication";

U.S. Pat. No. 8,578,120, entitled "Block-Level Single Instancing";

U.S. Pat. Pub. No. 2006/0224846, entitled "System and Method to Support Single Instance Storage Operations";

U.S. Pat. Pub. No. 2009/0319534, entitled "Application-Aware and Remote Single Instance Data Management";

U.S. Pat. Pub. No. 2012/0150818, entitled "Client-Side Repository in a Networked Deduplicated Storage System"; and U.S. Pat. Pub. No. 2012/0150826, entitled "Distributed Deduplicated Storage System".

The information management system 100 can include a variety of different computing devices. For instance, as will be described in greater detail herein, the information management system 100 can include one or more client computing devices 102 and secondary storage computing devices 106.

Computing devices can include, without limitation, one or more: workstations, personal computers, desktop computers, or other types of generally fixed computing systems such as mainframe computers and minicomputers. Other computing devices can include mobile or portable computing devices, such as one or more laptops, tablet computers, personal data assistants, mobile phones (such as smartphones), and other mobile or portable computing devices such as embedded computers, set top boxes, vehicle-mounted devices, wearable computers, etc. Computing devices can include servers, such as mail servers, file servers, database servers, and web servers.

In some cases, a computing device includes virtualized and/or cloud computing resources. For instance, one or more virtual machines may be provided to the organization by a third-party cloud service vendor. Or, in some embodiments, computing devices can include one or more virtual machine(s) running on a physical host computing device (or "host machine") operated by the organization. As one example, the organization may use one virtual machine as a database server and another virtual machine as a mail server, both virtual machines operating on the same host machine.

A virtual machine includes an operating system and associated virtual resources, and is hosted simultaneously with another operating system on a physical host computer (or host machine). A hypervisor (typically software, and also known in the art as a virtual machine monitor or a virtual machine manager or "VMM") sits between the virtual machine and the hardware of the physical host machine. One example of hypervisor as virtualization software is ESX Server, by VMware, Inc. of Palo Alto, Calif.; other examples include Microsoft Virtual Server and Microsoft Windows Server Hyper-V, both by Microsoft Corporation of Redmond, Wash., and Sun xVM by Oracle America Inc. of Santa Clara, Calif. In some embodiments, the hypervisor may be firmware or hardware or a combination of software and/or firmware and/or hardware.

The hypervisor provides to each virtual operating system virtual resources, such as a virtual processor, virtual memory, a virtual network device, and a virtual disk. Each virtual machine has one or more virtual disks. The hypervisor typically stores the data of virtual disks in files on the file system of the physical host machine, called virtual machine disk files (in the case of VMware virtual servers) or virtual hard disk image files (in the case of Microsoft virtual servers). For example, VMware's ESX Server provides the Virtual Machine File System (VMFS) for the storage of virtual machine disk files. A virtual machine reads data from and writes data to its virtual disk much the same way that an actual physical machine reads data from and writes data to an actual disk.

Examples of techniques for implementing information management techniques in a cloud computing environment are described in U.S. Pat. No. 8,285,681, which is incorporated by reference herein. Examples of techniques for implementing information management techniques in a virtualized computing environment are described in U.S. Pat. No. 8,307,177, also incorporated by reference herein.

The information management system 100 can also include a variety of storage devices, including primary storage devices 104 and secondary storage devices 108, for example. Storage devices can generally be of any suitable type including, without limitation, disk drives, hard-disk arrays, semiconductor memory (e.g., solid state storage devices), network attached storage (NAS) devices, tape libraries or other magnetic, non-tape storage devices, optical media storage devices, DNA/RNA-based memory technology, combinations of the same, and the like. In some embodiments, storage devices can form part of a distributed file system. In some cases, storage devices are provided in a cloud (e.g., a private cloud or one operated by a third-party vendor). A storage device in some cases comprises a disk array or portion thereof.

The illustrated information management system 100 includes one or more client computing device 102 having at least one application 110 executing thereon, and one or more primary storage devices 104 storing primary data 112. The client computing device(s) 102 and the primary storage devices 104 may generally be referred to in some cases as a primary storage subsystem 117. A computing device in an information management system 100 that has a data agent 142 installed and operating on it is generally referred to as a client computing device 102 (or, in the context of a component of the information management system 100 simply as a "client").

Depending on the context, the term "information management system" can refer to generally all of the illustrated hardware and software components. Or, in other instances, the term may refer to only a subset of the illustrated components.

For instance, in some cases, the information management system 100 generally refers to a combination of specialized components used to protect, move, manage, manipulate, analyze, and/or process data and metadata generated by the client computing devices 102. However, the information management system 100 in some cases does not include the underlying components that generate and/or store the primary data 112, such as the client computing devices 102 themselves, the applications 110 and operating system operating on the client computing devices 102, and the primary storage devices 104. As an example, "information management system" may sometimes refer to one or more of the following components and corresponding data structures: storage managers, data agents, and media agents. These components will be described in further detail below.

Client Computing Devices

There are typically a variety of sources in an organization that produce data to be protected and managed. As just one illustrative example, in a corporate environment such data sources can be employee workstations and company servers such as a mail server, a web server, a database server, a transaction server, or the like. In the information management system 100, the data generation sources include the one or more client computing devices 102.

The client computing devices 102 may include any of the types of computing devices described above, without limitation, and in some cases the client computing devices 102 are associated with one or more users and/or corresponding user accounts, of employees or other individuals.

The information management system 100 generally addresses and handles the data management and protection needs for the data generated by the client computing devices 102. However, the use of this term does not imply that the client computing devices 102 cannot be "servers" in other respects. For instance, a particular client computing device 102 may act as a server with respect to other devices, such as other client computing devices 102. As just a few examples, the client computing devices 102 can include mail servers, file servers, database servers, and web servers.

Each client computing device 102 may have one or more applications 110 (e.g., software applications) executing thereon which generate and manipulate the data that is to be protected from loss and managed. The applications 110 generally facilitate the operations of an organization (or multiple affiliated organizations), and can include, without limitation, mail server applications (e.g., Microsoft Exchange Server), file server applications, mail client applications (e.g., Microsoft Exchange Client), database applications (e.g., SQL, Oracle, SAP, Lotus Notes Database), word processing applications (e.g., Microsoft Word), spreadsheet applications, financial applications, presentation applications, graphics and/or video applications, browser applications, mobile applications, entertainment applications, and so on.

The client computing devices 102 can have at least one operating system (e.g., Microsoft Windows, Mac OS X, iOS, IBM z/OS, Linux, other Unix-based operating systems, etc.) installed thereon, which may support or host one or more file systems and other applications 110.

The client computing devices 102 and other components in information management system 100 can be connected to one another via one or more communication pathways 114. For example, a first communication pathway 114 may connect (or communicatively couple) client computing device 102 and secondary storage computing device 106; a second communication pathway 114 may connect storage manager 140 and client computing device 102; and a third communication pathway 114 may connect storage manager 140 and secondary storage computing device 106, etc. (see, e.g., FIG. 1A and FIG. 1C). The communication pathways 114 can include one or more networks or other connection types including one or more of the following, without limitation: the Internet, a wide area network (WAN), a local area network (LAN), a Storage Area Network (SAN), a Fibre Channel connection, a Small Computer System Interface (SCSI) connection, a virtual private network (VPN), a token ring or TCP/IP based network, an intranet network, a point-to-point link, a cellular network, a wireless data transmission system, a two-way cable system, an interactive kiosk network, a satellite network, a broadband network, a baseband network, a neural network, a mesh network, an ad hoc network, other appropriate wired, wireless, or partially wired/wireless computer or telecommunications networks, combinations of the same or the like. The communication pathways 114 in some cases may also include application programming interfaces (APIs) including, e.g., cloud service provider APIs, virtual machine management APIs, and hosted service provider APIs. The underlying infrastructure of communication paths 114 may be wired and/or wireless, analog and/or digital, or any combination thereof; and the facilities used may be private, public, third-party provided, or any combination thereof, without limitation.

Primary Data and Exemplary Primary Storage Devices

Primary data 112 according to some embodiments is production data or other "live" data generated by the operating system and/or applications 110 operating on a client computing device 102. The primary data 112 is generally stored on the primary storage device(s) 104 and is organized via a file system supported by the client computing device 102. For instance, the client computing device(s) 102 and corresponding applications 110 may create, access, modify, write, delete, and otherwise use primary data 112. In some cases, some or all of the primary data 112 can be stored in cloud storage resources (e.g., primary storage device 104 may be a cloud-based resource).

Primary data 112 is generally in the native format of the source application 110. According to certain aspects, primary data 112 is an initial or first (e.g., created before any other copies or before at least one other copy) stored copy of data generated by the source application 110. Primary data 112 in some cases is created substantially directly from data generated by the corresponding source applications 110.

The primary storage devices 104 storing the primary data 112 may be relatively fast and/or expensive technology (e.g., a disk drive, a hard-disk array, solid state memory, etc.). In addition, primary data 112 may be highly changeable and/or may be intended for relatively short term retention (e.g., hours, days, or weeks).

According to some embodiments, the client computing device 102 can access primary data 112 from the primary storage device 104 by making conventional file system calls via the operating system. Primary data 112 may include structured data (e.g., database files), unstructured data (e.g., documents), and/or semi-structured data. Some specific examples are described below with respect to FIG. 1B.

It can be useful in performing certain tasks to organize the primary data 112 into units of different granularities. In general, primary data 112 can include files, directories, file system volumes, data blocks, extents, or any other hierarchies or organizations of data objects. As used herein, a "data object" can refer to both (1) any file that is currently addressable by a file system or that was previously addressable by the file system (e.g., an archive file) and (2) a subset of such a file (e.g., a data block).

As will be described in further detail, it can also be useful in performing certain functions of the information management system 100 to access and modify metadata within the primary data 112. Metadata generally includes information about data objects or characteristics associated with the data objects. For simplicity herein, it is to be understood that, unless expressly stated otherwise, any reference to primary data 112 generally also includes its associated metadata, but references to the metadata do not include the primary data.

Metadata can include, without limitation, one or more of the following: the data owner (e.g., the client or user that generates the data), the last modified time (e.g., the time of the most recent modification of the data object), a data object name (e.g., a file name), a data object size (e.g., a number of bytes of data), information about the content (e.g., an indication as to the existence of a particular search term), user-supplied tags, to/from information for email (e.g., an email sender, recipient, etc.), creation date, file type (e.g., format or application type), last accessed time, application type (e.g., type of application that generated the data object), location/network (e.g., a current, past or future location of the data object and network pathways to/from the data object), geographic location (e.g., GPS coordinates), frequency of change (e.g., a period in which the data object is modified), business unit (e.g., a group or department that generates, manages or is otherwise associated with the data object), aging information (e.g., a schedule, such as a time period, in which the data object is migrated to secondary or long term storage), boot sectors, partition layouts, file location within a file folder directory structure, user permissions, owners, groups, access control lists [ACLs]), system metadata (e.g., registry information), combinations of the same or other similar information related to the data object.

In addition to metadata generated by or related to file systems and operating systems, some of the applications 110 and/or other components of the information management system 100 maintain indices of metadata for data objects, e.g., metadata associated with individual email messages. Thus, each data object may be associated with corresponding metadata. The use of metadata to perform classification and other functions is described in greater detail below.

Each of the client computing devices 102 are generally associated with and/or in communication with one or more of the primary storage devices 104 storing corresponding primary data 112. A client computing device 102 may be considered to be "associated with" or "in communication with" a primary storage device 104 if it is capable of one or more of: routing and/or storing data (e.g., primary data 112) to the particular primary storage device 104, coordinating the routing and/or storing of data to the particular primary storage device 104, retrieving data from the particular primary storage device 104, coordinating the retrieval of data from the particular primary storage device 104, and modifying and/or deleting data retrieved from the particular primary storage device 104.

The primary storage devices 104 can include any of the different types of storage devices described above, or some other kind of suitable storage device. The primary storage devices 104 may have relatively fast I/O times and/or are relatively expensive in comparison to the secondary storage devices 108. For example, the information management system 100 may generally regularly access data and metadata stored on primary storage devices 104, whereas data and metadata stored on the secondary storage devices 108 is accessed relatively less frequently.

Primary storage device 104 may be dedicated or shared. In some cases, each primary storage device 104 is dedicated to an associated client computing device 102. For instance, a primary storage device 104 in one embodiment is a local disk drive of a corresponding client computing device 102. In other cases, one or more primary storage devices 104 can be shared by multiple client computing devices 102, e.g., via a network such as in a cloud storage implementation. As one example, a primary storage device 104 can be a disk array shared by a group of client computing devices 102, such as one of the following types of disk arrays: EMC Clariion, EMC Symmetrix, EMC Celerra, Dell EqualLogic, IBM XIV, NetApp FAS, HP EVA, and HP 3PAR.

The information management system 100 may also include hosted services (not shown), which may be hosted in some cases by an entity other than the organization that employs the other components of the information management system 100. For instance, the hosted services may be provided by various online service providers to the organization. Such service providers can provide services including social networking services, hosted email services, or hosted productivity applications or other hosted applications). Hosted services may include software-as-a-service (SaaS), platform-as-a-service (PaaS), application service providers (ASPs), cloud services, or other mechanisms for delivering functionality via a network. As it provides services to users, each hosted service may generate additional data and metadata under management of the information management system 100, e.g., as primary data 112. In some cases, the hosted services may be accessed using one of the applications 110. As an example, a hosted mail service may be accessed via browser running on a client computing device 102. The hosted services may be implemented in a variety of computing environments. In some cases, they are implemented in an environment having a similar arrangement to the information management system 100, where various physical and logical components are distributed over a network.

Secondary Copies and Exemplary Secondary Storage Devices

The primary data 112 stored on the primary storage devices 104 may be compromised in some cases, such as when an employee deliberately or accidentally deletes or overwrites primary data 112 during their normal course of work. Or the primary storage devices 104 can be damaged, lost, or otherwise corrupted. For recovery and/or regulatory compliance purposes, it is therefore useful to generate copies of the primary data 112. Accordingly, the information management system 100 includes one or more secondary storage computing devices 106 and one or more secondary storage devices 108 configured to create and store one or more secondary copies 116 of the primary data 112 and associated metadata. The secondary storage computing devices 106 and the secondary storage devices 108 may sometimes be referred to as a secondary storage subsystem 118.

Creation of secondary copies 116 can help in search and analysis efforts and meet other information management goals, such as: restoring data and/or metadata if an original version (e.g., of primary data 112) is lost (e.g., by deletion, corruption, or disaster); allowing point-in-time recovery; complying with regulatory data retention and electronic discovery (e-discovery) requirements; reducing utilized storage capacity; facilitating organization and search of data; improving user access to data files across multiple computing devices and/or hosted services; and implementing data retention policies.

The client computing devices 102 access or receive primary data 112 and communicate the data, e.g., over one or more communication pathways 114, for storage in the secondary storage device(s) 108.

A secondary copy 116 can comprise a separate stored copy of application data that is derived from one or more earlier-created, stored copies (e.g., derived from primary data 112 or another secondary copy 116). Secondary copies 116 can include point-in-time data, and may be intended for relatively long-term retention (e.g., weeks, months or years), before some or all of the data is moved to other storage or is discarded.

In some cases, a secondary copy 116 is a copy of application data created and stored subsequent to at least one other stored instance (e.g., subsequent to corresponding primary data 112 or to another secondary copy 116), in a different storage device than at least one previous stored copy, and/or remotely from at least one previous stored copy. In some other cases, secondary copies can be stored in the same storage device as primary data 112 and/or other previously stored copies. For example, in one embodiment a disk array capable of performing hardware snapshots stores primary data 112 and creates and stores hardware snapshots of the primary data 112 as secondary copies 116. Secondary copies 116 may be stored in relatively slow and/or low cost storage (e.g., magnetic tape). A secondary copy 116 may be stored in a backup or archive format, or in some other format different than the native source application format or other primary data format.

In some cases, secondary copies 116 are indexed so users can browse and restore at another point in time. After creation of a secondary copy 116 representative of certain primary data 112, a pointer or other location indicia (e.g., a stub) may be placed in primary data 112, or be otherwise associated with primary data 112 to indicate the current location on the secondary storage device(s) 108 of secondary copy 116.

Since an instance of a data object or metadata in primary data 112 may change over time as it is modified by an application 110 (or hosted service or the operating system), the information management system 100 may create and manage multiple secondary copies 116 of a particular data object or metadata, each representing the state of the data object in primary data 112 at a particular point in time. Moreover, since an instance of a data object in primary data 112 may eventually be deleted from the primary storage device 104 and the file system, the information management system 100 may continue to manage point-in-time representations of that data object, even though the instance in primary data 112 no longer exists.

For virtualized computing devices the operating system and other applications 110 of the client computing device(s) 102 may execute within or under the management of virtualization software (e.g., a VMM), and the primary storage device(s) 104 may comprise a virtual disk created on a physical storage device. The information management system 100 may create secondary copies 116 of the files or other data objects in a virtual disk file and/or secondary copies 116 of the entire virtual disk file itself (e.g., of an entire .vmdk file).

Secondary copies 116 may be distinguished from corresponding primary data 112 in a variety of ways, some of which will now be described. First, as discussed, secondary copies 116 can be stored in a different format (e.g., backup, archive, or other non-native format) than primary data 112. For this or other reasons, secondary copies 116 may not be directly useable by the applications 110 of the client computing device 102, e.g., via standard system calls or otherwise without modification, processing, or other intervention by the information management system 100.

Secondary copies 116 are also in some embodiments stored on a secondary storage device 108 that is inaccessible to the applications 110 running on the client computing devices 102 (and/or hosted services). Some secondary copies 116 may be "offline copies," in that they are not readily available (e.g., not mounted to tape or disk). Offline copies can include copies of data that the information management system 100 can access without human intervention (e.g., tapes within an automated tape library, but not yet mounted in a drive), and copies that the information management system 100 can access only with at least some human intervention (e.g., tapes located at an offsite storage site).

The Use of Intermediate Devices for Creating Secondary Copies

Creating secondary copies can be a challenging task. For instance, there can be hundreds or thousands of client computing devices 102 continually generating large volumes of primary data 112 to be protected. Also, there can be significant overhead involved in the creation of secondary copies 116. Moreover, secondary storage devices 108 may be special purpose components, and interacting with them can require specialized intelligence.

In some cases, the client computing devices 102 interact directly with the secondary storage device 108 to create the secondary copies 116. However, in view of the factors described above, this approach can negatively impact the ability of the client computing devices 102 to serve the applications 110 and produce primary data 112. Further, the client computing devices 102 may not be optimized for interaction with the secondary storage devices 108.

Thus, in some embodiments, the information management system 100 includes one or more software and/or hardware components which generally act as intermediaries between the client computing devices 102 and the secondary storage devices 108. In addition to off-loading certain responsibilities from the client computing devices 102, these intermediate components can provide other benefits. For instance, as discussed further below with respect to FIG. 1D, distributing some of the work involved in creating secondary copies 116 can enhance scalability.

The intermediate components can include one or more secondary storage computing devices 106 as shown in FIG. 1A and/or one or more media agents, which can be software modules operating on corresponding secondary storage computing devices 106 (or other appropriate computing devices). Media agents are discussed below (e.g., with respect to FIGS. 1C-1E).

The secondary storage computing device(s) 106 can comprise any of the computing devices described above, without limitation. In some cases, the secondary storage computing device(s) 106 include specialized hardware and/or software componentry for interacting with the secondary storage devices 108.

To create a secondary copy 116 involving the copying of data from the primary storage subsystem 117 to the secondary storage subsystem 118, the client computing device 102 in some embodiments communicates the primary data 112 to be copied (or a processed version thereof) to the designated secondary storage computing device 106, via the communication pathway 114. The secondary storage computing device 106 in turn conveys the received data (or a processed version thereof) to the secondary storage device 108. In some such configurations, the communication pathway 114 between the client computing device 102 and the secondary storage computing device 106 comprises a portion of a LAN, WAN or SAN. In other cases, at least some client computing devices 102 communicate directly with the secondary storage devices 108 (e.g., via Fibre Channel or SCSI connections). In some other cases, one or more secondary copies 116 are created from existing secondary copies, such as in the case of an auxiliary copy operation, described in greater detail below.

Exemplary Primary Data and an Exemplary Secondary Copy

FIG. 1B is a detailed view showing some specific examples of primary data stored on the primary storage device(s) 104 and secondary copy data stored on the secondary storage device(s) 108, with other components in the system removed for the purposes of illustration. Stored on the primary storage device(s) 104 are primary data objects including word processing documents 119A-B, spreadsheets 120, presentation documents 122, video files 124, image files 126, email mailboxes 128 (and corresponding email messages 129A-C), html/xml or other types of markup language files 130, databases 132 and corresponding tables or other data structures 133A-133C).

Some or all primary data objects are associated with corresponding metadata (e.g., "Meta1-11"), which may include file system metadata and/or application specific metadata. Stored on the secondary storage device(s) 108 are secondary copy data objects 134A-C which may include copies of or otherwise represent corresponding primary data objects and metadata.

As shown, the secondary copy data objects 134A-C can individually represent more than one primary data object. For example, secondary copy data object 134A represents three separate primary data objects 133C, 122, and 129C (represented as 133C', 122', and 129C', respectively, and accompanied by the corresponding metadata Meta11, Meta3, and Meta8, respectively). Moreover, as indicated by the prime mark ('), a secondary copy object may store a representation of a primary data object and/or metadata differently than the original format, e.g., in a compressed, encrypted, deduplicated, or other modified format. Likewise, secondary data object 1346 represents primary data objects 120, 1336, and 119A as 120', 1336', and 119A', respectively and accompanied by corresponding metadata Meta2, Meta10, and Meta1, respectively. Also, secondary data object 134C represents primary data objects 133A, 119, and 129A as 133A', 119', and 129A', respectively, accompanied by corresponding metadata Meta9, Meta5, and Meta6, respectively.

Exemplary Information Management System Architecture

The information management system 100 can incorporate a variety of different hardware and software components, which can in turn be organized with respect to one another in many different configurations, depending on the embodiment. There are critical design choices involved in specifying the functional responsibilities of the components and the role of each component in the information management system 100. For instance, as will be discussed, such design choices can impact performance as well as the adaptability of the information management system 100 to data growth or other changing circumstances.

Figure 1C:
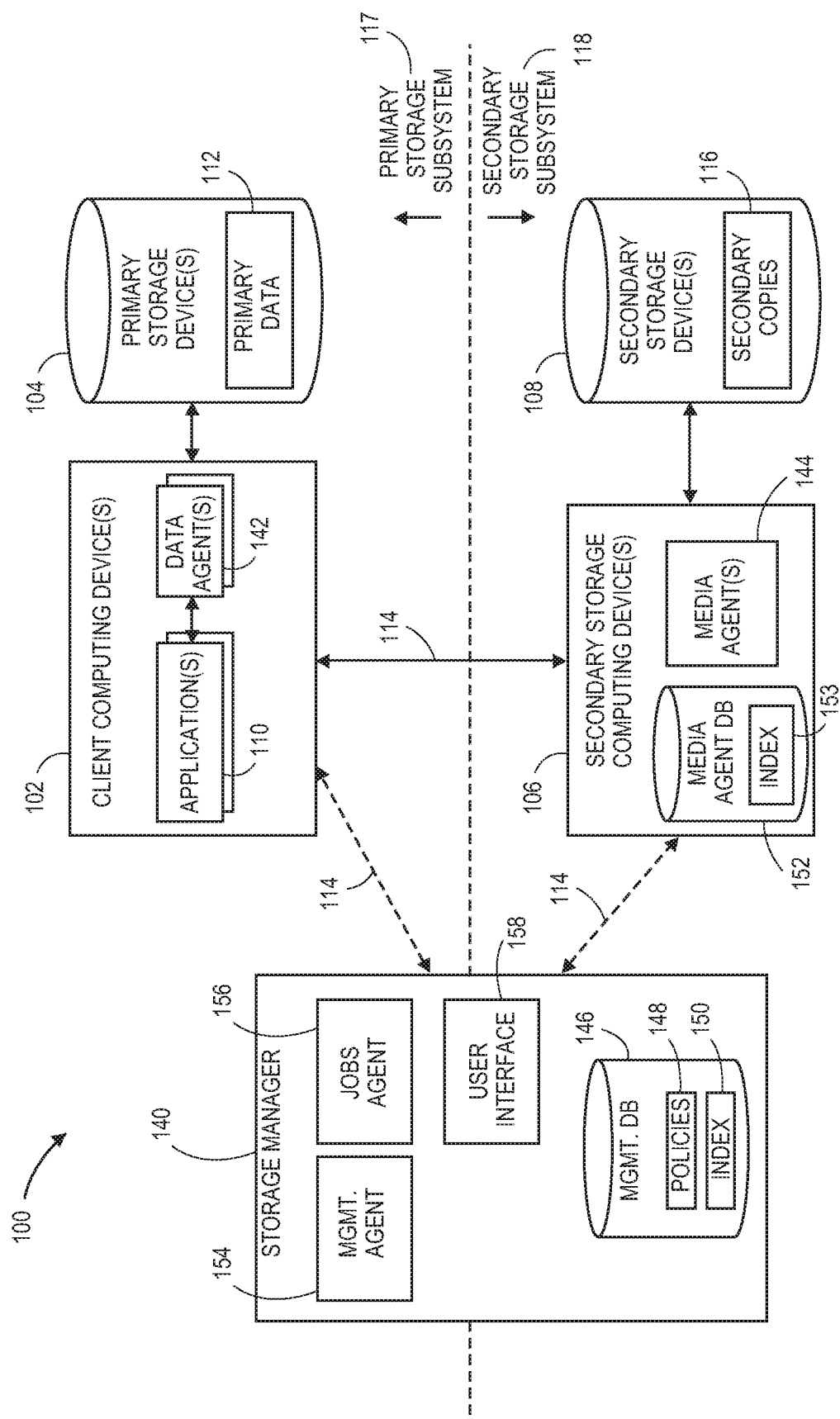
FIG. 1C is a block diagram of an exemplary information management system including a storage manager, one or more data agents, and one or more media agents.

FIG. 1C shows an information management system 100 designed according to these considerations and which includes: storage manager 140, a centralized storage and/or information manager that is configured to perform certain control functions, one or more data agents 142 executing on the client computing device(s) 102 configured to process primary data 112, and one or more media agents 144 executing on the one or more secondary storage computing devices 106 for performing tasks involving the secondary storage devices 108. While distributing functionality amongst multiple computing devices can have certain advantages, in other contexts it can be beneficial to consolidate functionality on the same computing device. As such, in various other embodiments, one or more of the components shown in FIG. 1C as being implemented on separate computing devices are implemented on the same computing device. In one configuration, a storage manager 140, one or more data agents 142, and one or more media agents 144 are all implemented on the same computing device. In another embodiment, one or more data agents 142 and one or more media agents 144 are implemented on the same computing device, while the storage manager 140 is implemented on a separate computing device, etc. without limitation.

Storage Manager

As noted, the number of components in the information management system 100 and the amount of data under management can be quite large. Managing the components and data is therefore a significant task, and a task that can grow in an often unpredictable fashion as the quantity of components and data scale to meet the needs of the organization. For these and other reasons, according to certain embodiments, responsibility for controlling the information management system 100, or at least a significant portion of that responsibility, is allocated to the storage manager 140. By distributing control functionality in this manner, the storage manager 140 can be adapted independently according to changing circumstances. Moreover, a computing device for hosting the storage manager 140 can be selected to best suit the functions of the storage manager 140. These and other advantages are described in further detail below with respect to FIG. 1D.

The storage manager 140 may be a software module or other application, which in some embodiments operates in conjunction with one or more associated data structures, e.g., a dedicated database (e.g., management database 146). In some embodiments, storage manager 140 is a computing device comprising circuitry for executing computer instructions and performs the functions described herein. The storage manager generally initiates, performs, coordinates and/or controls storage and other information management operations performed by the information management system 100, e.g., to protect and control the primary data 112 and secondary copies 116 of data and metadata. In general, storage manager 100 may be said to manage information management system 100, which includes managing the constituent components, e.g., data agents and media agents, etc.

As shown by the dashed arrowed lines 114 in FIG. 1C, the storage manager 140 may communicate with and/or control some or all elements of the information management system 100, such as the data agents 142 and media agents 144. Thus, in certain embodiments, control information originates from the storage manager 140 and status reporting is transmitted to storage manager 140 by the various managed components, whereas payload data and payload metadata is generally communicated between the data agents 142 and the media agents 144 (or otherwise between the client computing device(s) 102 and the secondary storage computing device(s) 106), e.g., at the direction of and under the management of the storage manager 140. Control information can generally include parameters and instructions for carrying out information management operations, such as, without limitation, instructions to perform a task associated with an operation, timing information specifying when to initiate a task associated with an operation, data path information specifying what components to communicate with or access in carrying out an operation, and the like. Payload data, on the other hand, can include the actual data involved in the storage operation, such as content data written to a secondary storage device 108 in a secondary copy operation. Payload metadata can include any of the types of metadata described herein, and may be written to a storage device along with the payload content data (e.g., in the form of a header).

In other embodiments, some information management operations are controlled by other components in the information management system 100 (e.g., the media agent(s) 144 or data agent(s) 142), instead of or in combination with the storage manager 140.

According to certain embodiments, the storage manager 140 provides one or more of the following functions:

- initiating execution of secondary copy operations;
- managing secondary storage devices 108 and inventory/capacity of the same;
- reporting, searching, and/or classification of data in the information management system 100;
- allocating secondary storage devices 108 for secondary storage operations;
- monitoring completion of and providing status reporting related to secondary storage operations;
- tracking age information relating to secondary copies 116, secondary storage devices 108, and comparing the age information against retention guidelines;
- tracking movement of data within the information management system 100;
- tracking logical associations between components in the information management system 100;
- protecting metadata associated with the information management system 100; and
- implementing operations management functionality.

The storage manager 140 may maintain a database 146 (or "storage manager database 146" or "management database 146") of management-related data and information management policies 148. The database 146 may include a management index 150 (or "index 150") or other data structure that stores logical associations between components of the system, user preferences and/or profiles (e.g., preferences regarding encryption, compression, or deduplication of primary or secondary copy data, preferences regarding the scheduling, type, or other aspects of primary or secondary copy or other operations, mappings of particular information management users or user accounts to certain computing devices or other components, etc.), management tasks, media containerization, or other useful data. For example, the storage manager 140 may use the index 150 to track logical associations between media agents 144 and secondary storage devices 108 and/or movement of data from primary storage devices 104 to secondary storage devices 108. For instance, the index 150 may store data associating a client computing device 102 with a particular media agent 144 and/or secondary storage device 108, as specified in an information management policy 148 (e.g., a storage policy, which is defined in more detail below).

Administrators and other people may be able to configure and initiate certain information management operations on an individual basis. But while this may be acceptable for some recovery operations or other relatively less frequent tasks, it is often not workable for implementing on-going organization-wide data protection and management. Thus, the information management system 100 may utilize information management policies 148 for specifying and executing information management operations (e.g., on an automated basis). Generally, an information management policy 148 can include a data structure or other information source that specifies a set of parameters (e.g., criteria and rules) associated with storage or other information management operations.

The storage manager database 146 may maintain the information management policies 148 and associated data, although the information management policies 148 can be stored in any appropriate location. For instance, an information management policy 148 such as a storage policy may be stored as metadata in a media agent database 152 or in a secondary storage device 108 (e.g., as an archive copy) for use in restore operations or other information management operations, depending on the embodiment. Information management policies 148 are described further below.

According to certain embodiments, the storage manager database 146 comprises a relational database (e.g., an SQL database) for tracking metadata, such as metadata associated with secondary copy operations (e.g., what client computing devices 102 and corresponding data were protected). This and other metadata may additionally be stored in other locations, such as at the secondary storage computing devices 106 or on the secondary storage devices 108, allowing data recovery without the use of the storage manager 140 in some cases.

As shown, the storage manager 140 may include a jobs agent 156, a user interface 158, and a management agent 154, all of which may be implemented as interconnected software modules or application programs.

The jobs agent 156 in some embodiments initiates, controls, and/or monitors the status of some or all storage or other information management operations previously performed, currently being performed, or scheduled to be performed by the information management system 100. For instance, the jobs agent 156 may access information management policies 148 to determine when and how to initiate and control secondary copy and other information management operations, as will be discussed further. A job may be a logical grouping of storage management operations relative to certain data, e.g., a backup job, an archiving job, a restore job (from secondary storage to primary storage), etc. A job may occur on demand, e.g., launched by a system administrator or user, and/or may occur on a schedule based on a storage policy or schedule policy, e.g., nightly backups of a given production file system.

The user interface 158 may include information processing and display software, such as a graphical user interface ("GUI"), an application program interface ("API"), or other interactive interface(s) through which users and system processes can retrieve information about the status of information management operations (e.g., storage operations) or issue instructions to the information management system 100 and its constituent components. Via the user interface 158, users may optionally issue instructions to the components in the information management system 100 regarding performance of storage and recovery operations. For example, a user may modify a schedule concerning the number of pending secondary copy operations. As another example, a user may employ the GUI to view the status of pending storage operations or to monitor the status of certain components in the information management system 100 (e.g., the amount of capacity left in a storage device).

An "information management cell" (or "storage operation cell" or "cell") may generally include a logical and/or physical grouping of a combination of hardware and software components associated with performing information management operations on electronic data, typically one storage manager 140 and at least one client computing device 102 (comprising data agent(s) 142) and at least one media agent 144. For instance, the components shown in FIG. 1C may together form an information management cell. Multiple cells may be organized hierarchically. With this configuration, cells may inherit properties from hierarchically superior cells or be controlled by other cells in the hierarchy (automatically or otherwise). Alternatively, in some embodiments, cells may inherit or otherwise be associated with information management policies, preferences, information management metrics, or other properties or characteristics according to their relative position in a hierarchy of cells. Cells may also be delineated and/or organized hierarchically according to function, geography, architectural considerations, or other factors useful or desirable in performing information management operations. A first cell may represent a geographic segment of an enterprise, such as a Chicago office, and a second cell may represent a different geographic segment, such as a New York office. Other cells may represent departments within a particular office. Where delineated by function, a first cell may perform one or more first types of information management operations (e.g., one or more first types of secondary or other copies), and a second cell may perform one or more second types of information management operations (e.g., one or more second types of secondary or other copies).

The storage manager 140 may also track information that permits it to select, designate, or otherwise identify content indices, deduplication databases, or similar databases or resources or data sets within its information management cell (or another cell) to be searched in response to certain queries. Such queries may be entered by the user via interaction with the user interface 158. In general, the management agent 154 allows multiple information management cells to communicate with one another. For example, the information management system 100 in some cases may be one information management cell of a network of multiple cells adjacent to one another or otherwise logically related in a WAN or LAN. With this arrangement, the cells may be connected to one another through respective management agents 154.

For instance, the management agent 154 can provide the storage manager 140 with the ability to communicate with other components within the information management system 100 (and/or other cells within a larger information management system) via network protocols and application programming interfaces ("APIs") including, e.g., HTTP, HTTPS, FTP, REST, virtualization software APIs, cloud service provider APIs, and hosted service provider APIs. Inter-cell communication and hierarchy is described in greater detail in e.g., U.S. Pat. Nos. 7,747,579 and 7,343,453, which are incorporated by reference herein.

Data Agents

As discussed, a variety of different types of applications 110 can operate on a given client computing device 102, including operating systems, database applications, e-mail applications, and virtual machines, just to name a few. And, as part of the process of creating and restoring secondary copies 116, the client computing devices 102 may be tasked with processing and preparing the primary data 112 from these various different applications 110. Moreover, the nature of the processing/preparation can differ across clients and application types, e.g., due to inherent structural and formatting differences among applications 110.

The one or more data agent(s) 142 are therefore advantageously configured in some embodiments to assist in the performance of information management operations based on the type of data that is being protected, at a client-specific and/or application-specific level.

The data agent 142 may be a software module or component that is generally responsible for managing, initiating, or otherwise assisting in the performance of information management operations in information management system 100, generally as directed by storage manager 140. For instance, the data agent 142 may take part in performing data storage operations such as the copying, archiving, migrating, and/or replicating of primary data 112 stored in the primary storage device(s) 104. The data agent 142 may receive control information from the storage manager 140, such as commands to transfer copies of data objects, metadata, and other payload data to the media agents 144.

In some embodiments, a data agent 142 may be distributed between the client computing device 102 and storage manager 140 (and any other intermediate components) or may be deployed from a remote location or its functions approximated by a remote process that performs some or all of the functions of data agent 142. In addition, a data agent 142 may perform some functions provided by a media agent 144, or may perform other functions such as encryption and deduplication.

As indicated, each data agent 142 may be specialized for a particular application 110, and the system can employ multiple application-specific data agents 142, each of which may perform information management operations (e.g., perform backup, migration, and data recovery) associated with a different application 110. For instance, different individual data agents 142 may be designed to handle Microsoft Exchange data, Lotus Notes data, Microsoft Windows file system data, Microsoft Active Directory Objects data, SQL Server data, SharePoint data, Oracle database data, SAP database data, virtual machines and/or associated data, and other types of data.

A file system data agent, for example, may handle data files and/or other file system information. If a client computing device 102 has two or more types of data, a specialized data agent 142 may be used for each data type to copy, archive, migrate, and restore the client computing device 102 data. For example, to backup, migrate, and/or restore all of the data on a Microsoft Exchange server, the client computing device 102 may use a Microsoft Exchange Mailbox data agent 142 to back up the Exchange mailboxes, a Microsoft Exchange Database data agent 142 to back up the Exchange databases, a Microsoft Exchange Public Folder data agent 142 to back up the Exchange Public Folders, and a Microsoft Windows File System data agent 142 to back up the file system of the client computing device 102. In such embodiments, these specialized data agents 142 may be treated as four separate data agents 142 even though they operate on the same client computing device 102.

Other embodiments may employ one or more generic data agents 142 that can handle and process data from two or more different applications 110, or that can handle and process multiple data types, instead of or in addition to using specialized data agents 142. For example, one generic data agent 142 may be used to back up, migrate and restore Microsoft Exchange Mailbox data and Microsoft Exchange Database data while another generic data agent may handle Microsoft Exchange Public Folder data and Microsoft Windows File System data.

Each data agent 142 may be configured to access data and/or metadata stored in the primary storage device(s) 104 associated with the data agent 142 and process the data as appropriate. For example, during a secondary copy operation, the data agent 142 may arrange or assemble the data and metadata into one or more files having a certain format (e.g., a particular backup or archive format) before transferring the file(s) to a media agent 144 or other component. The file(s) may include a list of files or other metadata. Each data agent 142 can also assist in restoring data or metadata to primary storage devices 104 from a secondary copy 116. For instance, the data agent 142 may operate in conjunction with the storage manager 140 and one or more of the media agents 144 to restore data from secondary storage device(s) 108.

Media Agents

As indicated above with respect to FIG. 1A, off-loading certain responsibilities from the client computing devices 102 to intermediate components such as the media agent(s) 144 can provide a number of benefits including improved client computing device 102 operation, faster secondary copy operation performance, and enhanced scalability. In one specific example which will be discussed below in further detail, the media agent 144 can act as a local cache of copied data and/or metadata that it has stored to the secondary storage device(s) 108, providing improved restore capabilities.

Generally speaking, a media agent 144 may be implemented as a software module that manages, coordinates, and facilitates the transmission of data, as directed by the storage manager 140, between a client computing device 102 and one or more secondary storage devices 108. Whereas the storage manager 140 controls the operation of the information management system 100, the media agent 144 generally provides a portal to secondary storage devices 108. For instance, other components in the system interact with the media agents 144 to gain access to data stored on the secondary storage devices 108, whether it be for the purposes of reading, writing, modifying, or deleting data. Moreover, as will be described further, media agents 144 can generate and store information relating to characteristics of the stored data and/or metadata, or can generate and store other types of information that generally provides insight into the contents of the secondary storage devices 108.

Media agents 144 can comprise separate nodes in the information management system 100 (e.g., nodes that are separate from the client computing devices 102, storage manager 140, and/or secondary storage devices 108). In general, a node within the information management system 100 can be a logically and/or physically separate component, and in some cases is a component that is individually addressable or otherwise identifiable. In addition, each media agent 144 may operate on a dedicated secondary storage computing device 106 in some cases, while in other embodiments a plurality of media agents 144 operate on the same secondary storage computing device 106.

A media agent 144 (and corresponding media agent database 152) may be considered to be "associated with" a particular secondary storage device 108 if that media agent 144 is capable of one or more of: routing and/or storing data to the particular secondary storage device 108, coordinating the routing and/or storing of data to the particular secondary storage device 108, retrieving data from the particular secondary storage device 108, coordinating the retrieval of data from a particular secondary storage device 108, and modifying and/or deleting data retrieved from the particular secondary storage device 108.

While media agent(s) 144 are generally associated with one or more secondary storage devices 108, one or more media agents 144 in certain embodiments are physically separate from the secondary storage devices 108. For instance, the media agents 144 may operate on secondary storage computing devices 106 having different housings or packages than the secondary storage devices 108. In one example, a media agent 144 operates on a first server computer and is in communication with a secondary storage device(s) 108 operating in a separate, rack-mounted RAID-based system.

Where the information management system 100 includes multiple media agents 144 (see, e.g., FIG. 1D), a first media agent 144 may provide failover functionality for a second, failed media agent 144. In addition, media agents 144 can be dynamically selected for storage operations to provide load balancing. Failover and load balancing are described in greater detail below.

In operation, a media agent 144 associated with a particular secondary storage device 108 may instruct the secondary storage device 108 to perform an information management operation. For instance, a media agent 144 may instruct a tape library to use a robotic arm or other retrieval means to load or eject a certain storage media, and to subsequently archive, migrate, or retrieve data to or from that media, e.g., for the purpose of restoring the data to a client computing device 102. As another example, a secondary storage device 108 may include an array of hard disk drives or solid state drives organized in a RAID configuration, and the media agent 144 may forward a logical unit number (LUN) and other appropriate information to the array, which uses the received information to execute the desired storage operation. The media agent 144 may communicate with a secondary storage device 108 via a suitable communications link, such as a SCSI or Fiber Channel link.

As shown, each media agent 144 may maintain an associated media agent database 152. The media agent database 152 may be stored in a disk or other storage device (not shown) that is local to the secondary storage computing device 106 on which the media agent 144 operates. In other cases, the media agent database 152 is stored remotely from the secondary storage computing device 106.

The media agent database 152 can include, among other things, an index 153 (see, e.g., FIG. 1C), which comprises information generated during secondary copy operations and other storage or information management operations. The index 153 provides a media agent 144 or other component with a fast and efficient mechanism for locating secondary copies 116 or other data stored in the secondary storage devices 108. In some cases, the index 153 does not form a part of and is instead separate from the media agent database 152.

A media agent index 153 or other data structure associated with the particular media agent 144 may include information about the stored data. For instance, for each secondary copy 116, the index 153 may include metadata such as a list of the data objects (e.g., files/subdirectories, database objects, mailbox objects, etc.), a path to the secondary copy 116 on the corresponding secondary storage device 108, location information indicating where the data objects are stored in the secondary storage device 108, when the data objects were created or modified, etc. Thus, the index 153 includes metadata associated with the secondary copies 116 that is readily available for use without having to be first retrieved from the secondary storage device 108. In yet further embodiments, some or all of the information in index 153 may instead or additionally be stored along with the secondary copies of data in a secondary storage device 108. In some embodiments, the secondary storage devices 108 can include sufficient information to perform a "bare metal restore", where the operating system of a failed client computing device 102 or other restore target is automatically rebuilt as part of a restore operation.

Because the index 153 maintained in the media agent database 152 may operate as a cache, it can also be referred to as "an index cache." In such cases, information stored in the index cache 153 typically comprises data that reflects certain particulars about storage operations that have occurred relatively recently. After some triggering event, such as after a certain period of time elapses, or the index cache 153 reaches a particular size, the index cache 153 may be copied or migrated to a secondary storage device(s) 108. This information may need to be retrieved and uploaded back into the index cache 153 or otherwise restored to a media agent 144 to facilitate retrieval of data from the secondary storage device(s) 108. In some embodiments, the cached information may include format or containerization information related to archives or other files stored on the storage device(s) 108. In this manner, the index cache 153 allows for accelerated restores.

In some alternative embodiments the media agent 144 generally acts as a coordinator or facilitator of storage operations between client computing devices 102 and corresponding secondary storage devices 108, but does not actually write the data to the secondary storage device 108. For instance, the storage manager 140 (or the media agent 144) may instruct a client computing device 102 and secondary storage device 108 to communicate with one another directly. In such a case the client computing device 102 transmits the data directly or via one or more intermediary components to the secondary storage device 108 according to the received instructions, and vice versa. In some such cases, the media agent 144 may still receive, process, and/or maintain metadata related to the storage operations. Moreover, in these embodiments, the payload data can flow through the media agent 144 for the purposes of populating the index cache 153 maintained in the media agent database 152, but not for writing to the secondary storage device 108.

The media agent 144 and/or other components such as the storage manager 140 may in some cases incorporate additional functionality, such as data classification, content indexing, deduplication, encryption, compression, and the like. Further details regarding these and other functions are described below.

Distributed, Scalable Architecture

As described, certain functions of the information management system 100 can be distributed amongst various physical and/or logical components in the system. For instance, one or more of the storage manager 140, data agents 142, and media agents 144 may operate on computing devices that are physically separate from one another. This architecture can provide a number of benefits.

For instance, hardware and software design choices for each distributed component can be targeted to suit its particular function. The secondary computing devices 106 on which the media agents 144 operate can be tailored for interaction with associated secondary storage devices 108 and provide fast index cache operation, among other specific tasks. Similarly, the client computing device(s) 102 can be selected to effectively service the applications 110 thereon, in order to efficiently produce and store primary data 112.

Moreover, in some cases, one or more of the individual components in the information management system 100 can be distributed to multiple, separate computing devices. As one example, for large file systems where the amount of data stored in the management database 146 is relatively large, the database 146 may be migrated to or otherwise reside on a specialized database server (e.g., an SQL server) separate from a server that implements the other functions of the storage manager 140. This distributed configuration can provide added protection because the database 146 can be protected with standard database utilities (e.g., SQL log shipping or database replication) independent from other functions of the storage manager 140. The database 146 can be efficiently replicated to a remote site for use in the event of a disaster or other data loss at the primary site. Or the database 146 can be replicated to another computing device within the same site, such as to a higher performance machine in the event that a storage manager host device can no longer service the needs of a growing information management system 100.

Figure 1D:
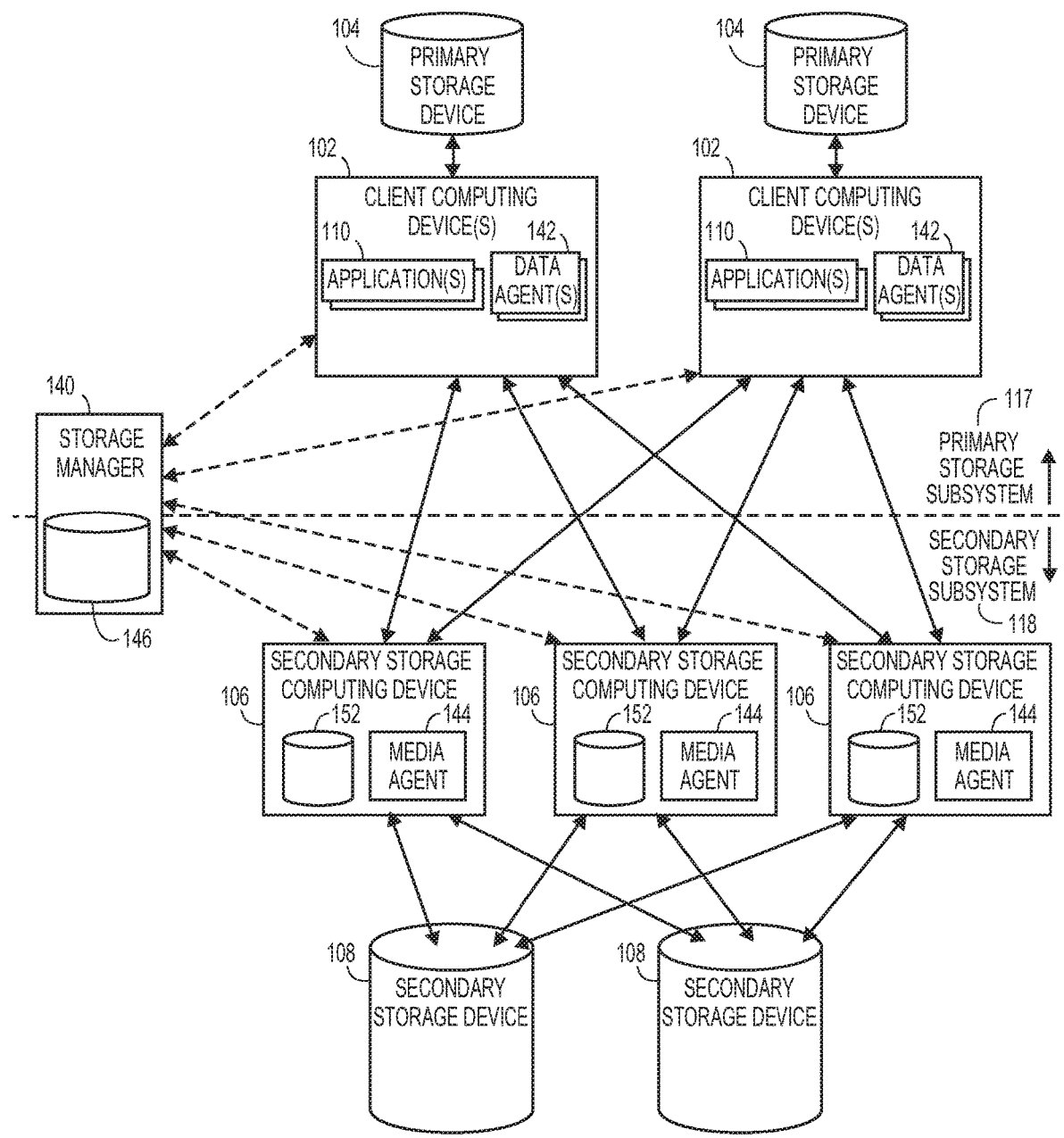
FIG. 1D is a block diagram illustrating a scalable information management system.

The distributed architecture also provides both scalability and efficient component utilization. FIG. 1D shows an embodiment of the information management system 100 including a plurality of client computing devices 102 and associated data agents 142 as well as a plurality of secondary storage computing devices 106 and associated media agents 144.

Additional components can be added or subtracted based on the evolving needs of the information management system 100. For instance, depending on where bottlenecks are identified, administrators can add additional client computing devices 102, secondary storage computing devices 106 (and corresponding media agents 144), and/or secondary storage devices 108. Moreover, where multiple fungible components are available, load balancing can be implemented to dynamically address identified bottlenecks. As an example, the storage manager 140 may dynamically select which media agents 144 and/or secondary storage devices 108 to use for storage operations based on a processing load analysis of the media agents 144 and/or secondary storage devices 108, respectively.

Moreover, each client computing device 102 in some embodiments can communicate with, among other components, any of the media agents 144, e.g., as directed by the storage manager 140. And each media agent 144 may be able to communicate with, among other components, any of the secondary storage devices 108, e.g., as directed by the storage manager 140. Thus, operations can be routed to the secondary storage devices 108 in a dynamic and highly flexible manner, to provide load balancing, failover, and the like. Further examples of scalable systems capable of dynamic storage operations, and of systems capable of performing load balancing and fail over are provided in U.S. Pat. No. 7,246,207, which is incorporated by reference herein.

In alternative configurations, certain components are not distributed and may instead reside and execute on the same computing device. For example, in some embodiments, one or more data agents 142 and the storage manager 140 operate on the same client computing device 102. In another embodiment, one or more data agents 142 and one or more media agents 144 operate on a single computing device.

Exemplary Types of Information Management Operations

In order to protect and leverage stored data, the information management system 100 can be configured to perform a variety of information management operations. As will be described, these operations can generally include secondary copy and other data movement operations, processing and data manipulation operations, analysis, reporting, and management operations. The operations described herein may be performed on any type of computing device, e.g., between two computers connected via a LAN, to a mobile client telecommunications device connected to a server via a WLAN, to any manner of client computing device coupled to a cloud storage target, etc., without limitation.

Data Movement Operations

Data movement operations according to certain embodiments are generally operations that involve the copying or migration of data (e.g., payload data) between different locations in the information management system 100 in an original/native and/or one or more different formats. For example, data movement operations can include operations in which stored data is copied, migrated, or otherwise transferred from one or more first storage devices to one or more second storage devices, such as from primary storage device(s) 104 to secondary storage device(s) 108, from secondary storage device(s) 108 to different secondary storage device(s) 108, from secondary storage devices 108 to primary storage devices 104, or from primary storage device(s) 104 to different primary storage device(s) 104.

Data movement operations can include by way of example, backup operations, archive operations, information lifecycle management operations such as hierarchical storage management operations, replication operations (e.g., continuous data replication operations), snapshot operations, deduplication or single-instancing operations, auxiliary copy operations, and the like. As will be discussed, some of these operations involve the copying, migration or other movement of data, without actually creating multiple, distinct copies. Nonetheless, some or all of these operations are referred to as "copy" operations for simplicity.

Backup Operations

A backup operation creates a copy of a version of data (e.g., one or more files or other data units) in primary data 112 at a particular point in time. Each subsequent backup copy may be maintained independently of the first. Further, a backup copy in some embodiments is generally stored in a form that is different than the native format, e.g., a backup format. This can be in contrast to the version in primary data 112 from which the backup copy is derived, and which may instead be stored in a native format of the source application(s) 110. In various cases, backup copies can be stored in a format in which the data is compressed, encrypted, deduplicated, and/or otherwise modified from the original application format. For example, a backup copy may be stored in a backup format that facilitates compression and/or efficient long-term storage.

Backup copies can have relatively long retention periods as compared to primary data 112, and may be stored on media with slower retrieval times than primary data 112 and certain other types of secondary copies 116. On the other hand, backups may have relatively shorter retention periods than some other types of secondary copies 116, such as archive copies (described below). Backups may sometimes be stored at an offsite location.

Backup operations can include full backups, differential backups, incremental backups, "synthetic full" backups, and/or creating a "reference copy." A full backup (or "standard full backup") in some embodiments is generally a complete image of the data to be protected. However, because full backup copies can consume a relatively large amount of storage, it can be useful to use a full backup copy as a baseline and only store changes relative to the full backup copy for subsequent backup copies.

For instance, a differential backup operation (or cumulative incremental backup operation) tracks and stores changes that have occurred since the last full backup. Differential backups can grow quickly in size, but can provide relatively efficient restore times because a restore can be completed in some cases using only the full backup copy and the latest differential copy.

An incremental backup operation generally tracks and stores changes since the most recent backup copy of any type, which can greatly reduce storage utilization. In some cases, however, restore times can be relatively long in comparison to full or differential backups because completing a restore operation may involve accessing a full backup in addition to multiple incremental backups.

Synthetic full backups generally consolidate data without directly backing up data from the client computing device. A synthetic full backup is created from the most recent full backup (i.e., standard or synthetic) and subsequent incremental and/or differential backups. The resulting synthetic full backup is identical to what would have been created had the last backup for the subclient been a standard full backup. Unlike standard full, incremental, and differential backups, a synthetic full backup does not actually transfer data from a client computer to the backup media, because it operates as a backup consolidator. A synthetic full backup extracts the index data of each participating subclient. Using this index data and the previously backed up user data images, it builds new full backup images, one for each subclient. The new backup images consolidate the index and user data stored in the related incremental, differential, and previous full backups, in some embodiments creating an archive file at the subclient level.

Any of the above types of backup operations can be at the volume-level, file-level, or block-level. Volume level backup operations generally involve the copying of a data volume (e.g., a logical disk or partition) as a whole. In a file-level backup, the information management system 100 may generally track changes to individual files, and includes copies of files in the backup copy. In the case of a block-level backup, files are broken into constituent blocks, and changes are tracked at the block-level. Upon restore, the information management system 100 reassembles the blocks into files in a transparent fashion.

Far less data may actually be transferred and copied to the secondary storage devices 108 during a file-level copy than a volume-level copy. Likewise, a block-level copy may involve the transfer of less data than a file-level copy, resulting in faster execution times. However, restoring a relatively higher-granularity copy can result in longer restore times. For instance, when restoring a block-level copy, the process of locating constituent blocks can sometimes result in longer restore times as compared to file-level backups. Similar to backup operations, the other types of secondary copy operations described herein can also be implemented at either the volume-level, file-level, or block-level.

For example, in some embodiments, a reference copy may comprise copy(ies) of selected objects from backed up data, typically to help organize data by keeping contextual information from multiple sources together, and/or help retain specific data for a longer period of time, such as for legal hold needs. A reference copy generally maintains data integrity, and when the data is restored, it may be viewed in the same format as the source data. In some embodiments, a reference copy is based on a specialized client, individual subclient and associated information management policies (e.g., storage policy, retention policy, etc.) that are administered within information management system 100.

Archive Operations

Because backup operations generally involve maintaining a version of the copied data in primary data 112 and also maintaining backup copies in secondary storage device(s) 108, they can consume significant storage capacity. To help reduce storage consumption, an archive operation according to certain embodiments creates a secondary copy 116 by both copying and removing source data. Or, seen another way, archive operations can involve moving some or all of the source data to the archive destination. Thus, data satisfying criteria for removal (e.g., data of a threshold age or size) may be removed from source storage. The source data may be primary data 112 or a secondary copy 116, depending on the situation. As with backup copies, archive copies can be stored in a format in which the data is compressed, encrypted, deduplicated, and/or otherwise modified from the format of the original application or source copy. In addition, archive copies may be retained for relatively long periods of time (e.g., years) and, in some cases, are never deleted. Archive copies are generally retained for longer periods of time than backup copies, for example. In certain embodiments, archive copies may be made and kept for extended periods in order to meet compliance regulations.

Moreover, when primary data 112 is archived, in some cases the corresponding primary data 112 or a portion thereof is deleted when creating the archive copy. Thus, archiving can serve the purpose of freeing up space in the primary storage device(s) 104 and easing the demand on computational resources on client computing device 102. Similarly, when a secondary copy 116 is archived, the secondary copy 116 may be deleted, and an archive copy can therefore serve the purpose of freeing up space in secondary storage device(s) 108. In contrast, source copies often remain intact when creating backup copies. Examples of compatible data archiving operations are provided in U.S. Pat. No. 7,107,298, which is incorporated by reference herein.

Snapshot Operations

Snapshot operations can provide a relatively lightweight, efficient mechanism for protecting data. From an end-user viewpoint, a snapshot may be thought of as an "instant" image of the primary data 112 at a given point in time, and may include state and/or status information relative to an application that creates/manages the primary data 112. In one embodiment, a snapshot may generally capture the directory structure of an object in primary data 112 such as a file or volume or other data set at a particular moment in time and may also preserve file attributes and contents. A snapshot in some cases is created relatively quickly, e.g., substantially instantly, using a minimum amount of file space, but may still function as a conventional file system backup.

A "hardware snapshot" (or "hardware-based snapshot") operation can be a snapshot operation where a target storage device (e.g., a primary storage device 104 or a secondary storage device 108) performs the snapshot operation in a self-contained fashion, substantially independently, using hardware, firmware and/or software operating on the storage device itself. For instance, the storage device may be capable of performing snapshot operations upon request, generally without intervention or oversight from any of the other components in the information management system 100. In this manner, hardware snapshots can off-load other components of information management system 100 from processing involved in snapshot creation and management.

A "software snapshot" (or "software-based snapshot") operation, on the other hand, can be a snapshot operation in which one or more other components in information management system 100 (e.g., client computing devices 102, data agents 142, etc.) implement a software layer that manages the snapshot operation via interaction with the target storage device. For instance, the component executing the snapshot management software layer may derive a set of pointers and/or data that represents the snapshot. The snapshot management software layer may then transmit the same to the target storage device, along with appropriate instructions for writing the snapshot.

Some types of snapshots do not actually create another physical copy of all the data as it existed at the particular point in time, but may simply create pointers that are able to map files and directories to specific memory locations (e.g., to specific disk blocks) where the data resides, as it existed at the particular point in time. For example, a snapshot copy may include a set of pointers derived from the file system or from an application. In some other cases, the snapshot may be created at the block-level, such that creation of the snapshot occurs without awareness of the file system. Each pointer points to a respective stored data block, so that collectively, the set of pointers reflect the storage location and state of the data object (e.g., file(s) or volume(s) or data set(s)) at a particular point in time when the snapshot copy was created.

An initial snapshot may use only a small amount of disk space needed to record a mapping or other data structure representing or otherwise tracking the blocks that correspond to the current state of the file system. Additional disk space is usually required only when files and directories are modified later on. Furthermore, when files are modified, typically only the pointers which map to blocks are copied, not the blocks themselves. In some embodiments, for example in the case of "copy-on-write" snapshots, when a block changes in primary storage, the block is copied to secondary storage or cached in primary storage before the block is overwritten in primary storage, and the pointer to that block is changed to reflect the new location of that block. The snapshot mapping of file system data may also be updated to reflect the changed block(s) at that particular point in time. In some other cases, a snapshot includes a full physical copy of all or substantially all of the data represented by the snapshot. Further examples of snapshot operations are provided in U.S. Pat. No. 7,529,782, which is incorporated by reference herein.

A snapshot copy in many cases can be made quickly and without significantly impacting primary computing resources because large amounts of data need not be copied or moved. In some embodiments, a snapshot may exist as a virtual file system, parallel to the actual file system. Users in some cases gain read-only access to the record of files and directories of the snapshot. By electing to restore primary data 112 from a snapshot taken at a given point in time, users may also return the current file system to the state of the file system that existed when the snapshot was taken.

Replication Operations

Another type of secondary copy operation is a replication operation. Some types of secondary copies 116 are used to periodically capture images of primary data 112 at particular points in time (e.g., backups, archives, and snapshots). However, it can also be useful for recovery purposes to protect primary data 112 in a more continuous fashion, by replicating the primary data 112 substantially as changes occur. In some cases a replication copy can be a mirror copy, for instance, where changes made to primary data 112 are mirrored or substantially immediately copied to another location (e.g., to secondary storage device(s) 108). By copying each write operation to the replication copy, two storage systems are kept synchronized or substantially synchronized so that they are virtually identical at approximately the same time. Where entire disk volumes are mirrored, however, mirroring can require significant amount of storage space and utilizes a large amount of processing resources.

According to some embodiments storage operations are performed on replicated data that represents a recoverable state, or "known good state" of a particular application running on the source system. For instance, in certain embodiments, known good replication copies may be viewed as copies of primary data 112. This feature allows the system to directly access, copy, restore, backup or otherwise manipulate the replication copies as if the data were the "live" primary data 112. This can reduce access time, storage utilization, and impact on source applications 110, among other benefits. Based on known good state information, the information management system 100 can replicate sections of application data that represent a recoverable state rather than rote copying of blocks of data. Examples of compatible replication operations (e.g., continuous data replication) are provided in U.S. Pat. No. 7,617,262, which is incorporated by reference herein.

Deduplication/Single-Instancing Operations

Another type of data movement operation is deduplication or single-instance storage, which is useful to reduce the amount of non-primary data. For instance, some or all of the above-described secondary storage operations can involve deduplication in some fashion. New data is read, broken down into portions (e.g., sub-file level blocks, files, etc.) of a selected granularity, compared with blocks that are already in secondary storage, and only the new blocks are stored. Blocks that already exist are represented as pointers to the already stored data.

In order to streamline the comparison process, the information management system 100 may calculate and/or store signatures (e.g., hashes or cryptographically unique IDs) corresponding to the individual data blocks in a database and compare the signatures instead of comparing entire data blocks. In some cases, only a single instance of each element is stored, and deduplication operations may therefore be referred to interchangeably as "single-instancing" operations. Depending on the implementation, however, deduplication or single-instancing operations can store more than one instance of certain data blocks, but nonetheless significantly reduce data redundancy. Depending on the embodiment, deduplication blocks can be of fixed or variable length. Using variable length blocks can provide enhanced deduplication by responding to changes in the data stream, but can involve complex processing. In some cases, the information management system 100 utilizes a technique for dynamically aligning deduplication blocks (e.g., fixed-length blocks) based on changing content in the data stream, as described in U.S. Pat. No. 8,364,652, which is incorporated by reference herein.

The information management system 100 can perform deduplication in a variety of manners at a variety of locations in the information management system 100. For instance, in some embodiments, the information management system 100 implements "target-side" deduplication by deduplicating data (e.g., secondary copies 116) stored in the secondary storage devices 108. In some such cases, the media agents 144 are generally configured to manage the deduplication process. For instance, one or more of the media agents 144 maintain a corresponding deduplication database that stores deduplication information (e.g., data-block signatures). Examples of such a configuration are provided in U.S. Pat. Pub. No. 2012/0150826, which is incorporated by reference herein. Instead of or in combination with "target-side" deduplication, deduplication can also be performed on the "source-side" (or "client-side"), e.g., to reduce the amount of traffic between the media agents 144 and the client computing device(s) 102 and/or reduce redundant data stored in the primary storage devices 104. According to various implementations, one or more of the storage devices of the target-side and/or source-side of an operation can be cloud-based storage devices. Thus, the target-side and/or source-side deduplication can be cloud-based deduplication. In particular, as discussed previously, the storage manager 140 may communicate with other components within the information management system 100 via network protocols and cloud service provider APIs to facilitate cloud-based deduplication/single instancing. Examples of such deduplication techniques are provided in U.S. Pat. Pub. No. 2012/0150818, which is incorporated by reference herein. Some other compatible deduplication/single instancing techniques are described in U.S. Pat. Pub. Nos. 2006/0224846 and 2009/0319534, which are incorporated by reference herein.

Information Lifecycle Management and Hierarchical Storage Management Operations

In some embodiments, files and other data over their lifetime move from more expensive, quick access storage to less expensive, slower access storage. Operations associated with moving data through various tiers of storage are sometimes referred to as information lifecycle management (ILM) operations.

One type of ILM operation is a hierarchical storage management (HSM) operation. A HSM operation is generally an operation for automatically moving data between classes of storage devices, such as between high-cost and low-cost storage devices. For instance, an HSM operation may involve movement of data from primary storage devices 104 to secondary storage devices 108, or between tiers of secondary storage devices 108. With each tier, the storage devices may be progressively relatively cheaper, have relatively slower access/restore times, etc. For example, movement of data between tiers may occur as data becomes less important over time.

In some embodiments, an HSM operation is similar to an archive operation in that creating an HSM copy may (though not always) involve deleting some of the source data, e.g., according to one or more criteria related to the source data. For example, an HSM copy may include data from primary data 112 or a secondary copy 116 that is larger than a given size threshold or older than a given age threshold and that is stored in a backup format.

Often, and unlike some types of archive copies, HSM data that is removed or aged from the source is replaced by a logical reference pointer or stub. The reference pointer or stub can be stored in the primary storage device 104 (or other source storage device, such as a secondary storage device 108) to replace the deleted source data and to point to or otherwise indicate the new location in a secondary storage device 108.

According to one example, files are generally moved between higher and lower cost storage depending on how often the files are accessed. When a user requests access to the HSM data that has been removed or migrated, the information management system 100 uses the stub to locate the data and may make recovery of the data appear transparent, even though the HSM data may be stored at a location different from other source data. In this manner, the data appears to the user (e.g., in file system browsing windows and the like) as if it still resides in the source location (e.g., in a primary storage device 104). The stub may also include some metadata associated with the corresponding data, so that a file system and/or application can provide some information about the data object and/or a limited-functionality version (e.g., a preview) of the data object.

An HSM copy may be stored in a format other than the native application format (e.g., where the data is compressed, encrypted, deduplicated, and/or otherwise modified from the original native application format). In some cases, copies which involve the removal of data from source storage and the maintenance of stub or other logical reference information on source storage may be referred to generally as "on-line archive copies". On the other hand, copies which involve the removal of data from source storage without the maintenance of stub or other logical reference information on source storage may be referred to as "off-line archive copies". Examples of HSM and ILM techniques are provided in U.S. Pat. No. 7,343,453, which is incorporated by reference herein.

Auxiliary Copy and Disaster Recovery Operations

An auxiliary copy is generally a copy operation in which a copy is created of an existing secondary copy 116. For instance, an initial secondary copy 116 may be generated using or otherwise be derived from primary data 112 (or other data residing in the secondary storage subsystem 118), whereas an auxiliary copy is generated from the initial secondary copy 116. Auxiliary copies can be used to create additional standby copies of data and may reside on different secondary storage devices 108 than the initial secondary copies 116. Thus, auxiliary copies can be used for recovery purposes if initial secondary copies 116 become unavailable. Exemplary compatible auxiliary copy techniques are described in further detail in U.S. Pat. No. 8,230,195, which is incorporated by reference herein.

The information management system 100 may also perform disaster recovery operations that make or retain disaster recovery copies, often as secondary, high-availability disk copies. The information management system 100 may create secondary disk copies and store the copies at disaster recovery locations using auxiliary copy or replication operations, such as continuous data replication technologies. Depending on the particular data protection goals, disaster recovery locations can be remote from the client computing devices 102 and primary storage devices 104, remote from some or all of the secondary storage devices 108, or both.

Data Analysis, Reporting, and Management Operations

Data analysis, reporting, and management operations can be different than data movement operations in that they do not necessarily involve the copying, migration or other transfer of data (e.g., primary data 112 or secondary copies 116) between different locations in the system. For instance, data analysis operations may involve processing (e.g., offline processing) or modification of already stored primary data 112 and/or secondary copies 116. However, in some embodiments data analysis operations are performed in conjunction with data movement operations. Some data analysis operations include content indexing operations and classification operations which can be useful in leveraging the data under management to provide enhanced search and other features. Other data analysis operations such as compression and encryption can provide data reduction and security benefits, respectively.

Classification Operations/Content Indexing

In some embodiments, the information management system 100 analyzes and indexes characteristics, content, and metadata associated with the primary data 112 and/or secondary copies 116. The content indexing can be used to identify files or other data objects having pre-defined content (e.g., user-defined keywords or phrases, other keywords/phrases that are not defined by a user, etc.), and/or metadata (e.g., email metadata such as "to", "from", "cc", "bcc", attachment name, received time, etc.).

The information management system 100 generally organizes and catalogues the results in a content index, which may be stored within the media agent database 152, for example. The content index can also include the storage locations of (or pointer references to) the indexed data in the primary data 112 or secondary copies 116, as appropriate. The results may also be stored, in the form of a content index database or otherwise, elsewhere in the information management system 100 (e.g., in the primary storage devices 104, or in the secondary storage device 108). Such index data provides the storage manager 140 or another component with an efficient mechanism for locating primary data 112 and/or secondary copies 116 of data objects that match particular criteria.

For instance, search criteria can be specified by a user through user interface 158 of the storage manager 140. In some cases, the information management system 100 analyzes data and/or metadata in secondary copies 116 to create an "off-line" content index, without significantly impacting the performance of the client computing devices 102. Depending on the embodiment, the system can also implement "on-line" content indexing, e.g., of primary data 112. Examples of compatible content indexing techniques are provided in U.S. Pat. No. 8,170,995, which is incorporated by reference herein.

One or more components can be configured to scan data and/or associated metadata for classification purposes to populate a database (or other data structure) of information, which can be referred to as a "data classification database" or a "metabase". Depending on the embodiment, the data classification database(s) can be organized in a variety of different ways, including centralization, logical sub-divisions, and/or physical sub-divisions. For instance, one or more centralized data classification databases may be associated with different subsystems or tiers within the information management system 100. As an example, there may be a first centralized metabase associated with the primary storage subsystem 117 and a second centralized metabase associated with the secondary storage subsystem 118. In other cases, there may be one or more metabases associated with individual components, e.g., client computing devices 102 and/or media agents 144. In some embodiments, a data classification database (metabase) may reside as one or more data structures within management database 146, or may be otherwise associated with storage manager 140.

In some cases, the metabase(s) may be included in separate database(s) and/or on separate storage device(s) from primary data 112 and/or secondary copies 116, such that operations related to the metabase do not significantly impact performance on other components in the information management system 100. In other cases, the metabase(s) may be stored along with primary data 112 and/or secondary copies 116. Files or other data objects can be associated with identifiers (e.g., tag entries, etc.) in the media agent 144 (or other indices) to facilitate searches of stored data objects. Among a number of other benefits, the metabase can also allow efficient, automatic identification of files or other data objects to associate with secondary copy or other information management operations (e.g., in lieu of scanning an entire file system). Examples of compatible metabases and data classification operations are provided in U.S. Pat. Nos. 8,229,954 and 7,747,579, which are incorporated by reference herein.

Encryption Operations

The information management system 100 in some cases is configured to process data (e.g., files or other data objects, secondary copies 116, etc.), according to an appropriate encryption algorithm (e.g., Blowfish, Advanced Encryption Standard [AES], Triple Data Encryption Standard [3-DES], etc.) to limit access and provide data security in the information management system 100. The information management system 100 in some cases encrypts the data at the client level, such that the client computing devices 102 (e.g., the data agents 142) encrypt the data prior to forwarding the data to other components, e.g., before sending the data to media agents 144 during a secondary copy operation. In such cases, the client computing device 102 may maintain or have access to an encryption key or passphrase for decrypting the data upon restore. Encryption can also occur when creating copies of secondary copies, e.g., when creating auxiliary copies or archive copies. In yet further embodiments, the secondary storage devices 108 can implement built-in, high performance hardware encryption.

Management and Reporting Operations

Certain embodiments leverage the integrated, ubiquitous nature of the information management system 100 to provide useful system-wide management and reporting functions. Examples of some compatible management and reporting techniques are provided in U.S. Pat. No. 7,343,453, which is incorporated by reference herein.

Operations management can generally include monitoring and managing the health and performance of information management system 100 by, without limitation, performing error tracking, generating granular storage/performance metrics (e.g., job success/failure information, deduplication efficiency, etc.), generating storage modeling and costing information, and the like. As an example, a storage manager 140 or other component in the information management system 100 may analyze traffic patterns and suggest and/or automatically route data via a particular route to minimize congestion. In some embodiments, the system can generate predictions relating to storage operations or storage operation information. Such predictions, which may be based on a trending analysis, may predict various network operations or resource usage, such as network traffic levels, storage media use, use of bandwidth of communication links, use of media agent components, etc. Further examples of traffic analysis, trend analysis, prediction generation, and the like are described in U.S. Pat. No. 7,343,453, which is incorporated by reference herein.

In some configurations, a master storage manager 140 may track the status of storage operation cells in a hierarchy, such as the status of jobs, system components, system resources, and other items, by communicating with storage managers 140 (or other components) in the respective storage operation cells. Moreover, the master storage manager 140 may track the status of its associated storage operation cells and information management operations by receiving periodic status updates from the storage managers 140 (or other components) in the respective cells regarding jobs, system components, system resources, and other items. In some embodiments, a master storage manager 140 may store status information and other information regarding its associated storage operation cells and other system information in its index 150 (or other location).

The master storage manager 140 or other component may also determine whether certain storage-related criteria or other criteria are satisfied, and perform an action or trigger event (e.g., data migration) in response to the criteria being satisfied, such as where a storage threshold is met for a particular volume, or where inadequate protection exists for certain data. For instance, in some embodiments, data from one or more storage operation cells is used to dynamically and automatically mitigate recognized risks, and/or to advise users of risks or suggest actions to mitigate these risks. For example, an information management policy may specify certain requirements (e.g., that a storage device should maintain a certain amount of free space, that secondary copies should occur at a particular interval, that data should be aged and migrated to other storage after a particular period, that data on a secondary volume should always have a certain level of availability and be restorable within a given time period, that data on a secondary volume may be mirrored or otherwise migrated to a specified number of other volumes, etc.). If a risk condition or other criterion is triggered, the system may notify the user of these conditions and may suggest (or automatically implement) an action to mitigate or otherwise address the risk. For example, the system may indicate that data from a primary copy 112 should be migrated to a secondary storage device 108 to free space on the primary storage device 104. Examples of the use of risk factors and other triggering criteria are described in U.S. Pat. No. 7,343,453, which is incorporated by reference herein.

In some embodiments, the system 100 may also determine whether a metric or other indication satisfies particular storage criteria and, if so, perform an action. For example, as previously described, a storage policy or other definition might indicate that a storage manager 140 should initiate a particular action if a storage metric or other indication drops below or otherwise fails to satisfy specified criteria such as a threshold of data protection. Examples of such metrics are described in U.S. Pat. No. 7,343,453, which is incorporated by reference herein.

In some embodiments, risk factors may be quantified into certain measurable service or risk levels for ease of comprehension. For example, certain applications and associated data may be considered to be more important by an enterprise than other data and services. Financial compliance data, for example, may be of greater importance than marketing materials, etc. Network administrators may assign priority values or "weights" to certain data and/or applications, corresponding to the relative importance. The level of compliance of storage operations specified for these applications may also be assigned a certain value. Thus, the health, impact, and overall importance of a service may be determined, such as by measuring the compliance value and calculating the product of the priority value and the compliance value to determine the "service level" and comparing it to certain operational thresholds to determine whether it is acceptable. Further examples of the service level determination are provided in U.S. Pat. No. 7,343,453, which is incorporated by reference herein.

The system 100 may additionally calculate data costing and data availability associated with information management operation cells according to an embodiment of the invention. For instance, data received from the cell may be used in conjunction with hardware-related information and other information about system elements to determine the cost of storage and/or the availability of particular data in the system. Exemplary information generated could include how fast a particular department is using up available storage space, how long data would take to recover over a particular system pathway from a particular secondary storage device, costs over time, etc. Moreover, in some embodiments, such information may be used to determine or predict the overall cost associated with the storage of certain information. The cost associated with hosting a certain application may be based, at least in part, on the type of media on which the data resides, for example. Storage devices may be assigned to a particular cost categories, for example. Further examples of costing techniques are described in U.S. Pat. No. 7,343,453, which is incorporated by reference herein.

Any of the above types of information (e.g., information related to trending, predictions, job, cell or component status, risk, service level, costing, etc.) can generally be provided to users via the user interface 158 in a single, integrated view or console (not shown). The console may support a reporting capability that allows for the generation of a variety of reports, which may be tailored to a particular aspect of information management. Report types may include: scheduling, event management, media management and data aging. Available reports may also include backup history, data aging history, auxiliary copy history, job history, library and drive, media in library, restore history, and storage policy, etc., without limitation. Such reports may be specified and created at a certain point in time as a system analysis, forecasting, or provisioning tool. Integrated reports may also be generated that illustrate storage and performance metrics, risks and storage costing information. Moreover, users may create their own reports based on specific needs.

The integrated user interface 158 can include an option to show a "virtual view" of the system that graphically depicts the various components in the system using appropriate icons. As one example, the user interface 158 may provide a graphical depiction of one or more primary storage devices 104, the secondary storage devices 108, data agents 142 and/or media agents 144, and their relationship to one another in the information management system 100. The operations management functionality can facilitate planning and decision-making. For example, in some embodiments, a user may view the status of some or all jobs as well as the status of each component of the information management system 100. Users may then plan and make decisions based on this data. For instance, a user may view high-level information regarding storage operations for the information management system 100, such as job status, component status, resource status (e.g., communication pathways, etc.), and other information. The user may also drill down or use other means to obtain more detailed information regarding a particular component, job, or the like. Further examples of some reporting techniques and associated interfaces providing an integrated view of an information management system are provided in U.S. Pat. No. 7,343,453, which is incorporated by reference herein.

The information management system 100 can also be configured to perform system-wide e-discovery operations in some embodiments. In general, e-discovery operations provide a unified collection and search capability for data in the system, such as data stored in the secondary storage devices 108 (e.g., backups, archives, or other secondary copies 116). For example, the information management system 100 may construct and maintain a virtual repository for data stored in the information management system 100 that is integrated across source applications 110, different storage device types, etc. According to some embodiments, e-discovery utilizes other techniques described herein, such as data classification and/or content indexing.

Information Management Policies

As indicated previously, an information management policy 148 can include a data structure or other information source that specifies a set of parameters (e.g., criteria and rules) associated with secondary copy and/or other information management operations.

One type of information management policy 148 is a storage policy. According to certain embodiments, a storage policy generally comprises a data structure or other information source that defines (or includes information sufficient to determine) a set of preferences or other criteria for performing information management operations. Storage policies can include one or more of the following items: (1) what data will be associated with the storage policy; (2) a destination to which the data will be stored; (3) datapath information specifying how the data will be communicated to the destination; (4) the type of storage operation to be performed; and (5) retention information specifying how long the data will be retained at the destination (see, e.g., FIG. 1E).

As an illustrative example, data associated with a storage policy can be logically organized into groups. In some cases, these logical groupings can be referred to as "sub-clients". A sub-client may represent static or dynamic associations of portions of a data volume. Sub-clients may represent mutually exclusive portions. Thus, in certain embodiments, a portion of data may be given a label and the association is stored as a static entity in an index, database or other storage location. Sub-clients may also be used as an effective administrative scheme of organizing data according to data type, department within the enterprise, storage preferences, or the like. Depending on the configuration, sub-clients can correspond to files, folders, virtual machines, databases, etc. In one exemplary scenario, an administrator may find it preferable to separate e-mail data from financial data using two different sub-clients.

A storage policy can define where data is stored by specifying a target or destination storage device (or group of storage devices). For instance, where the secondary storage device 108 includes a group of disk libraries, the storage policy may specify a particular disk library for storing the sub-clients associated with the policy. As another example, where the secondary storage devices 108 include one or more tape libraries, the storage policy may specify a particular tape library for storing the sub-clients associated with the storage policy, and may also specify a drive pool and a tape pool defining a group of tape drives and a group of tapes, respectively, for use in storing the sub-client data. While information in the storage policy can be statically assigned in some cases, some or all of the information in the storage policy can also be dynamically determined based on criteria, which can be set forth in the storage policy. For instance, based on such criteria, a particular destination storage device(s) (or other parameter of the storage policy) may be determined based on characteristics associated with the data involved in a particular storage operation, device availability (e.g., availability of a secondary storage device 108 or a media agent 144), network status and conditions (e.g., identified bottlenecks), user credentials, and the like).

Datapath information can also be included in the storage policy. For instance, the storage policy may specify network pathways and components to utilize when moving the data to the destination storage device(s). In some embodiments, the storage policy specifies one or more media agents 144 for conveying data associated with the storage policy between the source (e.g., one or more host client computing devices 102) and destination (e.g., a particular target secondary storage device 108).

A storage policy can also specify the type(s) of operations associated with the storage policy, such as a backup, archive, snapshot, auxiliary copy, or the like. Retention information can specify how long the data will be kept, depending on organizational needs (e.g., a number of days, months, years, etc.)

Another type of information management policy 148 is a scheduling policy, which specifies when and how often to perform operations. Scheduling parameters may specify with what frequency (e.g., hourly, weekly, daily, event-based, etc.) or under what triggering conditions secondary copy or other information management operations will take place. Scheduling policies in some cases are associated with particular components, such as particular logical groupings of data associated with a storage policy (e.g., a sub-client), client computing device 102, and the like. In one configuration, a separate scheduling policy is maintained for particular logical groupings of data on a client computing device 102. The scheduling policy specifies that those logical groupings are to be moved to secondary storage devices 108 every hour according to storage policies associated with the respective sub-clients.

When adding a new client computing device 102, administrators can manually configure information management policies 148 and/or other settings, e.g., via the user interface 158. However, this can be an involved process resulting in delays, and it may be desirable to begin data protection operations quickly, without awaiting human intervention. Thus, in some embodiments, the information management system 100 automatically applies a default configuration to client computing device 102. As one example, when one or more data agent(s) 142 are installed on one or more client computing devices 102, the installation script may register the client computing device 102 with the storage manager 140, which in turn applies the default configuration to the new client computing device 102. In this manner, data protection operations can begin substantially immediately. The default configuration can include a default storage policy, for example, and can specify any appropriate information sufficient to begin data protection operations. This can include a type of data protection operation, scheduling information, a target secondary storage device 108, data path information (e.g., a particular media agent 144), and the like.

Other types of information management policies 148 are possible, including one or more audit (or security) policies. An audit policy is a set of preferences, rules and/or criteria that protect sensitive data in the information management system 100. For example, an audit policy may define "sensitive objects" as files or objects that contain particular keywords (e.g., "confidential," or "privileged") and/or are associated with particular keywords (e.g., in metadata) or particular flags (e.g., in metadata identifying a document or email as personal, confidential, etc.). An audit policy may further specify rules for handling sensitive objects. As an example, an audit policy may require that a reviewer approve the transfer of any sensitive objects to a cloud storage site, and that if approval is denied for a particular sensitive object, the sensitive object should be transferred to a local primary storage device 104 instead. To facilitate this approval, the audit policy may further specify how a secondary storage computing device 106 or other system component should notify a reviewer that a sensitive object is slated for transfer.

Another type of information management policy 148 is a provisioning policy. A provisioning policy can include a set of preferences, priorities, rules, and/or criteria that specify how client computing devices 102 (or groups thereof) may utilize system resources, such as available storage on cloud storage and/or network bandwidth. A provisioning policy specifies, for example, data quotas for particular client computing devices 102 (e.g., a number of gigabytes that can be stored monthly, quarterly or annually). The storage manager 140 or other components may enforce the provisioning policy. For instance, the media agents 144 may enforce the policy when transferring data to secondary storage devices 108. If a client computing device 102 exceeds a quota, a budget for the client computing device 102 (or associated department) is adjusted accordingly or an alert may trigger.

While the above types of information management policies 148 have been described as separate policies, one or more of these can be generally combined into a single information management policy 148. For instance, a storage policy may also include or otherwise be associated with one or more scheduling, audit, or provisioning policies or operational parameters thereof. Moreover, while storage policies are typically associated with moving and storing data, other policies may be associated with other types of information management operations. The following is a non-exhaustive list of items the information management policies 148 may specify:

- schedules or other timing information, e.g., specifying when and/or how often to perform information management operations;
- the type of copy 116 (e.g., type of secondary copy) and/or copy format (e.g., snapshot, backup, archive, HSM, etc.);
- a location or a class or quality of storage for storing secondary copies 116 (e.g., one or more particular secondary storage devices 108);
- preferences regarding whether and how to encrypt, compress, deduplicate, or otherwise modify or transform secondary copies 116;
- which system components and/or network pathways (e.g., preferred media agents 144) should be used to perform secondary storage operations;
- resource allocation among different computing devices or other system components used in performing information management operations (e.g., bandwidth allocation, available storage capacity, etc.);
- whether and how to synchronize or otherwise distribute files or other data objects across multiple computing devices or hosted services; and
- retention information specifying the length of time primary data 112 and/or secondary copies 116 should be retained, e.g., in a particular class or tier of storage devices, or within the information management system 100.

Policies can additionally specify or depend on a variety of historical or current criteria that may be used to determine which rules to apply to a particular data object, system component, or information management operation, such as:

- frequency with which primary data 112 or a secondary copy 116 of a data object or metadata has been or is predicted to be used, accessed, or modified;
- time-related factors (e.g., aging information such as time since the creation or modification of a data object);
- deduplication information (e.g., hashes, data blocks, deduplication block size, deduplication efficiency or other metrics);
- an estimated or historic usage or cost associated with different components (e.g., with secondary storage devices 108);
- the identity of users, applications 110, client computing devices 102 and/or other computing devices that created, accessed, modified, or otherwise utilized primary data 112 or secondary copies 116;
- a relative sensitivity (e.g., confidentiality, importance) of a data object, e.g., as determined by its content and/or metadata;
- the current or historical storage capacity of various storage devices;
- the current or historical network capacity of network pathways connecting various components within the storage operation cell;
- access control lists or other security information; and
- the content of a particular data object (e.g., its textual content) or of metadata associated with the data object.

Exemplary Storage Policy and Secondary Storage Operations

Figure 1E:
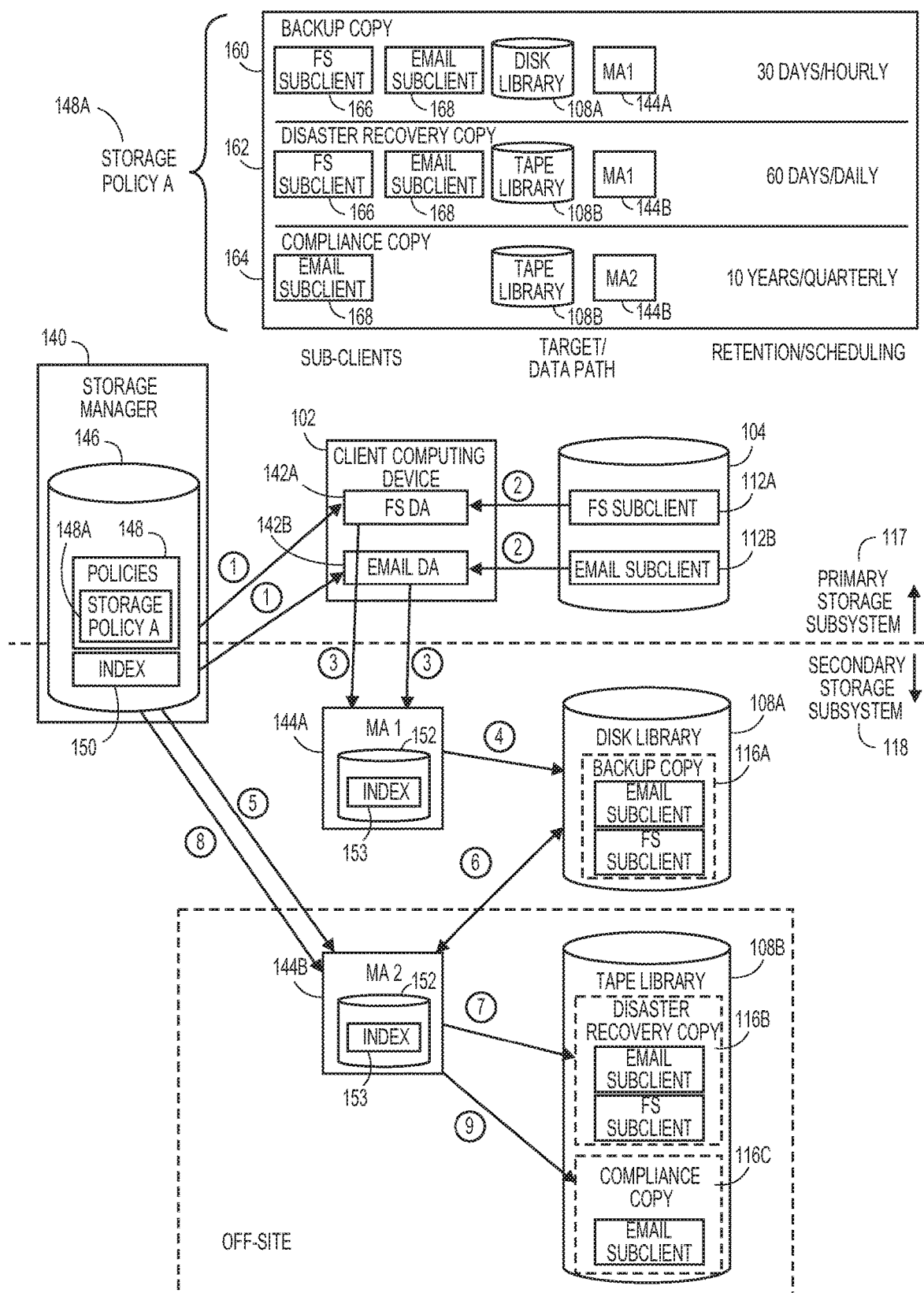
FIG. 1E illustrates certain secondary copy operations according to an exemplary storage policy.

FIG. 1E includes a data flow diagram depicting performance of storage operations by an embodiment of an information management system 100, according to an exemplary storage policy 148A. The information management system 100 includes a storage manger 140, a client computing device 102 having a file system data agent 142A and an email data agent 142B operating thereon, a primary storage device 104, two media agents 144A, 144B, and two secondary storage devices 108A, 108B: a disk library 108A and a tape library 108B. As shown, the primary storage device 104 includes primary data 112A, which is associated with a logical grouping of data associated with a file system, and primary data 112B, which is associated with a logical grouping of data associated with email. Although for simplicity the logical grouping of data associated with the file system is referred to as a file system sub-client, and the logical grouping of data associated with the email is referred to as an email sub-client, the techniques described with respect to FIG. 1E can be utilized in conjunction with data that is organized in a variety of other manners.

As indicated by the dashed box, the second media agent 144B and the tape library 108B are "off-site", and may therefore be remotely located from the other components in the information management system 100 (e.g., in a different city, office building, etc.). Indeed, "off-site" may refer to a magnetic tape located in storage, which must be manually retrieved and loaded into a tape drive to be read. In this manner, information stored on the tape library 108B may provide protection in the event of a disaster or other failure.

The file system sub-client and its associated primary data 112A in certain embodiments generally comprise information generated by the file system and/or operating system of the client computing device 102, and can include, for example, file system data (e.g., regular files, file tables, mount points, etc.), operating system data (e.g., registries, event logs, etc.), and the like. The e-mail sub-client, on the other hand, and its associated primary data 112B, include data generated by an e-mail application operating on the client computing device 102, and can include mailbox information, folder information, emails, attachments, associated database information, and the like. As described above, the sub-clients can be logical containers, and the data included in the corresponding primary data 112A, 112B may or may not be stored contiguously.

The exemplary storage policy 148A includes backup copy preferences (or rule set) 160, disaster recovery copy preferences rule set 162, and compliance copy preferences or rule set 164. The backup copy rule set 160 specifies that it is associated with a file system sub-client 166 and an email sub-client 168. Each of these sub-clients 166, 168 are associated with the particular client computing device 102. The backup copy rule set 160 further specifies that the backup operation will be written to the disk library 108A, and designates a particular media agent 144A to convey the data to the disk library 108A. Finally, the backup copy rule set 160 specifies that backup copies created according to the rule set 160 are scheduled to be generated on an hourly basis and to be retained for 30 days. In some other embodiments, scheduling information is not included in the storage policy 148A, and is instead specified by a separate scheduling policy.

The disaster recovery copy rule set 162 is associated with the same two sub-clients 166, 168. However, the disaster recovery copy rule set 162 is associated with the tape library 108B, unlike the backup copy rule set 160. Moreover, the disaster recovery copy rule set 162 specifies that a different media agent, namely 144B, will be used to convey the data to the tape library 108B. As indicated, disaster recovery copies created according to the rule set 162 will be retained for 60 days, and will be generated on a daily basis. Disaster recovery copies generated according to the disaster recovery copy rule set 162 can provide protection in the event of a disaster or other catastrophic data loss that would affect the backup copy 116A maintained on the disk library 108A.

The compliance copy rule set 164 is only associated with the email sub-client 168, and not the file system sub-client 166. Compliance copies generated according to the compliance copy rule set 164 will therefore not include primary data 112A from the file system sub-client 166. For instance, the organization may be under an obligation to store and maintain copies of email data for a particular period of time (e.g., 10 years) to comply with state or federal regulations, while similar regulations do not apply to the file system data. The compliance copy rule set 164 is associated with the same tape library 108B and media agent 144B as the disaster recovery copy rule set 162, although a different storage device or media agent could be used in other embodiments. Finally, the compliance copy rule set 164 specifies that copies generated under the compliance copy rule set 164 will be retained for 10 years, and will be generated on a quarterly basis.

At step 1, the storage manager 140 initiates a backup operation according to the backup copy rule set 160. For instance, a scheduling service running on the storage manager 140 accesses scheduling information from the backup copy rule set 160 or a separate scheduling policy associated with the client computing device 102, and initiates a backup copy operation on an hourly basis. Thus, at the scheduled time slot the storage manager 140 sends instructions to the client computing device 102 (i.e., to both data agent 142A and data agent 142B) to begin the backup operation.

At step 2, the file system data agent 142A and the email data agent 142B operating on the client computing device 102 respond to the instructions received from the storage manager 140 by accessing and processing the primary data 112A, 112B involved in the copy operation, which can be found in primary storage device 104. Because the operation is a backup copy operation, the data agent(s) 142A, 142B may format the data into a backup format or otherwise process the data.

At step 3, the client computing device 102 communicates the retrieved, processed data to the first media agent 144A, as directed by the storage manager 140, according to the backup copy rule set 160. In some other embodiments, the information management system 100 may implement a load-balancing, availability-based, or other appropriate algorithm to select from the available set of media agents 144A, 144B. Regardless of the manner the media agent 144A is selected, the storage manager 140 may further keep a record in the storage manager database 146 of the association between the selected media agent 144A and the client computing device 102 and/or between the selected media agent 144A and the backup copy 116A.

The target media agent 144A receives the data from the client computing device 102, and at step 4 conveys the data to the disk library 108A to create the backup copy 116A, again at the direction of the storage manager 140 and according to the backup copy rule set 160. The secondary storage device 108A can be selected in other ways. For instance, the media agent 144A may have a dedicated association with a particular secondary storage device(s), or the storage manager 140 or media agent 144A may select from a plurality of secondary storage devices, e.g., according to availability, using one of the techniques described in U.S. Pat. No. 7,246,207, which is incorporated by reference herein.

The media agent 144A can also update its index 153 to include data and/or metadata related to the backup copy 116A, such as information indicating where the backup copy 116A resides on the disk library 108A, data and metadata for cache retrieval, etc. The storage manager 140 may similarly update its index 150 to include information relating to the storage operation, such as information relating to the type of storage operation, a physical location associated with one or more copies created by the storage operation, the time the storage operation was performed, status information relating to the storage operation, the components involved in the storage operation, and the like. In some cases, the storage manager 140 may update its index 150 to include some or all of the information stored in the index 153 of the media agent 144A. After the 30 day retention period expires, the storage manager 140 instructs the media agent 144A to delete the backup copy 116A from the disk library 108A. Indexes 150 and/or 153 are updated accordingly.

At step 5, the storage manager 140 initiates the creation of a disaster recovery copy 116B according to the disaster recovery copy rule set 162.

At step 6, illustratively based on the instructions received from the storage manager 140 at step 5, the specified media agent 144B retrieves the most recent backup copy 116A from the disk library 108A.

At step 7, again at the direction of the storage manager 140 and as specified in the disaster recovery copy rule set 162, the media agent 144B uses the retrieved data to create a disaster recovery copy 116B on the tape library 108B. In some cases, the disaster recovery copy 116B is a direct, mirror copy of the backup copy 116A, and remains in the backup format. In other embodiments, the disaster recovery copy 116B may be generated in some other manner, such as by using the primary data 112A, 112B from the primary storage device 104 as source data. The disaster recovery copy operation is initiated once a day and the disaster recovery copies 116B are deleted after 60 days; indexes are updated accordingly when/after each information management operation is executed/completed.

At step 8, the storage manager 140 initiates the creation of a compliance copy 116C, according to the compliance copy rule set 164. For instance, the storage manager 140 instructs the media agent 144B to create the compliance copy 116C on the tape library 108B at step 9, as specified in the compliance copy rule set 164. In the example, the compliance copy 116C is generated using the disaster recovery copy 116B. In other embodiments, the compliance copy 116C is instead generated using either the primary data 112B corresponding to the email sub-client or using the backup copy 116A from the disk library 108A as source data. As specified, in the illustrated example, compliance copies 116C are created quarterly, and are deleted after ten years, and indexes are kept up-to-date accordingly.

While not shown in FIG. 1E, at some later point in time, a restore operation can be initiated involving one or more of the secondary copies 116A, 116B, 116C. As one example, a user may manually initiate a restore of the backup copy 116A by interacting with the user interface 158 of the storage manager 140. The storage manager 140 then accesses data in its index 150 (and/or the respective storage policy 148A) associated with the selected backup copy 116A to identify the appropriate media agent 144A and/or secondary storage device 108A.

In other cases, a media agent may be selected for use in the restore operation based on a load balancing algorithm, an availability based algorithm, or other criteria. The selected media agent 144A retrieves the data from the disk library 108A. For instance, the media agent 144A may access its index 153 to identify a location of the backup copy 116A on the disk library 108A, or may access location information residing on the disk 108A itself.

When the backup copy 116A was recently created or accessed, the media agent 144A accesses a cached version of the backup copy 116A residing in the index 153, without having to access the disk library 108A for some or all of the data. Once it has retrieved the backup copy 116A, the media agent 144A communicates the data to the source client computing device 102. Upon receipt, the file system data agent 142A and the email data agent 142B may unpackage (e.g., restore from a backup format to the native application format) the data in the backup copy 116A and restore the unpackaged data to the primary storage device 104.

Exemplary Applications of Storage Policies

The storage manager 140 may permit a user to specify aspects of the storage policy 148A. For example, the storage policy can be modified to include information governance policies to define how data should be managed in order to comply with a certain regulation or business objective. The various policies may be stored, for example, in the management database 146. An information governance policy may comprise a classification policy, which is described herein. An information governance policy may align with one or more compliance tasks that are imposed by regulations or business requirements. Examples of information governance policies might include a Sarbanes-Oxley policy, a HIPAA policy, an electronic discovery (E-Discovery) policy, and so on.

Information governance policies allow administrators to obtain different perspectives on all of an organization's online and offline data, without the need for a dedicated data silo created solely for each different viewpoint. As described previously, the data storage systems herein build a centralized index that reflects the contents of a distributed data set that spans numerous clients and storage devices, including both primary and secondary copies, and online and offline copies. An organization may apply multiple information governance policies in a top-down manner over that unified data set and indexing schema in order to permit an organization to view and manipulate the single data set through different lenses, each of which is adapted to a particular compliance or business goal. Thus, for example, by applying an E-discovery policy and a Sarbanes-Oxley policy, two different groups of users in an organization can conduct two very different analyses of the same underlying physical set of data copies, which may be distributed throughout the organization and information management system.

A classification policy defines a taxonomy of classification terms or tags relevant to a compliance task and/or business objective. A classification policy may also associate a defined tag with a classification rule. A classification rule defines a particular combination of criteria, such as users who have created, accessed or modified a document or data object; file or application types; content or metadata keywords; clients or storage locations; dates of data creation and/or access; review status or other status within a workflow (e.g., reviewed or un-reviewed); modification times or types of modifications; and/or any other data attributes in any combination, without limitation. A classification rule may also be defined using other classification tags in the taxonomy. The various criteria used to define a classification rule may be combined in any suitable fashion, for example, via Boolean operators, to define a complex classification rule. As an example, an E-discovery classification policy might define a classification tag "privileged" that is associated with documents or data objects that (1) were created or modified by legal department staff, or (2) were sent to or received from outside counsel via email, or (3) contain one of the following keywords: "privileged" or "attorney" or "counsel", or other like terms.

One specific type of classification tag, which may be added to an index at the time of indexing, is an entity tag. An entity tag may be, for example, any content that matches a defined data mask format. Examples of entity tags might include, e.g., social security numbers (e.g., any numerical content matching the formatting mask XXX-XX-XXXX), credit card numbers (e.g., content having a 13-16 digit string of numbers), SKU numbers, product numbers, etc.

A user may define a classification policy by indicating criteria, parameters or descriptors of the policy via a graphical user interface, such as a form or page with fields to be filled in, pull-down menus or entries allowing one or more of several options to be selected, buttons, sliders, hypertext links or other known user interface tools for receiving user input, etc. For example, a user may define certain entity tags, such as a particular product number or project ID code that is relevant in the organization. In some implementations, the classification policy can be implemented using cloud-based techniques. For example, the storage devices may be cloud storage devices, and the storage manager 140 may execute cloud service provider API over a network to classify data stored on cloud storage devices.

Exemplary Secondary Copy Formatting

The formatting and structure of secondary copies 116 can vary, depending on the embodiment. In some cases, secondary copies 116 are formatted as a series of logical data units or "chunks" (e.g., 512 MB, 1 GB, 2 GB, 4 GB, or 8 GB chunks). This can facilitate efficient communication and writing to secondary storage devices 108, e.g., according to resource availability. For example, a single secondary copy 116 may be written on a chunk-by-chunk basis to a single secondary storage device 108 or across multiple secondary storage devices 108. In some cases, users can select different chunk sizes, e.g., to improve throughput to tape storage devices.

Generally, each chunk can include a header and a payload. The payload can include files (or other data units) or subsets thereof included in the chunk, whereas the chunk header generally includes metadata relating to the chunk, some or all of which may be derived from the payload. For example, during a secondary copy operation, the media agent 144, storage manager 140, or other component may divide the associated files into chunks and generate headers for each chunk by processing the constituent files. The headers can include a variety of information such as file identifier(s), volume(s), offset(s), or other information associated with the payload data items, a chunk sequence number, etc. Importantly, in addition to being stored with the secondary copy 116 on the secondary storage device 108, the chunk headers can also be stored to the index 153 of the associated media agent(s) 144 and/or the index 150. This is useful in some cases for providing faster processing of secondary copies 116 during restores or other operations. In some cases, once a chunk is successfully transferred to a secondary storage device 108, the secondary storage device 108 returns an indication of receipt, e.g., to the media agent 144 and/or storage manager 140, which may update their respective indexes 153, 150 accordingly. During restore, chunks may be processed (e.g., by the media agent 144) according to the information in the chunk header to reassemble the files.

Data can also be communicated within the information management system 100 in data channels that connect the client computing devices 102 to the secondary storage devices 108. These data channels can be referred to as "data streams", and multiple data streams can be employed to parallelize an information management operation, improving data transfer rate, among providing other advantages. Example data formatting techniques including techniques involving data streaming, chunking, and the use of other data structures in creating copies (e.g., secondary copies) are described in U.S. Pat. Nos. 7,315,923 and 8,156,086, and 8,578,120, each of which is incorporated by reference herein.

Figure 1F:
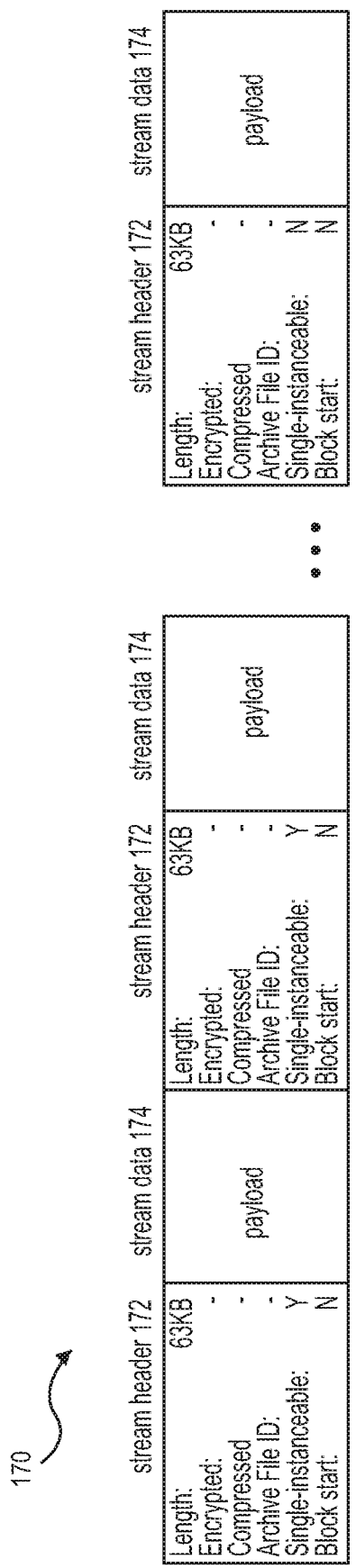
FIGS. 1F-1H are block diagrams illustrating suitable data structures that may be employed by the information management system.
Figure 1G:
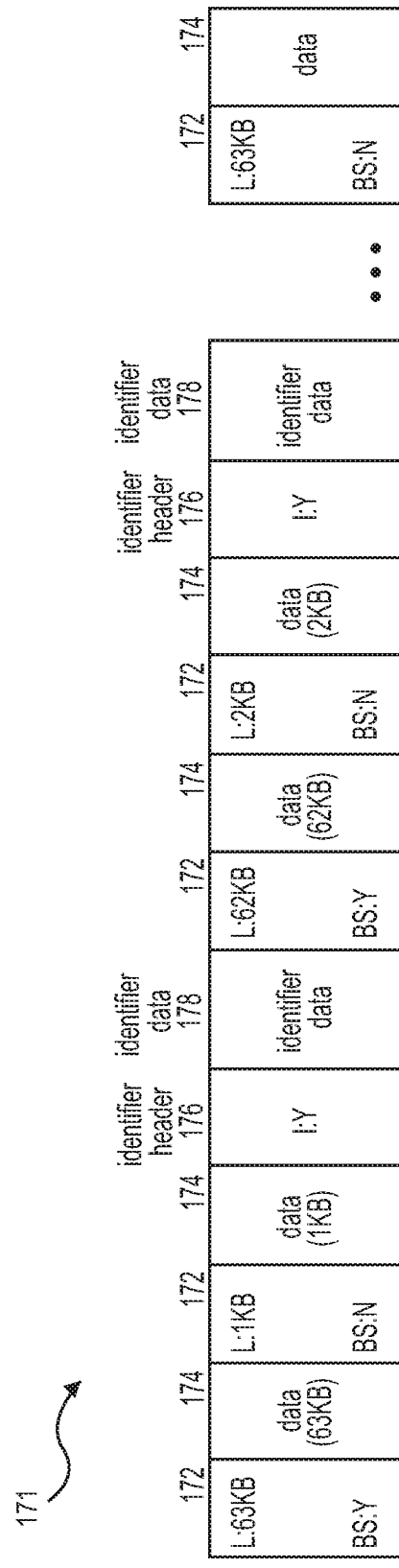

FIGS. 1F and 1G are diagrams of example data streams 170 and 171, respectively, which may be employed for performing data storage operations. Referring to FIG. 1F, the data agent 142 forms the data stream 170 from the data associated with a client computing device 102 (e.g., primary data 112). The data stream 170 is composed of multiple pairs of stream header 172 and stream data (or stream payload) 174. The data streams 170 and 171 shown in the illustrated example are for a single-instanced storage operation, and a stream payload 174 therefore may include both single-instance ("SI") data and/or non-SI data. A stream header 172 includes metadata about the stream payload 174. This metadata may include, for example, a length of the stream payload 174, an indication of whether the stream payload 174 is encrypted, an indication of whether the stream payload 174 is compressed, an archive file identifier (ID), an indication of whether the stream payload 174 is single instanceable, and an indication of whether the stream payload 174 is a start of a block of data.

Referring to FIG. 1G, the data stream 171 has the stream header 172 and stream payload 174 aligned into multiple data blocks. In this example, the data blocks are of size 64 KB. The first two stream header 172 and stream payload 174 pairs comprise a first data block of size 64 KB. The first stream header 172 indicates that the length of the succeeding stream payload 174 is 63 KB and that it is the start of a data block. The next stream header 172 indicates that the succeeding stream payload 174 has a length of 1 KB and that it is not the start of a new data block. Immediately following stream payload 174 is a pair comprising an identifier header 176 and identifier data 178. The identifier header 176 includes an indication that the succeeding identifier data 178 includes the identifier for the immediately previous data block. The identifier data 178 includes the identifier that the data agent 142 generated for the data block. The data stream 171 also includes other stream header 172 and stream payload 174 pairs, which may be for SI data and/or for non-SI data.

Figure 1H:
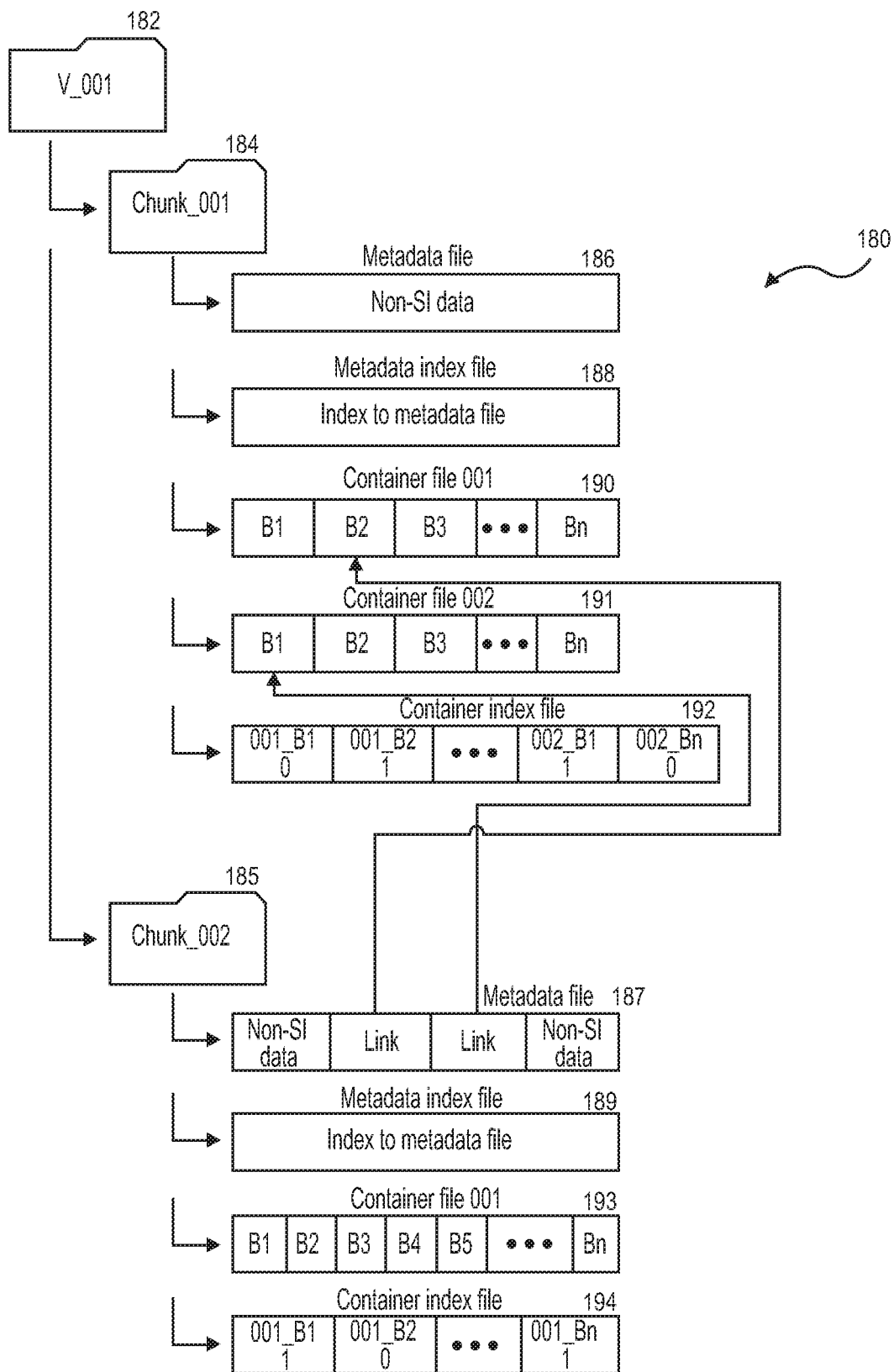

FIG. 1H is a diagram illustrating the data structures 180 that may be used to store blocks of SI data and non-SI data on the storage device (e.g., secondary storage device 108). According to certain embodiments, the data structures 180 do not form part of a native file system of the storage device. The data structures 180 include one or more volume folders 182, one or more chunk folders 184/185 within the volume folder 182, and multiple files within the chunk folder 184. Each chunk folder 184/185 includes a metadata file 186/187, a metadata index file 188/189, one or more container files 190/191/193, and a container index file 192/194. The metadata file 186/187 stores non-SI data blocks as well as links to SI data blocks stored in container files. The metadata index file 188/189 stores an index to the data in the metadata file 186/187. The container files 190/191/193 store SI data blocks. The container index file 192/194 stores an index to the container files 190/191/193. Among other things, the container index file 192/194 stores an indication of whether a corresponding block in a container file 190/191/193 is referred to by a link in a metadata file 186/187. For example, data block B2 in the container file 190 is referred to by a link in the metadata file 187 in the chunk folder 185. Accordingly, the corresponding index entry in the container index file 192 indicates that the data block B2 in the container file 190 is referred to. As another example, data block B1 in the container file 191 is referred to by a link in the metadata file 187, and so the corresponding index entry in the container index file 192 indicates that this data block is referred to.

As an example, the data structures 180 illustrated in FIG. 1H may have been created as a result of two storage operations involving two client computing devices 102. For example, a first storage operation on a first client computing device 102 could result in the creation of the first chunk folder 184, and a second storage operation on a second client computing device 102 could result in the creation of the second chunk folder 185. The container files 190/191 in the first chunk folder 184 would contain the blocks of SI data of the first client computing device 102. If the two client computing devices 102 have substantially similar data, the second storage operation on the data of the second client computing device 102 would result in the media agent 144 storing primarily links to the data blocks of the first client computing device 102 that are already stored in the container files 190/191. Accordingly, while a first storage operation may result in storing nearly all of the data subject to the storage operation, subsequent storage operations involving similar data may result in substantial data storage space savings, because links to already stored data blocks can be stored instead of additional instances of data blocks.

If the operating system of the secondary storage computing device 106 on which the media agent 144 operates supports sparse files, then when the media agent 144 creates container files 190/191/193, it can create them as sparse files. A sparse file is type of file that may include empty space (e.g., a sparse file may have real data within it, such as at the beginning of the file and/or at the end of the file, but may also have empty space in it that is not storing actual data, such as a contiguous range of bytes all having a value of zero). Having the container files 190/191/193 be sparse files allows the media agent 144 to free up space in the container files 190/191/193 when blocks of data in the container files 190/191/193 no longer need to be stored on the storage devices. In some examples, the media agent 144 creates a new container file 190/191/193 when a container file 190/191/193 either includes 100 blocks of data or when the size of the container file 190 exceeds 50 MB. In other examples, the media agent 144 creates a new container file 190/191/193 when a container file 190/191/193 satisfies other criteria (e.g., it contains from approximately 100 to approximately 1000 blocks or when its size exceeds approximately 50 MB to 1 GB).

In some cases, a file on which a storage operation is performed may comprise a large number of data blocks. For example, a 100 MB file may comprise 400 data blocks of size 256 KB. If such a file is to be stored, its data blocks may span more than one container file, or even more than one chunk folder. As another example, a database file of 20 GB may comprise over 40,000 data blocks of size 512 KB. If such a database file is to be stored, its data blocks will likely span multiple container files, multiple chunk folders, and potentially multiple volume folders. Restoring such files may require accessing multiple container files, chunk folders, and/or volume folders to obtain the requisite data blocks.

Intelligent Local Management of Data Stream Throttling in Secondary-Copy Operations As described in detail above, to create a secondary copy 116 involving the copying/moving of data from primary storage subsystem 117 to secondary storage subsystem 118, the data agent associated with the source data as well as the destination media agent associated with the secondary storage device both participate in executing a secondary-copy job. In some cases, e.g., with auxiliary copies, secondary copies 116 are copied/moved to other secondary copies, within the scope of the secondary storage subsystem 118, in which case source and destination media agents are involved. Accordingly, a "secondary-copy job" may comprise data movement operations in which a secondary copy is created from a source, whether the source is primary data or a secondary copy. Thus, a secondary-copy job may include any of the data movement operations described above, including one or more of: backup, archive, snapshot, replication, deduplication/single-instancing, hierarchical storage and lifecycle management of stored data, auxiliary copies and/or disaster recovery copies, without limitation.

FIG. 2 is a block diagram illustrating some salient portions of a system 200 for intelligent local management of data stream throttling in secondary storage operations, according to an illustrative embodiment of the present invention. System 200 is a storage management system that may be an embodiment of an enhanced information management system. FIG. 2 depicts the following illustrative components of storage management system 200: primary storage device (e.g., local disk) 104, which stores primary data 112 (e.g., 112-1, 112-2, 112-3, etc.); secondary storage device (e.g., disk array) 108, which stores secondary data 116 (e.g., 116-1, 116-2, 116-3, etc.); client computing device 202 comprising enhanced throttling client-based sub-system 282; secondary storage computing device 206 comprising enhanced throttling media agent-based sub-system 286; communications network 222 providing a communications bandwidth 223 available for data streams 272; data streams 272; data streams 274; and storage manager 240 comprising (or associated with) management database 146.

Primary storage device (e.g., local disk) 104, primary data 112 (e.g., 112-1, 112-2, 112-3, etc.), secondary storage device (e.g., disk array) 108, secondary data 116 (e.g., 116-1, 116-2, 116-3, etc.), and management database 146 were described in detail above. In regard to system 200, there is no limitation on the type of data that may be embodied and/or comprised in primary data elements 112, e.g., files, directories, databases, virtual machines, etc. Likewise, there is no limitation on the type of data that is embodied and/or comprised in secondary data elements 116, e.g., files, directories, databases, virtual machines, etc.

Client computing device 202 is analogous to client computing device 102 described in detail above and further comprises additional functionality for operating in system 200, e.g., enhanced throttling client-based sub-system 282. When primary data accessible to client computing device 202, such as primary data 112, is backed up or otherwise undergoes a secondary-copy operation, the primary data (e.g., 112-1) is transferred in a secondary-copy job from the primary storage device 104 to a secondary storage device, e.g., 108, via one or more data streams that originate at client computing device 202 and terminate to secondary storage computing device 206, e.g., data streams 272.

Secondary storage computing device 206 is analogous to secondary storage computing device 106 described in detail above and further comprises additional functionality for operating in system 200, e.g., enhanced throttling media agent-based sub-system 286.

Communications network 222 is well known in the art and provides communications interconnectivity between two or more components of system 200. Examples of suitable communications infrastructure that may be used for network 222 are described above in regard to communication pathways 114.

Communications bandwidth 223 is provided by communications network 222 for the transmission of data via data streams 272. Any bandwidth value may be suitable, without limitation, for communications bandwidth 223 collectively and for the individual data streams 272.

Storage manager 240 is analogous to storage manager 140 described above and may further comprise additional functionality for operating in system 200, e.g., additional tracking relative to data streams operating from/to client computing devices 202 and/or secondary storage computing devices 206—although these features are not necessary to the operation of the illustrative embodiment. Storage manager 240 also comprises (or, in alternative embodiments is associated with) management database 146, which was described in more detail above. For example, storage policies that govern secondary-copy jobs relative to primary data 112 may be stored in management database 146.

Data streams 272 illustratively originate from client computing device 202 (e.g., enhanced throttling client-based sub-system 282) and terminate to secondary storage computing device 206 (e.g., enhanced throttling media agent-based sub-system 286). Each data stream thus represents a transfer of data, such as within the context of a copy job from source to destination, e.g., a backup job, an archive job, etc. As explained in more detail below, data streams 272 are dynamic, because some streams carry data during a given secondary-copy job and then end when the job completes. In a failure scenario, a data stream may fail and become unresponsive even though the job has not completed. Other data streams 272 may be added for other secondary-copy jobs and may later end when the respective job completes. Moreover, thanks to local control according to the illustrative embodiment, one or more data streams 272 and/or data streams 274 may be suspended, paused, and resumed on-demand, based on user input to the local client computing device 202 or secondary storage computing device 206 (see, e.g., FIGS. 6 and 8 for more detail).

Data streams 274 illustratively originate from secondary storage computing device 206 (e.g., enhanced throttling media agent-based sub-system 286) and terminate to secondary storage device 108, where the secondary copies generated in the secondary-copy job are stored. The number of data streams 272 need not equal the number of data streams 274 at any given time, because resources and bandwidth may differ in the respective data pathways.

Enhanced throttling client-based sub-system 282 and media agent-based sub-system 286 are functional components that may execute on any number of client computing devices 202 and secondary storage computing devices 206, respectively, in system 200. Enhanced throttling client-based sub-system 282 and media agent-based sub-system 286 are described in more detail below.

System 200 may comprise any number of client computing devices 202 and corresponding enhanced throttling client-based sub-systems 282 and any number of secondary storage computing devices 206 and corresponding enhanced throttling media agent-based sub-systems 286, without limitation. System 200 may comprise any number of data streams 272 and data streams 274 to support any number of secondary-copy jobs.

Figure 3:
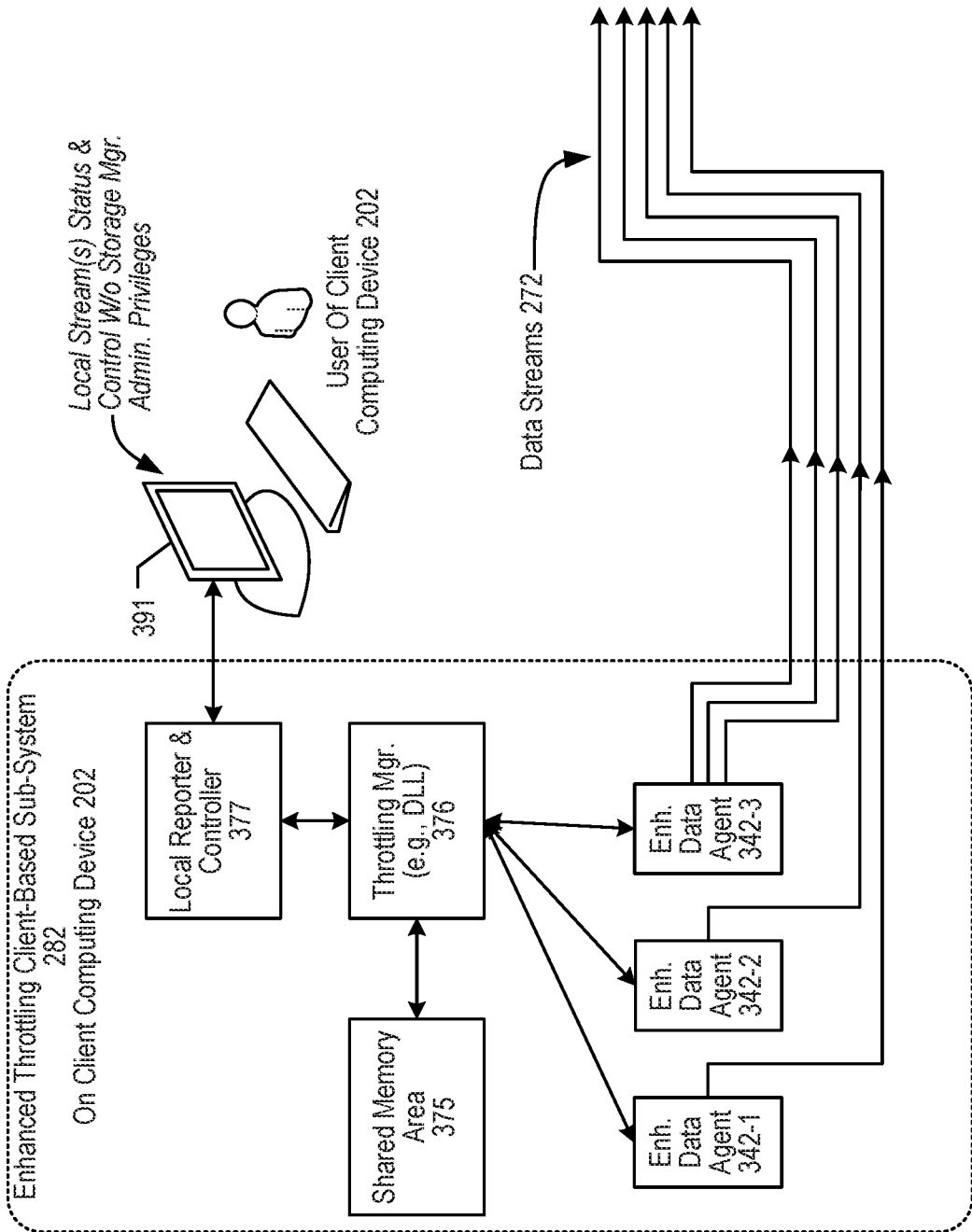
FIG. 3 is a block diagram illustrating some salient details of system 200, including enhanced throttling client-based sub-system 282 on client computing device 202, according to an illustrative embodiment of the present invention.

FIG. 3 is a block diagram illustrating some salient details of system 200, including enhanced throttling client-based sub-system 282 on client computing device 202, according to an illustrative embodiment of the present invention. FIG. 3 depicts enhanced throttling client-based sub-system 282, console 391, and data streams 272, which were described above.

Enhanced throttling client-based sub-system 282 (or "sub-system 282") may logically comprise: enhanced data agents 342 (e.g., 342-1, 342-2, 342-3), shared memory 375, throttling manager 376, and local reporter and controller 377.

Figure 5:
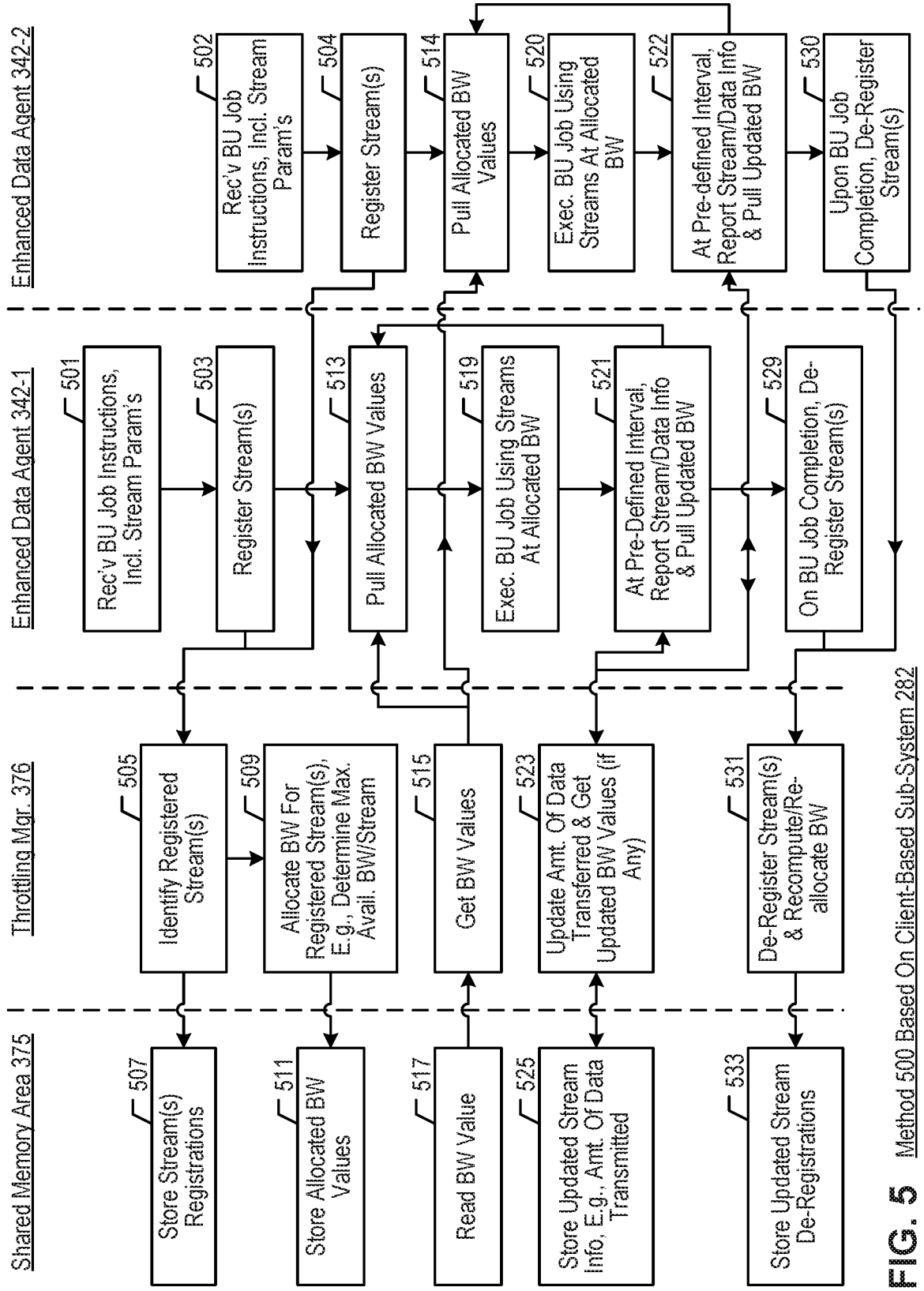
FIG. 5 depicts some salient operations of a method 500, based on enhanced throttling client-based sub-system 282, according to an illustrative embodiment of the present invention.
Figure 6:
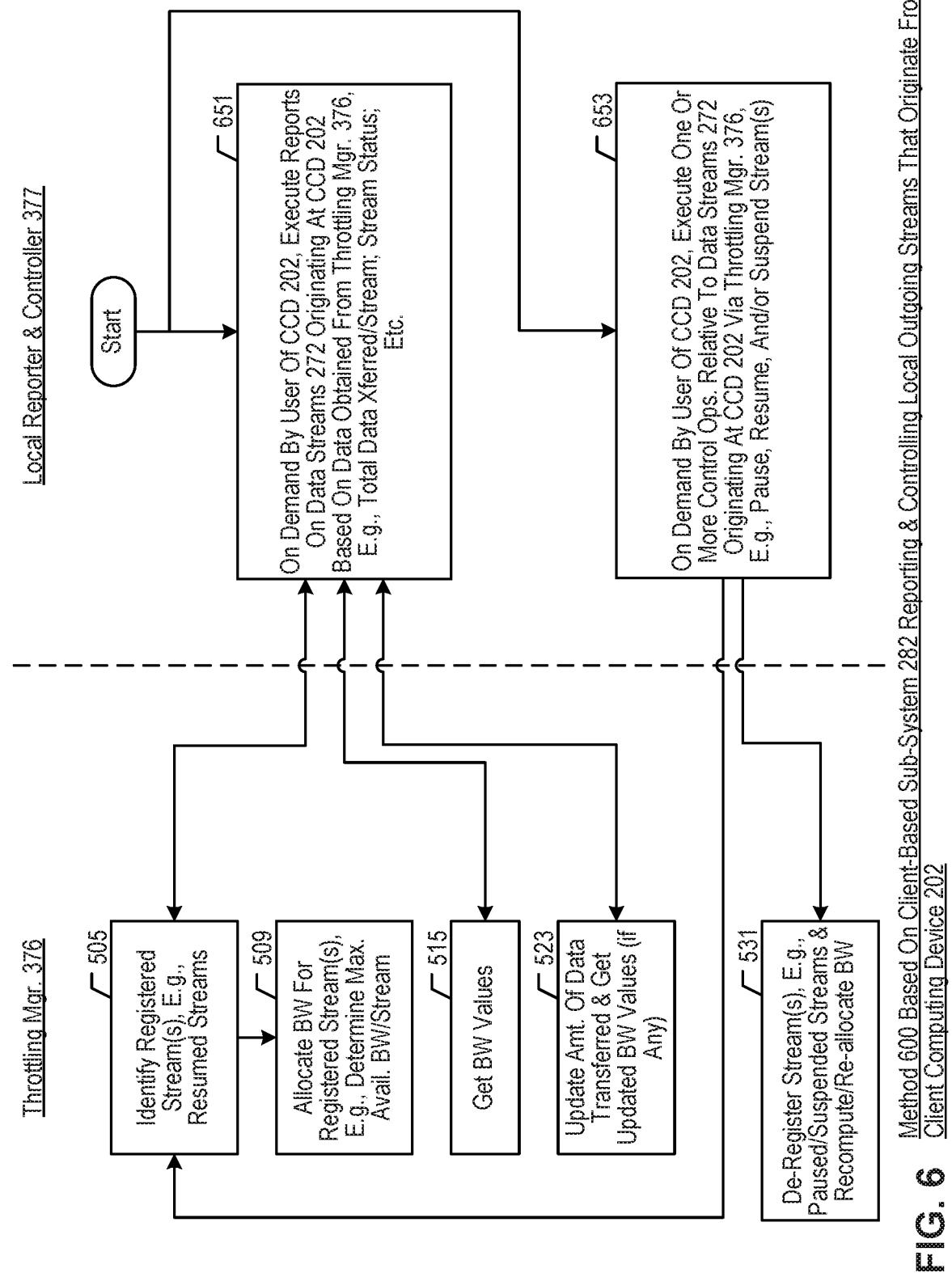
FIG. 6 depicts some salient operations of a method 600, based on enhanced throttling client-based sub-system 282 reporting and controlling local outgoing data streams originating from client computing device 202, according to an illustrative embodiment of the present invention.

Enhanced data agent 342 is analogous to data agent 142 described in detail above and further comprises additional functionality for operating in system 200, e.g., for interoperating with throttling manager 376 (see also FIGS. 5 and 6). There is no limitation on the type of data agent that may be an enhanced data agent 342, e.g., data agent for a file system, data agent for a database, data agent for a virtual machine, etc. When executing (or participating in) a secondary-copy job, a data agent 342 may perform some processing of the primary data with which it is associated (e.g., from the source file system, database, virtual machine, etc.) and may then transmit the processed data to an appropriate media agent via one or more data streams 272, as instructed by storage manager 240 (e.g., how many data streams 272 to media agent 444 to configure for the present job). According to the illustrative embodiment, the instructions received from storage manager 240 may be augmented by additional operations, such as registering the configured data streams with throttling manager 376 and/or locally suspending, pausing and/or resuming data streams according to user input. See also FIGS. 5 and 6.

Shared memory area 375 may be a portion of main memory and/or local cache that stores data needed by certain operations in system 200. Shared memory technology is well known in the art. The role of shared memory area 375 is described in more detail in subsequent figures.

Throttling manager 376 is a functional component of client computing device 202, which may be implemented as executable software and/or firmware, and may operate as a dynamic-link library (DLL). When it executes according to the illustrative embodiment, throttling manager 376 is generally responsible for intelligently managing whether and how data streams are throttled when they originate from client computing device 202, e.g., in the course of performing secondary-copy jobs. Illustratively, throttling manager 376 may interoperate with one or more data agents 342 that co-reside and also execute on client computing device 202 and may further interoperate with local reporter and controller 377, which also resides and operates on client computing device 202. Throttling manager 376 creates "awareness" of data streams across multiple data agents, which is not a capability found in the prior art, and accordingly may allocate and re-allocate bandwidth to the various originating data streams to improve the use of existing available bandwidth. Throttling manager 376 also may suspend, pause, and/or resume data streams on demand, in response to user input received via local reporter and controller 377, and may also supply metadata to local reporter and controller 377 for reporting to users. More details on the functionality of throttling manager 376 are provided in subsequent figures.

Local reporter and controller 377 is a functional component of client computing device 202, and may be implemented as executable software and/or firmware. When it executes according to the illustrative embodiment, local reporter and controller 377 may: provide a user interface to users, transmit user requests to throttling manager 376, and report results to users via the user interface, without limitation. For example, a user request to suspend a data stream that is currently active and originating from client computing device 202 may be transmitted to throttling manager 376, which in turn may suspend the data stream and re-allocate the available bandwidth to other data streams. Accordingly, local reporter and controller 377 may be said to cause the data stream to be suspended (or paused or resumed). For example, a user request to view all currently active/operating data streams that originate from client computing device 202 may be transmitted to throttling manager 376, and the responsive data may be obtained by throttling manager 376 and provided to local reporter and controller 377, which may process the responsive data and present it to the requesting user. Alternatively, throttling manager 376 may process the responsive data and provide pre-processed results to local reporter and controller 377 for presentation to the user. Local reporter and controller 377 enables the user to obtain reports about the local data streams operating at client computing device 202, e.g., data streams 272, and also provides the user with a measure of control over those local data streams, e.g., requesting that one or more data streams be suspended, paused, and/or resumed. Notably, according to the illustrative embodiment, this measure of control is given to the user without administrator privileges and/or without access to storage manager 240, which generally manages storage management system 200, including secondary-copy operations. Instead, the present user receives a certain scope of control over data streams on the local machine.

Both modules 376 and 377 are shown herein as distinct components to ease understanding of the present disclosure, however, alternative embodiments are also possible within the scope of the present invention. Module 376 and/or module 377 may be embodied as a unified module within client computing device 202, combined or layered on existing data agent code, or may be a logical construct with distributed functionality operating on client computing device 202—and in any combination thereof.

Console 391 is a component well known in the art, which, according to the illustrative embodiment, displays to a local human user an interface that gives the human user access to client computing device 202 (or, as shown in a later figure, access to secondary storage computing device 206).

Figure 4:
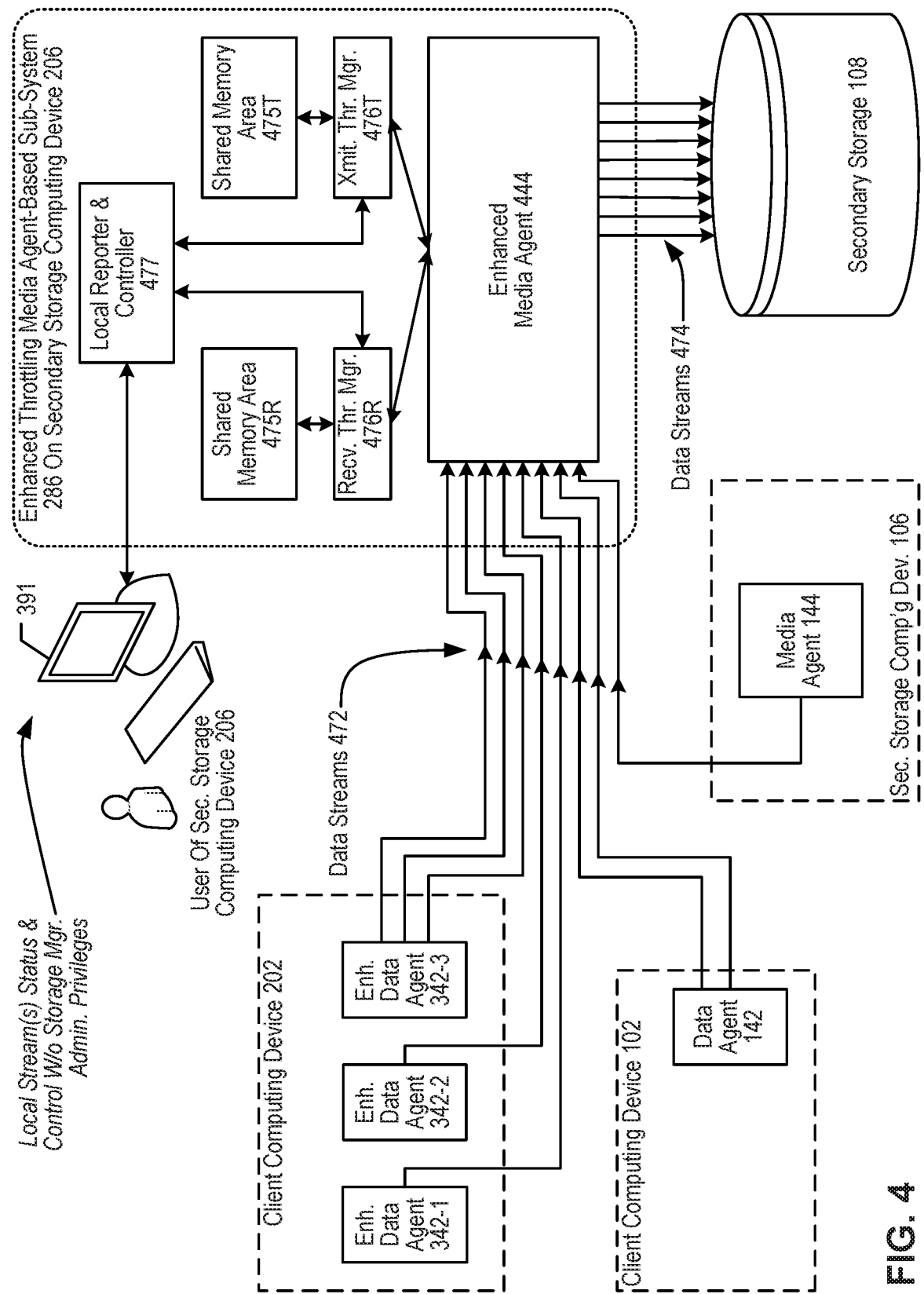
FIG. 4 is a block diagram illustrating some salient details of system 200, including enhanced throttling media agent-based sub-system 286 on secondary storage computing device 206, according to an illustrative embodiment of the present invention.

FIG. 4 is a block diagram illustrating some salient details of system 200, including enhanced throttling media agent-based sub-system 286 on secondary storage computing device 206, according to an illustrative embodiment of the present invention. The present figure depicts: client computing device 102 comprising a data agent 142; secondary storage computing device 206 comprising media agent 144; client computing device 202 comprising data agents 342 (e.g., 342-1, 342-2, 342-3, etc.); console 391; enhanced throttling media agent-based sub-system 286 operating on secondary storage computing device 206 and comprising enhanced media agent 444, shared memory area 475R, shared memory area 475T, receiving throttling manager 476R, transmitting throttling manager 476T, and local reporter and controller 477; and secondary storage device 108. Data streams 472 and data streams 474 are also shown. Components 102, 106, 108, 142, 144, 342, and 391 were described in detail above.

Enhanced media agent 444 is a media agent analogous to media agent 144 described in detail above and further comprises additional functionality for operating in system 200, e.g., receiving throttling manager 476R and/or transmitting throttling manager 476T. There is no limitation on the type of media agent that may be an enhanced media agent 444, nor is there a limitation on the type of secondary storage device that media agent 444 may access and/or manage. When executing (or participating in) a secondary-copy job, a media agent 444 may perform some processing (e.g., compression, deduplication, etc.) of the primary data it receives (e.g., from data agent 142, data agent 324, media agent 144, and/or another media agent 444) and may then transmit the processed data to an appropriate secondary storage device (e.g., 108) as instructed by storage manager 240. According to the illustrative embodiment, the instructions received from storage manager 240 (e.g., how many data streams 474 to use for communicating with secondary storage device 108) may be augmented by additional local operations, such as registering the configured data streams with throttling manager 476T and/or locally suspending, pausing and/or resuming data streams according to user input. Likewise, data streams that are incoming to media agent 444 (i.e., terminating at secondary storage computing device 206) also may be intelligently managed according to the illustrative embodiment, e.g., by using receiving throttling manager 476R. See also FIGS. 7A, 7B, and 8.

Data streams 472 may originate from one or more sources, e.g., secondary storage device 106 and/or client computing device 102 and/or client computing device 202, and may terminate to secondary storage computing device 206 (e.g., to enhanced media agent 444). Like data streams 272, data streams 472 are dynamic, because some streams carry data during a given secondary-copy job and then end when the job completes. Other data streams 472 may be added for other secondary-copy jobs and may later end when the respective job completes. Moreover, thanks to local control according to the illustrative embodiment, one or more data streams 472 and/or data streams 474 may be suspended, paused, and resumed on-demand, based on user input to the local secondary storage computing device 206 (see, e.g., FIG. 8 for more detail).

Data streams 474 illustratively originate from secondary storage computing device 206 (e.g., media agent 444) and terminate to secondary storage device 108, where the secondary copies generated in the secondary-copy job are stored. The number of data streams 472 need not equal the number of data streams 474 at any given time, because resources and bandwidth may differ in the respective data pathways.

Shared memory areas 475R and 475T are analogous to shared memory 375. Shared memory area 475R generally pertains to managing incoming data streams 472. Shared memory area 475T generally pertains to managing outgoing (originating) data streams 474. Shared memory technology is well known in the art. The role of shared memory areas 475R and 475T is described in more detail in subsequent figures, e.g., FIG. 7A, 7B, respectively.

Receiving throttling manager 476R is a functional component of secondary storage computing device 206 and may be implemented as executable software and/or firmware and may operate as a dynamic-link library (DLL). When it executes according to the illustrative embodiment, receiving throttling manager 476R is generally responsible for intelligently managing whether and how incoming data streams are throttled when they terminate to secondary storage computing device 206, e.g., in the course of performing secondary-copy jobs. Illustratively, receiving throttling manager 476R may interoperate with one or more media agents 444 that co-reside and also execute on secondary storage computing device 206 and may further interoperate with local reporter and controller 477, which also operates on secondary storage computing device 206.

Transmitting throttling manager 476T, which may be analogous to throttling manager 376, is a functional component of secondary storage computing device 206 and may be implemented as executable software and/or firmware and may operate as a dynamic-link library (DLL). When it executes according to the illustrative embodiment, transmitting throttling manager 476T is generally responsible for intelligently managing whether and how data streams are throttled when they originate from secondary storage computing device 206, e.g., in the course of performing secondary-copy jobs. Illustratively, transmitting throttling manager 476T may interoperate with one or more media agents 444 that co-reside and also execute on secondary storage computing device 206 and may further interoperate with local reporter and controller 477, which also operates thereon as shown.

Local reporter and controller 477 is analogous to module 377 described above, and is a functional component of secondary storage computing device 206, and may be implemented as executable software and/or firmware. Local reporter and controller 477 may interoperate with both receiving throttling manager 476R in regard to incoming data streams 472 and with transmitting throttling manager 476T in regard to outgoing data streams 474. User communications may be implemented via console 391 as described in a previous figure.

Modules 476R, 476T, and 477 are shown herein as distinct components to ease understanding of the present disclosure, however, alternative embodiments are also possible within the scope of the present invention. One or more of these modules may be embodied as a unified module within secondary storage computing device 206, layered on existing media agent code, or may be a logical construct with distributed functionality operating on client computing device 206—and in any combination thereof.

FIG. 5 depicts some salient operations of a method 500, based on enhanced throttling client-based sub-system 282 operating on client computing device 202, according to an illustrative embodiment of the present invention. Illustrative operations may be executed by one or more of the following components: shared memory area 375; throttling manager 376; enhanced data agent 342-1; and enhanced data agent 342-2. Data streams 272 may be referenced but are not shown in the present figure.

At block 501, data agent 342-1 may receive job instructions for a secondary-copy job, such as a backup job, and archive job, etc. that necessitates moving data associated with the given data agent 342-1 from primary storage device 104 to secondary storage device 108. The job instructions may be received from storage manager 240. The job instructions may include parameters for data streams 272, e.g., how many data streams 272 to use for the job, what bandwidth to make available for the job, what priority the job has, etc.

Block 502 is similar to block 501, but operates relative to data agent 342-2 and may occur asynchronously to block 501.

At block 503, data agent 342-1 may register the one or more streams with throttling manager 376. Accordingly, data agent 342-1 may transmit one or more respective registrations for the data streams 272 that it was instructed to establish according to the parameters received from storage manager 240.

Block 504 is similar to block 503, but operates relative to data agent 342-2 and may occur asynchronously to block 503.

At block 505, throttling manager 376 may receive the one or more data stream registrations from data agent 342-1 and/or 342-2. Consequently, throttling manager 376 may identify all the data streams 272 that are registered by data agents 342-1 and 342-2 and any other data agents 342 operating on client computing device 202. Throttling manager 376 may store the received stream registrations and any corresponding parameters to shared memory area 375, as shown by block 507.

At block 509, throttling manager 376 may allocate appropriate bandwidth values to the identified registered data streams. For example, throttling manager 376 may allocate the entirety of the available bandwidth 223 equally to all the registered data streams 272. Alternatively, different bandwidth values may be allocated to data streams associated with a given data agent (e.g., 342-1) or with a given secondary-copy job versus other data streams that may be associated with another data agent (e.g., 342-2) or with another secondary-copy job. For example, more collective and/or per-stream bandwidth may be allocated for data streams for a database backup job as compared to data streams for a file system archive job. In general, the objective of block 509 (and later block 531) is to allocate all available bandwidth 223 among the currently registered data streams 272 so that overall bandwidth usage may be maximized even as jobs and their constituent data streams begin and end. Accordingly, throttling manager 376 may store the allocated bandwidth values for the various registered data streams to shared memory area 375, as shown by block 511. Block 509 provides system 200 with dynamic features that are responsive to both new jobs and also to completed jobs. Thus, new jobs may add to bandwidth demand and reduce bandwidths available to ongoing jobs, whereas completed jobs may free up bandwidth to be re-allocated to other ongoing jobs (see, e.g., block 531).

At block 513, having registered one or more data streams for the present secondary-copy job, data agent 342-1 may pull from throttling manager 376 the respective bandwidth values to be used for the registered data streams—as allocated by throttling manager 376 in a preceding block.

Block 514 is similar to block 513, but operates relative to data agent 342-2 and may occur asynchronously to block 513.

At block 515, throttling manager 376 may read the allocated bandwidth values from the shared memory area 375, as shown by block 517, and transmit them to data agent 342-1 and/or 342-2 in response to the "pull" request in a preceding block.

At block 519, having pulled the bandwidth values for the registered data streams from throttling manager 376, data agent 342-1 may execute its role in the present secondary-copy job, using the data streams at their respective allocated bandwidth values.

Block 520 is similar to block 519, but operates relative to data agent 342-2 and may occur asynchronously to block 519.

At block 521, data agent 342-1 may act at a pre-defined interval, or alternatively, may act based on another pre-defined milestone, e.g., after transmitting 1 GB of data to media agent 444. Accordingly, at block 521, data agent 342-1 may report to throttling manager 376 data stream metadata as well as data transfer metadata, e.g., the number of actively operating data streams, the total amount and/or percentage of data transferred thus far by the present secondary-copy job, error statistics, effective bandwidth statistics, etc. Furthermore, data agent 342-1 may also pull from throttling manager 376 the respective bandwidth values to be used going forward for the registered data streams—which updated bandwidth values may differ from the ones allocated in an earlier block, as explained in further detail below. The present secondary-copy job may continue based on the updated bandwidth values. Thus, the present block enables ongoing secondary-copy jobs to continue based on updated bandwidth values received for the respective data streams; the updates may be based on other jobs and conditions present on client computing device 202, such as intervening jobs that may have started or completed and/or problems that may be affect the available bandwidth.

Block 522 is similar to block 521, but operates relative to data agent 342-2 and may occur asynchronously to block 521.

At block 523, throttling manager 376 may receive metadata transmitted by data agents 342-1 and 342-2 at blocks 521 and 522, respectively. Accordingly, throttling manager 376 may store the received metadata to shared memory area 375, as shown by block 525. In addition, throttling manager 376 may read bandwidth values from shared memory area 375, which bandwidth values may have been previously updated to new values based on other conditions present in the client computing device, e.g., another job may have completed as shown by blocks 529, 530, 531, and 533. Throttling manager 376 may transmit the updated bandwidth values to the respective data agents 342-1 and/or 342-1 according to blocks 521 and 522, respectively.

At block 529, data agent 342-1 may act upon the completion of the present secondary-copy job and accordingly, may de-register the data streams 272 it used in the job. Thus, data agent 342-1 may transmit one or more de-registrations of the data streams to throttling manager 376. This operation notifies throttling manager 376 that certain data streams 272 are no longer needed by data agent 342-1, which may free up bandwidth for other data streams 272 that are still operating for other ongoing jobs.

Block 530 is similar to block 529, but operates relative to data agent 342-2 and may occur asynchronously to block 529.

At block 531, throttling manager 376, having received de-registrations for data streams used in a completed job, may de-register said data streams and may update an active list of still-registered data streams 272 which are still actively carrying data in ongoing jobs. Also, in some situations, one or more data streams will fail and become unresponsive, even if the copy job has not completed, such as when a port or network component fails, or perhaps due to another network failure. A data stream that fails to report/respond to the respective data agent (or media agent) (e.g., block 521) may become de-registered; it may be reported as unresponsive to the throttling manager 376, which may then remove it from its list of active data streams; or the data agent may affirmatively transmit a de-registration to the throttling manager after determining that the data stream is unresponsive. A failed data stream may or may not cause the entire job to fail, depending on the configuration of system 200. The present operation at block 531 provides system 200 with dynamic features that are responsive to completed jobs, failed jobs, and also to new jobs (see, e.g., block 505). Furthermore, throttling manager 376 may store the de-registrations and/or the updated list of still-registered data streams to shared memory area 375, as shown by block 533.

Although FIG. 5 depicts only two data agents 342, any number of data agents 342 may interoperate with throttling manager 376 on any given client computing device 202.

FIG. 6 depicts some salient operations of a method 600, based on enhanced throttling client-based sub-system 282, which reports on and controls local outgoing data streams originating from client computing device 202, according to an illustrative embodiment of the present invention. Illustrative operations may be executed by one or more of the following components: throttling manager 376; and local reporter and controller 377. Blocks 505, 509, 515, 523, and 531, which may be executed by throttling manager 376 were described in detail in a preceding figure.

At block 651, local reporter and controller 377 may execute a number of local reporting operations on demand based on input from a user of client computing device 202. For example, the user may request a report on all data streams that originate from client computing device 202, including data streams 272, which terminate to secondary storage computing device 206. The report provided by local reporter and controller 377 may illustratively include metadata for the data streams and/or for the secondary-copy job that uses the respective data stream(s), e.g., job ID, identity of data being transferred, number of data streams used by the job, bandwidth used by each data stream and/or total for the job, amount and/or percentage of data transferred by the job thus far, start time of the job, etc.

To process the user's input and generate the on-demand report(s), local reporter and controller 377 may communicate with throttling manager 376, e.g., to/from blocks 505, 515, 523, and 531. For example, at block 505, throttling manager 376 may supply a list of registered data streams based on a query received from local reporter and controller 377. For example, at block 515, throttling manager 515 may supply respective bandwidth values allocated to the applicable data streams based on a query received from local reporter and controller 377. For example, at block 523, throttling manager 376 may supply metadata about one or more jobs and/or respective constituent data streams based on a query received from local reporter and controller 377.

At block 653, local reporter and controller 377 may execute a number of local control operations on demand based on input from a user of client computing device 202. For example, the user may indicate that a given data stream 272 should be paused, i.e., stop operating until such time as it resumes. Accordingly, a "pause" indication relative to the selected data stream may be transmitted by local reporter and controller 377 to throttling manager 376, which may cause throttling manager 376, at block 531, to de-register the selected data stream and re-allocate the available bandwidth to the remaining registered data streams, as described in more detail in a preceding figure. A user may indicate that a paused data stream should be resumed, which may cause local reporter and controller 377 to transmit a "resume" indication and may further cause throttling manager 376, at block 505, to re-register the data stream and re-allocate some appropriate bandwidth thereto as described in more detail in a preceding figure. The user may also indicate that a given data stream should be suspended, i.e., permanently ended. Accordingly, local reporter and controller 377 may transmit a "suspend" indication to throttling manager 376, which may then, at block 531, de-register the selected data stream and re-allocate the available bandwidth to the remaining registered data streams, as described in more detail in a preceding figure.

The format and appearance of the user interface to the user as well as the format and appearance of any on-demand reports and other on-demand control actions available to the user may be processed and provided by local reporter and controller 377. Notably, local reporter and controller 377 operates in reference to the local machine, i.e., client computing device 202. Furthermore, local reporter and controller 377 operates based on user input, such as report requests and control actions, and local reporter and controller 377 is not under the control or management of storage manager 240. Although storage manager 240 may govern the storage policies that drive schedules and parameters of secondary-storage jobs (e.g., identifying the data (subclient) that is the subject of the secondary-copy job, timing of the job, how many data streams to configure, the identity of the receiving media agent, etc.) and may further coordinate communications among the data agent and media agent components involved in any given job, storage manager 240 may not control what is happening at local reporter and controller 377, which provides the user with a measure of control over data streams associated with the host client computing device 202.

FIG. 7A depicts some salient operations of a method 700A, based on enhanced throttling media agent-based sub-system 286 controlling incoming streams into secondary storage computing device 206, according to an illustrative embodiment of the present invention. Illustrative operations may be executed by one or more of the following components: shared memory area for incoming data streams 475R (or "memory area 475R"); receiving throttling manager 476R; and enhanced media agent 444.

The blocks depicted in the present figure (7xx and 7xxR) generally correspond to counterpart blocks (5xx) discussed in detail in FIG. 5 above, and therefore, only salient differences therebetween are described here. For example, in contrast to FIG. 5 and throttling manager 376, receiving throttling manager 476R is concerned with incoming data streams 472 that terminate to secondary storage computing device 206. Data streams 472 may originate from a number of different sources, e.g., client computing devices 102 and/or 202, and/or secondary storage computing device 106. In the context of FIG. 7A, the sources need not be configured with enhanced data agent(s) 342 or with enhanced media agent(s) 444.

FIG. 7B depicts some salient operations of a method 700B, based on enhanced throttling media agent-based sub-system 286 controlling outgoing streams originating from secondary storage computing device 206, according to an illustrative embodiment of the present invention. Illustrative operations may be executed by one or more of the following components: shared memory area for outgoing (originating) data streams 475T (or "memory area 475T"); transmitting throttling manager 476T; and enhanced media agent 444.

The blocks depicted in the present figure (7xx and 7xxT) generally correspond to counterpart blocks (5xx) discussed in detail in FIG. 5 above, and therefore, only salient differences therebetween are described here. For example, in contrast to FIG. 5, transmitting throttling manager 476T is concerned with data streams 474 that terminate to a secondary storage device such as a disk array or tape library, e.g., 108. In some embodiments, receiving throttling manager 476R and transmitting throttling manager 476T may be installed as one unified module that may perform the roles described in FIGS. 7A, 7B, and 8.

FIG. 8 depicts some salient operations of a method 800, based on media agent-based sub-system 286, which reports on and controls local incoming and outgoing data streams into/from secondary storage computing device 206, according to an illustrative embodiment of the present invention. Illustrative operations may be executed by one or more of the following components: receiving throttling manager 476R; local reporter and controller 477, and transmitting throttling manager 476R. Blocks 7xx, 7xxR, and 7xxT were described in detail in one or more preceding figures.

At block 851, which is analogous to block 651, local reporter and controller 477 may execute a number of local reporting operations on demand based on input from a user of secondary storage computing device 206. For example, the user may request a report on all data streams that originate from and/or terminate to secondary storage computing device 206, including data streams 472 and 474. The report provided by local reporter and controller 477 may illustratively include metadata for the data streams and/or for the secondary-copy job that uses the respective data stream(s), e.g., job ID, identity of data being transferred, number of data streams used by the job, bandwidth used by each data stream and/or total for the job, amount and/or percentage of data transferred by the job thus far, start time of the job, etc. To process the user's input and generate the on-demand report(s), local reporter and controller 477 may communicate with throttling managers 476R and/or 475T, e.g., to/from blocks 705R, 715, 723, 705T.

At block 853, which is analogous to block 653, local reporter and controller 477 may execute a number of local control operations on demand based on input from a user of secondary storage computing device 206. For example, the user may indicate that a given data stream 472 or 474 should be paused. Correspondingly, a user may indicate that a paused data stream should be resumed. The user may also indicate that a given data stream should be suspended. To process the user's input and execute the requested pause/resume/suspend operations, local reporter and controller 477 may communicate with throttling managers 476R and/or 475T, e.g., to/from blocks 705R, 705T, and 731.

Local reporter and controller 477 has corresponding characteristics to local reporter and controller 377. For example, the format and appearance of the user interface as well as the format and appearance of any on-demand reports and other on-demand control actions available to the user may be processed and provided by local reporter and controller 477. Also, the user interface look and feel may be similar to that provided by local reporter and controller 377, but need not be similar or identical thereto to remain within the scope of the present invention. Also, local reporter and controller 477 operates in reference to the local machine, i.e., secondary storage computing device 206 and is not under the control or management of storage manager 240, and thus provides the user with a measure of control over data streams associated with secondary storage computing device 206.

FIG. 9 depicts two mock screen shots, 9A and 9B, depicting an illustrative user interface that may be presented by local reporter and controller 377 and/or 477, e.g., using console 391. These mock screen shots are illustrative representations, without limitation, that depict some salient capabilities of the user interface and are included here as examples to ease understanding of the present disclosure.

Mock screen shot 9A illustrates a sample screen in which the user interface presented by local reporter and controller 377 and/or 477 lists a number of data streams that are registered with the local throttling manager 376/476, respectively, and which illustratively are data streams that originate from the present computing device, which may be a client computing device 202 or a secondary storage computing device 206. Incoming data streams also may be displayed, e.g., data streams 472 that terminate to secondary storage computing device 206. A combination of originating data streams 474 and incoming data streams 472 may be displayed also.

Column 901 comprises a listing of the registered data streams and illustratively also indicates which job each data stream is a part of. Streams 1 through 3 are part of job A and stream 4 is part of job B. Any number of data streams, data streams per job, and number of jobs may be listed, without limitation. Also there is no limitation on the amount of detail that may be provided relative to any given stream, e.g., which job is belongs to, how much data has been transferred to date, etc.

Column 902 provides the current status of each stream according to the throttling manager 376/476. Accordingly, data streams 1 and 2 are active, i.e., actively transferring data. Data stream 3 has been paused and as explained above, its allocated bandwidth may be re-allocated to other registered data streams. Data stream 4 is currently unresponsive, and may be de-registered and as explained above, its allocated bandwidth may be re-allocated to other registered data streams. Other possible status for a given data stream may be "suspended" or "resumed," provided as feedback to user-initiated actions, such as those shown in screen 9B and discussed elsewhere herein in further detail.

Column 903 provides the current bandwidth value allocated to and in use by the respective data stream. For example, data stream 1 is operating at a bandwidth of 1 Mbps, whereas data stream 2 is operating at a bandwidth of 1 Gbps. Data streams 3 and 4 are not transferring data currently.

Box 904 may display the amount and/or percentage of a job that has completed to date, e.g., Job A Data Transferred is shown at 80%. This information may help the user decide whether to take action relative to one of the constituent data streams of job A.

Prompt 905 may instruct the user to "Please Select A Data Stream For A User-Controlled Action" according to the illustrative embodiment.

Mock screen shot 9B illustratively appears after screen 9A; it illustrates a sample screen in which the user interface presented by local reporter and controller 377 and/or 477, in response to a user selection at screen 9A, presents the user with a number of choices relative to a given data stream that was selected by the user, e.g., data stream 2.

Element 910 displays the data stream previously selected by the user at screen 9A, e.g., data stream 2.

Element 911 displays the current status of the selected data stream 2, illustratively "active" status.

Row 920 illustratively depicts a number of actions that may be available for the user's control relative to the selected data stream, e.g., suspend 922, pause 923, and resume 924. The actions are under the user's control and are not instructed by the storage manager, as explained in more detail above. Thus the user interface may present the user with choices of available actions, which may or may not be context sensitive. Context sensitive action choices may be based on the current status of the data stream, e.g., an active data stream may be suspended or paused, but may not be resumed; a paused data stream may be resumed or suspended, but may not be paused; an unresponsive data stream may be suspended, but may not be paused or resumed, etc., without limitation.

Prompt 930 may instruct the user to "Please Choose A User-Controlled Action For Your Selected Data Stream" according to the illustrative example. The layout, composition, inter-screen flow, context sensitivity, and look-and-feel of user interface screens presented to the user shall be left to the discretion of the implementers of the present invention.

In regard to the components, blocks, operations and/or sub-operations described in reference to FIGS. 2-9, other embodiments are possible within the scope of the present invention, such that the above-recited elements, components, steps, blocks, operations, sub-operations, and/or messages/requests/queries/instructions are differently arranged, sequenced, sub-divided, organized, and/or combined. In some embodiments, additional dependencies may be possible and/or a different component may initiate or execute a given operation.

Example Embodiments

According to an example embodiment, a method for management of data stream throttling in a storage management system may comprise: receiving, by a first data agent that executes on a first client computing device, instructions for a first secondary-copy job relative to first primary data associated with the first data agent, wherein the instructions comprise one or more parameters for one or more first data streams that are to be used for transferring the first primary data to a first media agent during the first secondary-copy job; transmitting, by the first data agent, to a throttling manager, one or more respective registrations for the one or more first data streams, wherein the throttling manager also executes on the first client computing device; receiving, by the first data agent, from the throttling manager, respective first bandwidth values for the one or more first data streams; executing the first secondary-copy job, at least in part by the first data agent, wherein the first secondary-copy job comprises transferring at least part of the first primary data to the first media agent via the one or more first data streams at the respective first bandwidth values received from the throttling manager, wherein the one or more first data streams originate from the first client computing device; receiving, by the first data agent, from the throttling manager, respective second bandwidth values for the one or more first data streams; continuing the execution of the first secondary-copy job comprising transferring at least part of the first primary data to the first media agent via the one or more first data streams at the respective second bandwidth values received from the throttling manager; and after the first secondary-copy job is completed, transmitting, by the first data agent, to the throttling manager, respective de-registrations for the one or more first data streams; wherein the second bandwidth values are different from the first bandwidth values, based on a second secondary-copy job executed at least in part by a second data agent that also executes on the first client computing device, wherein the second secondary-copy job utilizes one or more second data streams that are registered with the throttling manager, and wherein the one or more second data streams also originate at the first client computing device.

The above-recited method may further comprise: transmitting, by the second data agent that also executes on the first client computing device, to the throttling manager, one or more respective registrations for the one or more second data streams to be used for transferring second primary data to the first media agent during the second secondary-copy job; receiving, by the second data agent, from the throttling manager, respective third bandwidth values for the one or more second data streams; executing the second secondary-copy job, at least in part by the second data agent, wherein the second secondary-copy job comprises transferring at least part of the second primary data to the first media agent via the one or more second data streams at the respective third bandwidth values received from the throttling manager; wherein the second bandwidth values and the third bandwidth values are based on the first data streams and the second data streams being registered with the throttling manager. The above-recited method wherein the second bandwidth values are different from the first bandwidth values, based on a maximum bandwidth that is managed by the throttling manager for data streams originating at the first client computing device and terminating at the first media agent. The above-recited method wherein the instructions are received by the first data agent from a storage manager that manages the first secondary-copy job and the second secondary-copy job in the storage management system. The above-recited method may further comprise: transmitting, by the first data agent to the throttling manager, in the course of the first secondary-copy job, a value for the amount of data transferred so far by the first secondary-copy job.

According to another illustrative embodiment, a storage management system for managing originating data streams, may comprise: a first primary storage device comprising primary data; a first client computing device in communication with the first primary storage device; a secondary storage device; a secondary storage computing device in communication with the first client computing device and with the secondary storage device, wherein the secondary storage computing device is configured to execute a first media agent; wherein the first client computing device is configured to execute a first data agent, a second data agent, and a throttling manager, and wherein the first data agent is configured to: receive instructions for a first secondary-copy job relative to first primary data associated with the first data agent, wherein the instructions comprise one or more parameters for one or more first data streams that are to be used for transferring the first primary data to the first media agent during the first secondary-copy job; transmit, to the throttling manager, one or more respective registrations for the one or more first data streams; receive, from the throttling manager, respective first bandwidth values for the one or more first data streams; transfer at least part of the first primary data to the first media agent via the one or more first data streams at the respective first bandwidth values received from the throttling manager, wherein the one or more first data streams originate from the first client computing device; receive, from the throttling manager, respective second bandwidth values for the one or more first data streams; continue to transfer at least part of the first primary data to the first media agent via the one or more first data streams at the respective second bandwidth values received from the throttling manager; and after the first secondary-copy job is completed, transmit, to the throttling manager, respective de-registrations for the one or more first data streams; wherein the second bandwidth values are different from the first bandwidth values, based on one or more second data streams that also originate from the first client computing device and are registered with the throttling manager by the second data agent.

According to another illustrative embodiment, a method for managing data streams that terminate to a secondary storage computing device in a storage management system may comprise: managing, by a throttling manager that executes on the secondary storage computing device, a maximum bandwidth available for data streams that terminate to the secondary storage computing device, wherein the managing comprises: receiving, by the throttling manager, one or more respective registrations for one or more first data streams to be used, by a first media agent that also executes on the secondary storage computing device, for a first secondary-copy job relative to first data, wherein the first secondary-copy job transfers the first data to a secondary storage device via the first media agent; receiving, by the throttling manager, one or more respective registrations for one or more second data streams to be used, by the first media agent, for a second secondary-copy job relative to second data, wherein the second secondary-copy job transfers the second data to the secondary storage device via the first media agent; allocating, by the throttling manager, based on the maximum bandwidth available for the received registrations, (i) first respective bandwidth values for the one or more first data streams to be used by the first secondary-copy job and (ii) second respective bandwidth values for the one or more second data streams to be used for the second secondary-copy job; after the second secondary-copy job completes, (i) receiving, by the throttling manager, one or more respective de-registrations for the one or more second data streams and (ii) re-allocating, by the throttling manager, based on the de-registrations and the maximum bandwidth available for the remaining registrations, third respective bandwidth values for the one or more first data streams, wherein the first secondary-copy job continues to execute using the one or more first data streams at the re-allocated third respective bandwidth values which differ from the first respective bandwidth values.

The above-recited method wherein the managing further comprises: receiving, by the throttling manager, one or more respective registrations for one or more third data streams to be used, by the first media agent, for a third secondary-copy job relative to third data, wherein the third secondary-copy job transfers the third data to the secondary storage device via the first media agent; and based on the maximum bandwidth available for the received registrations, (i) allocating, by the throttling manager, fourth respective bandwidth values for the one or more third data streams, and (ii) re-allocating, by the throttling manager, fifth respective bandwidth values for the one or more first data streams, wherein the first secondary-copy job continues to execute using the one or more first data streams at the re-allocated fifth respective bandwidth values which differ from the third respective bandwidth values. The above-recited method wherein the managing comprises maximizing, by the throttling manager, based on the maximum bandwidth, the respective bandwidth values allocated and re-allocated to registered data streams. The above-recited method may further comprise: receiving, by the throttling manager from the first media agent, in the course of the first secondary-copy job, a value for the amount of data received so far by the first secondary-copy job. The above-recited method wherein the first data is primary data stored on a primary storage device, and wherein the first data is associated with a first data agent that executes on a client computing device that accesses the first data. The above-recited method wherein the first data is a secondary copy of data stored on a secondary storage device.

According to another illustrative embodiment, a method for on-demand user control of data streams that terminate to a secondary storage computing device in a storage management system, the method comprising: receiving, a first input from a user associated with the secondary storage computing device, wherein the first input indicates a first action relative to a first data stream that terminates to the secondary storage computing device, wherein the first data stream is used by a first secondary-copy job to transfer at least part of first data to a first media agent that executes on the secondary storage computing device; managing, by a throttling manager that executes on the secondary storage computing device, a maximum bandwidth available for a plurality of data streams that terminate to the secondary storage computing device, wherein the plurality of data streams comprises the first data stream, and further wherein the managing is based on a respective registration or respective de-registration received for each data stream in the plurality of data streams; and in response to the first input, performing the indicated first action relative to the first data stream, by the secondary storage computing device, wherein the indicated first action comprises at least one of: (i) suspending the first data stream based on a de-registration supplied to the throttling manager, (ii) pausing the first data stream based on a de-registration supplied to the throttling manager, and (iii) resuming the first data stream based on a registration supplied to the throttling manager.

The above-recited method wherein suspending the data stream comprises transmitting to the throttling manager a de-registration of the first data stream and further comprises causing the first data stream to permanently stop operating in the first secondary-copy job. The above-recited method wherein pausing the first data stream comprises transmitting to the throttling manager a de-registration of the first data stream and further comprises causing the first data stream to stop operating in the first secondary-copy job until a second input from the user indicates that the first data stream should resume. The above-recited method wherein resuming the first data stream comprises transmitting to the throttling manager a registration for the first data stream and further comprises causing the first data stream to begin operating in the first secondary-copy job. The above-recited method wherein the first action relative to the first data stream is based on the user input and is not based on instructions from a storage manager that manages the first secondary-copy job in the storage management system.

According to yet another illustrative embodiment, a method for managing data streams that originate from a secondary storage computing device in a storage management system may comprise: managing, by a throttling manager that executes on the secondary storage computing device, a maximum bandwidth available for data streams that originate from the secondary storage computing device and terminate to a secondary storage device in communication with the secondary storage computing device, wherein the managing comprises: receiving, by the throttling manager, one or more respective registrations for one or more first data streams to be used, by a first media agent that also executes on the secondary storage computing device, for a first secondary-copy job relative to first data, wherein the first secondary-copy job transfers the first data to the secondary storage device via the first media agent; receiving, by the throttling manager, one or more respective registrations for one or more second data streams to be used, by the first media agent, for a second secondary-copy job relative to second data, wherein the second secondary-copy job transfers the second data to the secondary storage device via the first media agent; allocating, by the throttling manager, based on the maximum bandwidth available for the received registrations, (i) first respective bandwidth values for the one or more first data streams to be used by the first secondary-copy job and (ii) second respective bandwidth values for the one or more second data streams to be used for the second secondary-copy job; after the second secondary-copy job completes, (i) receiving, by the throttling manager, one or more respective de-registrations for the one or more second data streams and (ii) re-allocating, by the throttling manager, based on the de-registrations and the maximum bandwidth available for the remaining registrations, third respective bandwidth values for the one or more first data streams, wherein the first secondary-copy job continues to execute using the one or more first data streams at the re-allocated third respective bandwidth values which differ from the first respective bandwidth values.

The above-recited method wherein the managing further comprises: receiving, by the throttling manager, one or more respective registrations for one or more third data streams to be used, by the first media agent, for a third secondary-copy job relative to third data, wherein the third secondary-copy job transfers the third data to the secondary storage device via the first media agent; and based on the maximum bandwidth available for the received registrations, (i) allocating, by the throttling manager, fourth respective bandwidth values for the one or more third data streams, and (ii) re-allocating, by the throttling manager, fifth respective bandwidth values for the one or more first data streams, wherein the first secondary-copy job continues to execute using the one or more first data streams at the re-allocated fifth respective bandwidth values which differ from the third respective bandwidth values. The above-recited method wherein the managing comprises maximizing, by the throttling manager, based on the maximum bandwidth, the respective bandwidth values allocated and re-allocated to registered data streams. The above-recited method may further comprise: receiving, by the throttling manager from the first media agent, in the course of the first secondary-copy job, a value for the amount of data received so far by the first secondary-copy job.

According to another illustrative embodiment, a method for enabling a user of a client computing device in a storage management system to control data streams that originate from the client computing device may comprise: providing, by an enhanced-throttling-client-based subsystem that executes on the client computing device, a user interface that enables the user to view a listing of two or more data streams that presently originate from the client computing device, wherein a first data stream transfers data as part of a first copy job associated with a first data agent executing on the client computing device, and a second data stream transfers data as part of a second copy job associated with a second data agent also executing on the client computing device.

The above-recited method wherein the first copy job is a secondary-copy job that transfers data from a primary storage device to a secondary copy device. The above-recited method wherein the user interface further enables the user to choose an action relative to at least one of the listed data streams. The above-recited method wherein the user interface receives a first user input that indicates an action relative to one of the listed data streams. The above-recited method wherein the enhanced-throttling-client-based subsystem that executes on the client computing device performs an action relative to a data stream that originates from the client computing device, wherein the action is based on a user input via the user interface and is not based on instructions from a storage manager that manages the first copy job and the second copy job in the storage management system. The above-recited method wherein the user lacks administrative privileges to the storage management system that comprises the client computing device. The above-recited method wherein the user lacks administrative privileges to a storage manager that manages the storage management system.

The above-recited method further comprising: receiving, by the user interface, a user input that indicates that one of the listed data streams should be suspended; in response to the user input, suspending, by the enhanced-throttling-client-based subsystem that executes on the client computing device, the data stream indicated by the user; and displaying, by the user interface, an indication to the user that the data stream has been suspended. The above-recited method wherein the data stream is suspended based on the user input and is not based on instructions from a storage manager that manages the first copy job and the second copy job in the storage management system. The above-recited method further comprising: receiving, by the user interface, a first user input that indicates that one of the listed data streams should be paused; in response to the user input, pausing, by the enhanced-throttling-client-based subsystem that executes on the client computing device, the data stream indicated by the user; and displaying, by the user interface, an indication to the user that the data stream has been paused. The above-recited method wherein the data stream is paused based on the user input and is not based on instructions from a storage manager that manages the first copy job and the second copy job in the storage management system. The above-recited method further comprising: receiving, by the user interface, a first user input that indicates that a previously-paused data stream should be resumed; in response to the user input, resuming, by the enhanced-throttling-client-based subsystem that executes on the client computing device, the data stream indicated by the user; and displaying, by the user interface, an indication to the user that the data stream has been resumed. The above-recited method wherein the data stream is resumed based on the user input and is not based on instructions from a storage manager that manages the first copy job and the second copy job in the storage management system.

According to another illustrative embodiment, a method for enabling a user of a secondary storage computing device in a storage management system to control data streams that terminate to and originate from the secondary storage computing device may comprise: providing, by an enhanced-throttling-media-agent-based subsystem that executes on the secondary storage computing device, a user interface that enables the user to view at least: (i) a listing of one or more data streams that presently originate from the secondary storage computing device, and (ii) a listing of one or more data streams that terminate to the secondary storage computing device; and wherein the user interface further enables the user to choose an action relative to at least one of the listed data streams.

The above-recited method wherein the user interface receives a first user input that indicates the chosen action relative to one of the listed data streams. The above-recited method wherein the enhanced-throttling-media-agent-based subsystem that executes on the secondary storage computing device performs an action relative to a data stream that originates from the secondary storage computing device, wherein the action is based on a user input via the user interface and is not based on instructions from a storage manager that manages a copy job comprising the data stream in the storage management system. The above-recited method wherein the enhanced-throttling-media-agent-based subsystem that executes on the secondary storage computing device performs an action relative to a data stream that terminates to the secondary storage computing device, wherein the action is based on a user input via the user interface and is not based on instructions from a storage manager that manages a copy job comprising the data stream in the storage management system. The above-recited method wherein the user lacks administrative privileges to the storage management system that comprises the secondary storage computing device. The above-recited method wherein the user lacks administrative privileges to a storage manager that manages the storage management system.

The above-recited method further comprising: receiving, by the user interface, a user input that indicates that one of the listed data streams should be suspended; in response to the user input, suspending, by the enhanced-throttling-media-agent-based subsystem that executes on the secondary storage computing device, the one data stream indicated by the user; and displaying, by the user interface, an indication to the user that the one data stream has been suspended. The above-recited method further comprising: receiving, by the user interface, a first user input that indicates that one of the listed data streams should be paused; in response to the user input, pausing, by the enhanced-throttling-media-agent-based subsystem that executes on the secondary storage computing device, the data stream indicated by the user; and displaying, by the user interface, an indication to the user that the data stream has been paused. The above-recited method further comprising: receiving, by the user interface, a first user input that indicates that a previously-paused data stream should be resumed; in response to the user input, resuming, by the enhanced-throttling-media-agent-based subsystem that executes on the secondary storage computing device, the data stream indicated by the user; and displaying, by the user interface, an indication to the user that the data stream has been resumed.

Terminology

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or" in reference to a list of two or more items, covers all of the following interpretations of the word: any one of the items in the list, all of the items in the list, and any combination of the items in the list. Likewise the term "and/or" in reference to a list of two or more items, covers all of the following interpretations of the word: any one of the items in the list, all of the items in the list, and any combination of the items in the list.

Depending on the embodiment, certain operations, acts, events, or functions of any of the algorithms described herein can be performed in a different sequence, can be added, merged, or left out altogether (e.g., not all are necessary for the practice of the algorithms). Moreover, in certain embodiments, operations, acts, functions, or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described herein. Software and other modules may reside and execute on servers, workstations, personal computers, computerized tablets, PDAs, and other computing devices suitable for the purposes described herein. Software and other modules may be accessible via local memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, interactive voice response, command line interfaces, and other suitable interfaces.

Further, the processing of the various components of the illustrated systems can be distributed across multiple machines, networks, and other computing resources. In addition, two or more components of a system can be combined into fewer components. Various components of the illustrated systems can be implemented in one or more virtual machines, rather than in dedicated computer hardware systems and/or computing devices. Likewise, the data repositories shown can represent physical and/or logical data storage, including, for example, storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks.

These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded onto a computing device or other programmable data processing apparatus to cause a series of operations to be performed on the computing device or other programmable apparatus to produce a computer implemented process such that the instructions which execute on the computer or other programmable apparatus provide steps for implementing the acts specified in the flow chart and/or block diagram block or blocks.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates the various aspects of the invention in any number of claim forms. For example, while only one aspect of the invention is recited as a means-plus-function claim under 35 U.S.C sec. 112(f) (AIA), other aspects may likewise be embodied as a means-plus-function claim, or in other forms, such as being embodied in a computer-readable medium. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application, in either this application or in a continuing application.

What is claimed is:

1. A non-transitory computer-readable storage medium storing instructions that when executed by one or more computing devices cause the one or more computing devices to perform a method for adjusting bandwidth for a data storage operation executing on a source computing device, the method comprising:
   executing the data storage operation on the source computing device using at least some of available bandwidth of the source computing device to transmit data to a destination computing device in a storage system,
      wherein the data storage operation comprises transmitting data via one or more data streams,
      wherein the data storage operation is executed according to a schedule indicated in a storage policy assigned to the source computing device,
      wherein the storage policy comprises a collection of settings or preferences for performing backup operations on data stored on the source computing device;
   receiving a first request from a user to adjust bandwidth allocated to at least one data stream associated with the data storage operation at the source computing device;
   adjusting the bandwidth allocated to the at least one data stream from a first value to a different second value in accordance with the first request;
   receiving data from the source computing device via one or more data streams; and
   storing the received data in the storage system.

2. The non-transitory computer-readable storage medium of claim 1, wherein the source computing device is a secondary storage device and distinct from the destination computing device.

3. The non-transitory computer-readable storage medium of claim 1, wherein the adjusting the bandwidth for the at least one data stream is performed without pausing or restarting the data storage operation.

4. The non-transitory computer-readable storage medium of claim 1, wherein the adjusting the bandwidth for the at least one data stream is executed by a throttling manager that allocates bandwidth for multiple data streams associated with the data storage operation.

5. The non-transitory computer-readable storage medium of claim 4, wherein the throttling manager is executed on a storage manager which is separate and distinct from the source computing device and destination computing device.

6. The non-transitory computer-readable storage medium of claim 1, wherein the destination computing device is hosted by a cloud service provider.

7. The non-transitory computer-readable storage medium of claim 1, wherein the data storage operation is a replication operation, an archive operation, or a data migration operation.

8. The non-transitory computer-readable storage medium of claim 1, wherein the first request is received at a storage manager.

9. The non-transitory computer-readable storage medium of claim 1, wherein the data storage operation is initiated by a storage manager that executes on another computing device that is distinct from the source computing device.

10. An information management system configured to adjust bandwidth for a data storage operation executing on a source computing device, the information management system comprising:
   one or more computing devices comprising computer hardware configured to:
   execute the data storage operation on the source computing device using at least some of available bandwidth of the source computing device to transmit data to a destination computing device in a storage system,
      wherein the data storage operation comprises transmitting data via one or more data streams,
      wherein the data storage operation is executed according to a schedule indicated in a storage policy assigned to the source computing device,
      wherein the storage policy comprises a collection of settings or preferences for performing backup operations on data stored on the source computing device;
   receive a first request from a user to adjust bandwidth allocated to at least one data stream associated with the data storage operation at the source computing device;
   adjust the bandwidth allocated to the at least one data stream from a first value to a different second value in accordance with the first request;
   receive data from the source computing device via one or more data streams; and
   store the received data in the storage system.

11. The information management system of claim 10, wherein the source computing device is a secondary storage device and distinct from the destination computing device.

12. The information management system of claim 10, wherein the adjusting the bandwidth for the at least one data stream is performed without pausing or restarting the data storage operation.

13. The information management system of claim 10, wherein the adjusting the bandwidth for the at least one data stream is executed by a throttling manager that allocates bandwidth for multiple data streams associated with the data storage operation.

14. The information management system of claim 13, wherein the throttling manager is executed on a storage manager which is separate and distinct from the source computing device and destination computing device.

15. The information management system of claim 10, wherein the destination computing device is hosted by a cloud service provider.

16. The information management system of claim 10, wherein the data storage operation is a replication operation, an archive operation, or a data migration operation.

17. A computer-implemented method, the method comprising:
   executing a data storage operation on a source computing device using at least some of available bandwidth of the source computing device to transmit data to a destination computing device in a storage system,
      wherein the data storage operation comprises transmitting data via one or more data streams,
      wherein the data storage operation is executed according to a schedule indicated in a storage policy assigned to the source computing device,
      wherein the storage policy comprises a collection of settings or preferences for performing backup operations on data stored on the source computing device;
   receiving a first request from a user to adjust bandwidth allocated to at least one data stream associated with the data storage operation at the source computing device;
   adjusting the bandwidth allocated to the at least one data stream from a first value to a different second value in accordance with the first request;
   receiving data from the source computing device via one or more data streams; and
   storing the received data in the storage system.

* * * * *